United States Patent [19]

Griswold et al.

[11] Patent Number: 5,749,736

[45] Date of Patent: May 12, 1998

[54] METHOD AND SYSTEM FOR COMPUTERIZED LEARNING, RESPONSE, AND EVALUATION

[75] Inventors: Michael R. Griswold. Provo; Thierry Guillerm. Salt Lake City; Wayne Jiang; Bruce Mossman. both of Provo; Spencer Rogers. Orem; Giovanni Tata. Provo, all of Utah

[73] Assignee: Taras Development. Provo, Utah

[21] Appl. No.: 653,664

[22] Filed: May 31, 1996

Related U.S. Application Data

[63] Continuation of Ser. No. 408,734, Mar. 22, 1995, abandoned.

[51] Int. Cl.⁶ .............................. G09B 3/00; G09B 7/00
[52] U.S. Cl. .............................................. 434/322; 434/323
[58] Field of Search ........................................ 434/322, 323

[56] References Cited

U.S. PATENT DOCUMENTS

| | | | |
|---|---|---|---|
| 3,606,688 | 9/1971 | Zawels et al. | 434/323 |
| 4,010,556 | 3/1977 | Ellsworth et al. | 434/201 |
| 4,118,876 | 10/1978 | Brilakis | 434/335 |
| 4,164,078 | 8/1979 | Golfarb | 434/335 |
| 4,627,818 | 12/1986 | Von Fellenberg | 434/236 |
| 4,820,167 | 4/1989 | Nobles et al. | 434/336 |
| 4,829,431 | 5/1989 | Ott et al. | 434/323 |
| 4,895,518 | 1/1990 | Arnold et al. | 434/118 |
| 4,958,284 | 9/1990 | Bishop et al. | 364/419 |
| 5,002,491 | 3/1991 | Abrahamson et al. | 434/322 |
| 5,059,127 | 10/1991 | Lewis et al. | 434/353 |
| 5,173,051 | 12/1992 | May et al. | 434/118 |
| 5,259,766 | 11/1993 | Sack et al. | 434/362 |
| 5,261,823 | 11/1993 | Kurokawa | 434/323 |
| 5,308,244 | 5/1994 | Hirose | 434/169 |
| 5,350,303 | 9/1994 | Fox et al. | 434/118 |
| 5,385,475 | 1/1995 | Sudman et al. | 434/307 |
| 5,421,730 | 6/1995 | Lasker, III et al. | 434/118 |
| 5,441,415 | 8/1995 | Lee et al. | 434/350 |

*Primary Examiner*—Richard J. Apley
*Assistant Examiner*—John Rovnak
*Attorney, Agent, or Firm*—Workman, Nydegger & Seeley

[57] ABSTRACT

A method and system for computerizing learning, response, and evaluation is provided. The computerized system comprises a central processing unit and related memory and storage capacity to operate a learning, response, and evaluation system stored in a computer program. The learning, response, and evaluation system comprises an authoring portion and a presentation portion. Through the use of intuitive interface elements, the authoring portion allows an author to quickly and easily construct a lesson from a pool of relevant data. Due to the design and capabilities provided, the authoring portion reduces the time it takes for an author to learn how to construct a lesson and reduces the time it takes to construct the lesson. Data can be organized into pages which are presented to the user and pages which are hidden from the user. The presentation portion allows a user to view and learn the information contained in a lesson. Learning is enhanced because a user can request testing at virtually any point in the lesson. Unlike prior systems, questions presented to the user are generated by the learning, response, and evaluation system rather than being developed by the author.

13 Claims, 10 Drawing Sheets

METHOD AND SYSTEM FOR COMPUTERIZED LEARNING, RESPONSE, AND EVALUATION

This application is a continuation of prior application Ser. No. 08/408,734 filed on Mar. 22, 1995, entitled Method and System for Computerized Learning, Response, and Evaluation, now abandoned.

COPYRIGHT INFORMATION

A portion of the disclosure of this patent document contains material which is subject to copyright protection. The copyright owner has no objection to the facsimile reproduction by anyone of the patent disclosure as it appears in the Patent and Trademark Office public patent files or records, but otherwise reserves all copyright rights.

BACKGROUND OF THE INVENTION

1. The Field of the Invention

This invention relates to methods and systems for computerized learning, response, and evaluation. More specifically, this invention relates to methods and systems for organizing and presenting information to a student and allowing the student a great deal of flexibility in determining the testing and evaluation procedure.

2. The Relevant Technology

Testing has typically held a central role in the learning process. In educational settings, an individual is first presented with information that is to be learned and, in order to measure the amount of information learned, a test is given. Testing has evolved into a specialized field. Many theories have been developed in order to both develop tests designed to measure a particular level of achievement or mastery and to interpret the results of such a test. Thus, standardized tests have been developed to measure such things as Intelligence Quotient, personality traits, fitness to practice a profession such as law, medicine, contracting or the like, aptitude for success in a specific environment, and mastery of individual skills.

Historically, tests have been administrated on either an individual basis, such an oral or written examination, or on a group basis, such as a test administered in an educational setting where students record their answers on paper which are to be evaluated at a later time. One of the advantages of a written test is the efficiency in testing a large number of individuals. Unfortunately, a written test administered in such a manner lacks the ability to provide immediate feedback on an individual basis. Thus, it is generally recognized that testing in a traditional educational setting represents a tradeoff between efficiency and the ability to provide individual feedback.

It is generally unreasonable to expect that an individual test would be developed for each individual. Thus, in order to preserve the ability of the test to measure an individual's aptitude, care must be taken not to disclose the answers to a test. Likewise, where the test is designed to measure individual performance, care must be taken to insure that each individual takes the test based on his or her own knowledge.

In order to prevent cheating and to minimize the probability of an individual test score being influenced by others, multiple tests may be developed and administered simultaneously so that each individual is, in effect, taking a different test. Problems associated with this methodology, however, generally prevent its implementation. The effort and expense of developing and grading multiple tests generally limits this methodology to very specialized applications.

Many educators believe that measurement of performance and feedback is critical in the learning process. While written tests may be an efficient way to measure performance, they are largely inefficient in providing adequate feedback for learning. Generally there is a large lag time between the time when the test is taken and when the results of the test are returned. During this lag time, new information is usually presented. Thus, when the tests are returned, the focus of both the material and the individual has shifted. Thus, relatively few students will use such a test to evaluate their weaknesses and return to prior material in order to strengthen those weaknesses.

In order to overcome this limitation, some courses of study are structured with many smaller tests interspersed throughout the material. While this generally improves the potential for feedback, still such a method is relatively inefficient. Further, it dramatically increases the workload of an instructor or teacher.

In order to enhance the learning environment, many educators realize that the optimal form of instruction would be a personalized instructor for each student or individual. This, however, is generally impractical in most learning environments. In order to provide a better learning environment that more closely approaches the ideal environment of one instructor for every student, some educators are turning to computers. Through the use of computers, learning programs may be developed which provide instruction and feedback virtually simultaneously. For example, a general course of instruction may be presented to an individual after which the computer can query the individual regarding the principles just learned. The computer can then tally the score and provide the score to the individual. This allows the individual to return to information not learned and again review the material. Another advantage of computers is that they allow the pace of instruction to be varied according to the ability of the individual to learn. Furthermore, computers can be used to enhance personal learning outside the traditional educational environment. Computers thus hold great potential for enhancing the learning environment.

Current utilization of computers as part of the learning environment take their modes and methods of operation from current teaching techniques. Most computer programs designed to aid in the learning process first present a section of information and then test the individual based on the information presented. The structures of these programs are generally organized in a pre-set or pre-defined manner. Thus, like text books generally utilized in educational settings, the program presents a chapter of information and then quizzes the user on the information contained in that chapter. The next chapter is then presented, if any, along with the associated test. Programs which are organized to present information in this manner, are generally very inflexible and do not allow the user to determine in which order the information will be presented. Although this has the advantage of presenting information in an order which has been shown by long experience to be the "best" for learning the information, it forces the user to review information that may already be known.

In order to provide more flexibility, some programs allow the user to select which chapters will be presented. Thus, the user is allowed to determine the basic ordering of the chapters of information. While this allows the user some degree of flexibility in the process, it still deals with information in relatively large units. Thus, the presentation of information still remains relatively fixed and ridged. Concepts from different units or chapters must be tied together in the mind of the user. Similarly, because the tests are presented after each unit, no overview test is provided. It would thus be an advancement in the art to provide a method to allow the user more control not only over the order and sequence of presentation but also the focus and scope of the tests administered.

In an attempt to remedy this shortcoming, some programs are also provided with a global or overview test. These tests allow a user to be tested on the entire subject matter Because of the general nature of these tests, a user must generally review all material in the program before these tests can be utilized. Thus, there still remains an inability to test only on the information that has been presented to a user.

Another potential problem with these types of programs is the inability of the program to vary its behavior when presenting test questions. Once an individual has worked through a lesson or chapter, the set of questions at the end are generally fixed. Thus, an individual who must review the material several times in order to learn it, may learn the sequence of test questions. The test then becomes less a measure of the actual knowledge possessed by the user and more a measure of the ability of the user to memorize the sequence and order of test questions. In order to prevent this occurrence, many programs have built into them a random component. This component presents the test questions in a random order. Memorization of the test questions by an individual is thus more difficult. While this has the advantage of providing a little different look each time the program is run, it still does not totally solve the problem.

In an attempt to strengthen this part of the program, certain manufactures have created a larger set of questions. The test would then ask a subset of these questions in a random order. In this way, not only is the order of test questions randomized, but also the selection of the test questions themselves. Thus, a user reviewing the same material on two different occasions, may not be presented with the same questions. While this provides an even greater degree of randomness so that the tests are different each time they are taken, care must be utilized to insure that each question is asked only once. Furthermore, the effectiveness of this method depends on the number of questions available for use relative to the number of questions which are asked during each test.

This problem raises one of the limitations of these types of programs. The effectiveness of the test and evaluation section of the program is generally dependent on the number of questions which can be asked of an individual. During development of these programs, it is often very difficult and time consuming for an individual to generate a pool of questions for use during testing. Each question must be authored and then programmed into the computer so that it can be asked at the appropriate time. The larger the number of test questions, the harder the program is to develop. Thus, many of these type of programs utilize relatively simple testing methodologies in order to minimize the total number of test questions that must be developed.

Speed and complexity of development are always paramount considerations when crafting these types of learning programs. Development of these types of programs generally begins by obtaining information. After information is obtained, the information must be sorted into logical categories for presentation. This process can be illustrated by a glance through a typical classroom textbook. In the textbook, information is organized or grouped by chapters to provide a logical and coherent flow for the individual utilizing the textbook. In much the same way, information is organized and structured into chapters or units or lessons to facilitate this logical and orderly flow. For each chapter or lesson, if testing is desired, then a pool of test questions must be drafted and developed. The answers to these questions must also be developed. The programmer or developer then organizes the information so that it can be presented to the user. The test questions and answers are also organized so they can be presented to the user.

The time it takes to develop a learning program can be very significant. In order to minimize the development time, there is a tendency to minimize either the amount of information presented or the number of test questions presented. This, however, is sometimes not acceptable since the resulting product is insufficient to present the depth or breadth of information required. For example, only questions dealing with the narrow range of presented information may be asked. The student is not presented with a broad enough spectrum of information to allow the answering of analogous rather than specific questions. Currently, there does not exist a satisfactory method of reducing development time. While some authoring tools exist, these are generally structured so as to minimize the effort involved in presenting information to the user. Test questions and testing methods must still be developed through a very laborious process. Thus, it would be an advancement in the art to have a method which reduces the effort required to develop test questions.

One advantage of learning systems designed to test individuals on a sequence of materials is the ability to alter the number of questions being asked. For example, if the test is utilized for practice purposes, it would be desirable to ask fewer questions of an individual who clearly has mastered the subject and more questions of an individual who has not attained a high degree of mastery. Computers are capable of dynamically totaling the number of questions asked and determining whether further questions should be asked. Unfortunately, this capability is often limited by the number of questions available for a given chapter or lesson. Because such questions are often hard to develop, the number of questions available for a given chapter or subject is often limited. This is particularly true where a certain number of questions are to be reserved for a general test covering all information in the learning program.

Due to the difficulty in developing comprehensive learning programs, the testing questions are generally designed to cover only the material specifically presented. Because of the relative inflexibility and difficulty in developing broad-based learning programs, testing on information analogous to that which has been presented is generally difficult. In order to develop such a capability, an author must develop questions drawn to information only analogous to that which has been specifically presented. Because of the difficulty in developing analogous questions, such a capability is often not included in learning programs. It would thus be an advancement in the art to develop a simple method for testing on information analogous to that which has been presented.

SUMMARY AND OBJECTS OF THE INVENTION

It is therefore an object of the present invention to develop a computer learning, response, and evaluation system which allows a developer to quickly and efficiently present data and tests on the data presented.

It is a further object of the present invention to provide a computer, learning, response, and evaluation system which organizes data in such a way to allow for feedback tests as the information is presented.

It is a further object of the invention to allow the user to determine the order and path of the presentation of information and testing.

It is a still further object of the present invention to allow the user to request a feedback test at virtually any point during the presentation of the information.

A still further object of the present invention is to allow the user to select the focus of the lessons and testing.

Yet another object of the present invention is to provide a computer learning, response, and evaluation system which randomly generates the content of test questions rather than simply randomly presenting previously defined test questions.

Yet another object of the instant invention is to provide a computer learning, response, and evaluation system capable of generating numerous permutations and combinations of test questions and answers.

A further object of the present invention is to provide a computer learning, response, and evaluation system which is capable of generating questions from analogous data which has not been presented to the user.

Yet another object of the present invention is to provide a computer learning, response, and evaluation system which is capable of generating test questions from all information contained in the learning program.

A still further object of the present invention is to provide a computer learning, response, and evaluation system capable of generating and evaluating short feedback tests so that overall subject matter mastery can be ascertained without the need to generate an overall summary test.

Another object of the present invention is to provide a computer learning, response, and evaluation system that allows the user to limit the focus of testing to a subset of the information presented.

Another object of the present invention is to provide a computer learning, response, and evaluation system which is capable of adaptively varying the number of questions asked based on the performance of the user in answering previously presented questions.

Another object of the present invention is to provide a computer learning, response and evaluation system capable of generating test questions each pertaining to specific data screen which is presented.

A still further object of the present invention is to provide a computer learning, response, and evaluation system which is capable of providing links between learning screens so that a user may be presented with multiple screens of connected information.

A still further object of the present invention is to provide a learning program where test questions can be generated by the program which include any combination of sound, video, illustrations, and text.

A further object of the present invention is to provide a computer learning, response, and evaluation system which assists the author in generating test questions.

Another object of the present invention is to provide a computer learning, response, and evaluation system which allows the author to control the types of questions which are asked on each data screen presented.

Another object of the present invention is to dramatically cut the time it takes to develop interactive lessons for computer based learning.

Yet another object is to reduce the time it takes to learn how to develop interactive lessons for computer based leaning by providing a robust, intuitive set of development tools which eliminate the need for the author to "program" a computer.

A still further object of the present invention is to remove the need for the author to write individual test questions.

Additional objects and advantages of the invention will be set forth in the description which follows, and in part will be obvious from the description, or may be learned by the practice of the invention. The objects and advantages of the invention maybe realized and obtained by means of the instruments and combinations particularly pointed out in the amended claims. To achieve the foregoing objects, and in accordance with the invention as embodied and broadly described herein a method and system for computerized learning, response, and evaluation is provided. The computerized system comprises a central processing unit and related memory and storage capacity to operate a learning, response, and evaluation system stored in a computer program. The learning, response, and evaluation system comprises an authoring portion and a presentation portion.

The authoring portion of the computer program is encoded in software which is executed by the central processing unit. Data in the form of text, sound, and graphics such as digitized images, and both still and moving images relating to a central topic are also loaded into the memory of the central processing unit. The inventive system allows for the arrangement and presentation of the data in such a manner as to allow presentation of that information to the user of the presentation portion of the system. To this end, an individual operating an authoring portion of the system reviews the data and assembles the available data into pages. The authoring portion of the system is designed to allow WYSIWYG format allowing the author to review the product as it will appear on the page presented to the user by the presentation portion of the system. Each assembled page may contain text, sound, and graphics in varying proportions. The individual operating the authoring portion may also utilize portions of the data to create pages which are not visible to the user of the presentation portion.

The process of creating a lesson has two fundamental parts: the data organization phase and the assessment phase. The data organization phase consists of organizing the data on all pages. The assessment phase is best described by the set up of questions, how they are organized, how the program adapts to the knowledge of the user, and how the program will vary its presentation and assessment with user responses.

To control the available questions, each page contains a question matrix. The question matrix identifies the data resources on the page that can be used in generating questions. Each question has a question part and an answer part comprising a right answer and one or more wrong answers. The rows of the question matrix represent the question part of the questions, the columns represent the answer part of the questions.

For example, one column may be labeled text 1, and other columns labeled for text, sound, graphics and the like. The rows of the matrix are likewise labeled with data that has been presented on the page in the form text, sound, graphics and the like. The presentation portion of the system utilizes the matrix to randomly generate questions from the columns of the matrix and derive answers from the rows of the matrix. Matrices are also generated for the pages which are not shown to the viewer.

When the user elects to be evaluated on the information presented on that page, the presentation portion generates questions appropriate to the data presented on those pages from the matrices of both the viewed page and hidden pages. In this way, questions can be generated from analogous information which has not been presented to the user.

The system then monitors the aptitude of the user in answering the questions and determines whether additional questions are required. The score of the user is recorded. If the user does not desire testing on individual pages, the user may elect to take a general test covering several pages. For this type of evaluation, the matrices for all viewed and hidden pages for the entire lesson provide source material for the questions and answers which the presentation portion generates.

In one embodiment of the present invention, the presentation portion may then return the user to the pages containing information regarding questions which were answered incorrectly. The user could then review that information and take a test on only that page to assure that the information had been learned.

The system also provides for branching of various points of the lesson. These branches are created in the authoring portion of the system and allow a user to selectively broaden the user's understanding of specific areas by following the branch pages for further presentation of information on a specific topic. Although the branches are created in the authoring portion of the system, the user of the presentation portion of the system may choose not to pursue the branch information depending on the user's general performance on the lesson based on the user's testing on prior pages. For example, if the user had not been successful in quickly learning the material as determined by taking tests on specific, prior pages, the user might elect to pursue the branch information. When branch information is available it is indicated to the user through the use of a control button located on the page.

Each type of page created in the authoring portion of the system has four identifiers. These identifiers are located on the page and assist the system in determining what on that page can be utilized in developing questions. The four identifiers are type, linkage, topic, and page name. These four identifiers allow the system to select from a large number of matrices when generating questions. The system has multiple question formats which allow generation of hundreds of questions and answers. It is important to note that these questions are not previously defined as in the prior art, but are instead generated upon request. This provides an additional level of randomness which enhances the usefulness of the testing and serves as additional security against cheating.

In addition to the control button on the page requesting examination, and the control button requesting additional information through branching, some pages created in the editor may also have a feature that allows for very specific information to be provided on a portion of the information on that page. For example, the page may have a picture of the members of the Supreme Court. The text on the page could give the names of the Supreme Court members along with other biographical information. If the user was interested in learning about a specific member of the Supreme Court, the user would activate the featured area, for example, a matched box around each Justice in the picture, and could learn additional information about that Supreme Court Justice. This additional information could result into branching into an entire sequence of pages relating to this one individual. The user could then activate the button on the page requesting examination and a test would be instantly generated based on the pages which the user had reviewed.

Since not every page has text, sound, and graphics, the columns of the matrix reserved for those features must necessarily be blank. The system also provides a feature which allows the individual in the authoring portion of the system to prevent access to a particular column and thereby prevent the generation of questions based on that particular resource. In this manner, the maximum possible permeations from the presented data are always available for use in generating questions.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

Appendix A is source code demonstrating a preferred presentation portion for use with the present invention.

DETAILED DESCRIPTION OF THE PREFERRED EMBODIMENTS

The preferred embodiment of the method and system of the present invention is useful in providing evaluation of the ability of a user to comprehend presented data. In one preferred embodiment, a method and system of the present invention is divided into an authoring portion and a presentation portion. The authoring portion allows a developer or author to take a pool of relevant data and organize it for presentation to a user. The presentation portion takes the data as organized by the authoring portion and presents it to the user. The presentation portion also generates questions which can be used for evaluation and feedback. Rules by which these questions should be generated are developed by the authoring system when the data is organized. It should be emphasized that unlike the prior art where pre-defined questions are simply presented to the user, the instant invention generates the questions to be asked utilizing the information in the lesson.

It is possible to develop a specialized hardware platform to be used for the instant invention. However, the authoring portion and the presentation portion are preferably designed to be used in conjunction with a general purpose computer. Although it is possible to implement the authoring portion and the presentation portion in such a manner as to run on any general purpose computer, currently the preferred hardware platform is a personal computer such as an IBM® personal computer or an Apple® personal computer or equivalents thereto. In the presently preferred embodiment of the authoring system and the presentation system, extensive use of graphics (both video and illustrations), sound, and textural information is employed. In addition, the presently preferred operating environment for both the authoring portion and the presentation portion is a windowed operating environment such as Microsoft® Windows® or the Apple® operating system. Thus, hardware platforms which are capable of supporting these capabilities are presently preferred.

Throughout this disclosure, such a hardware platform and operating environment are presumed. Thus, structures such as display mechanisms, input mechanisms, graphics capability, sound capability, and the like are presumed. Furthermore, the hardware platforms are presumed to include the standard structures normally expected such as disk drives, internal memory for program and data storage and the like.

Figure 1:
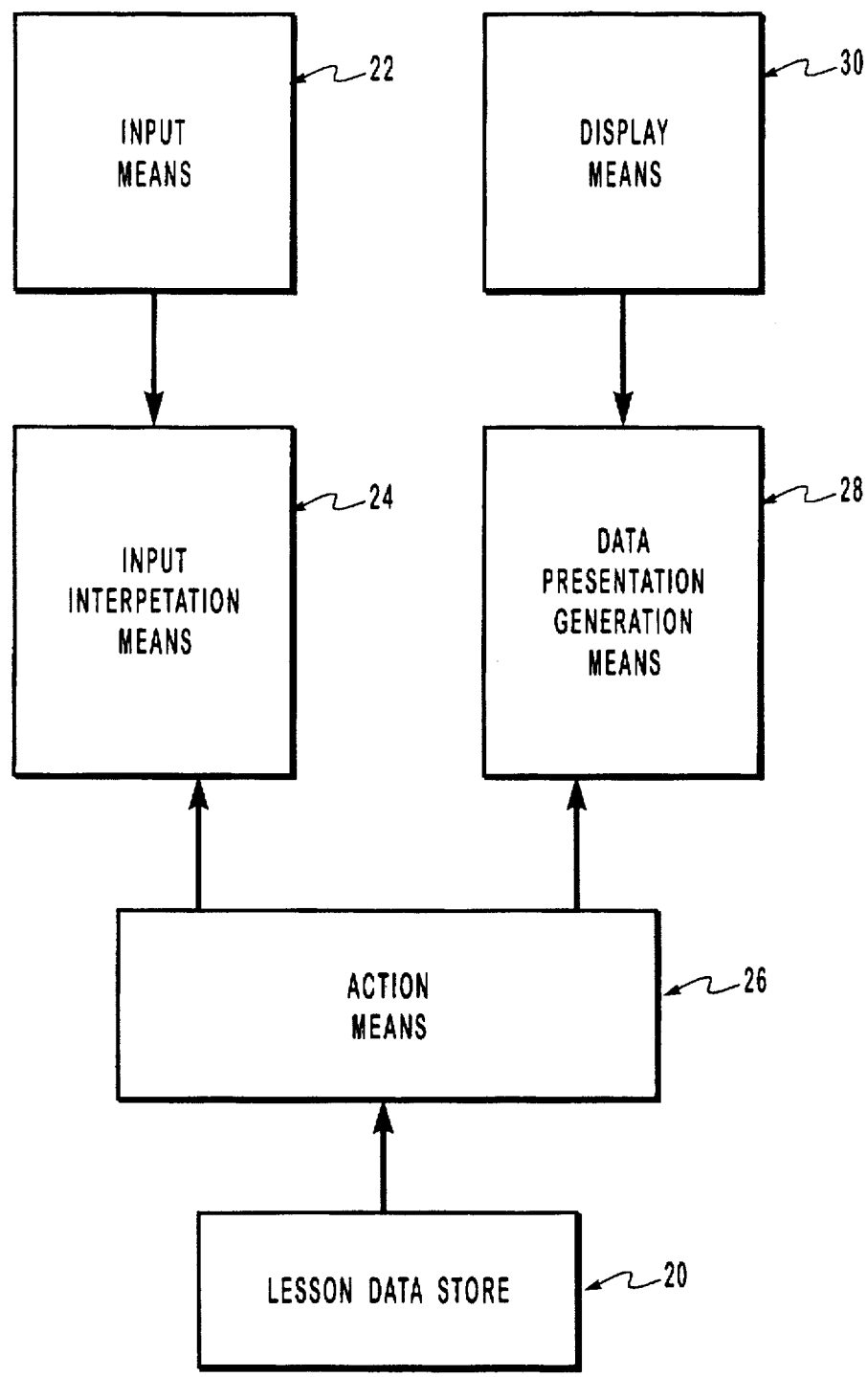
FIG. 1 top level is a structural diagram of the presentation portion of the system in one preferred embodiment.

Referring now to FIG. 1, a structural diagram of the presentation portion is illustrated. As previously described, the presentation portion is designed to take lesson data as organized by the authoring portion and allow the user to interact with the data. The presentation portion is encoded in a software which is loaded onto the hardware platform to be executed by the CPU. The software may reside on a plurality of storage media known to those skilled in the computer art. By way of example and not limitation, such storage media can include, fixed or removable disks, CD-ROM, ROM, RAM, or any other computer readable media.

In FIG. 1, the data as organized by the authoring portion is illustrated by the lesson data store 20. The lesson store is typically located on a permanent storage media of the computer such as a removable or fixed disk or CD-ROM. As the data is utilized and presented to the user for interaction, the data is typically loaded from the disk into the computer memory.

Input is received from input means 22 and passed to input interpretation means 24. Input means 22 comprises the input means of the associated hardware platform. This can include such items as a keyboard, mouse, pen, voice, and the like. Input interpretation means 24 translates the input received and determines what actions should be taken. The appropriate information is then passed to action means 26 which performs the desired action.

Action means 26 extracts the appropriate information from lesson data store 20 to fulfill the desired task. After completing the desired task, which may involve processing the data extracted from lesson data store 20, the appropriate information is then passed to data presentation generation means 28. Data presentation generation means 28 formats the data in an appropriate manner and displays the data to the user via a display means 30.

Display means 30 comprises the means by which the learning, response, and evaluation system presents information to the user. Capability nominally included in the preferred embodiment is a visual display device capable of presenting text and graphics, both illustrations and video. In addition, in the preferred embodiment the ability to present sound, such as voice, music, and the like, should also be included in the display means.

Figure 2:
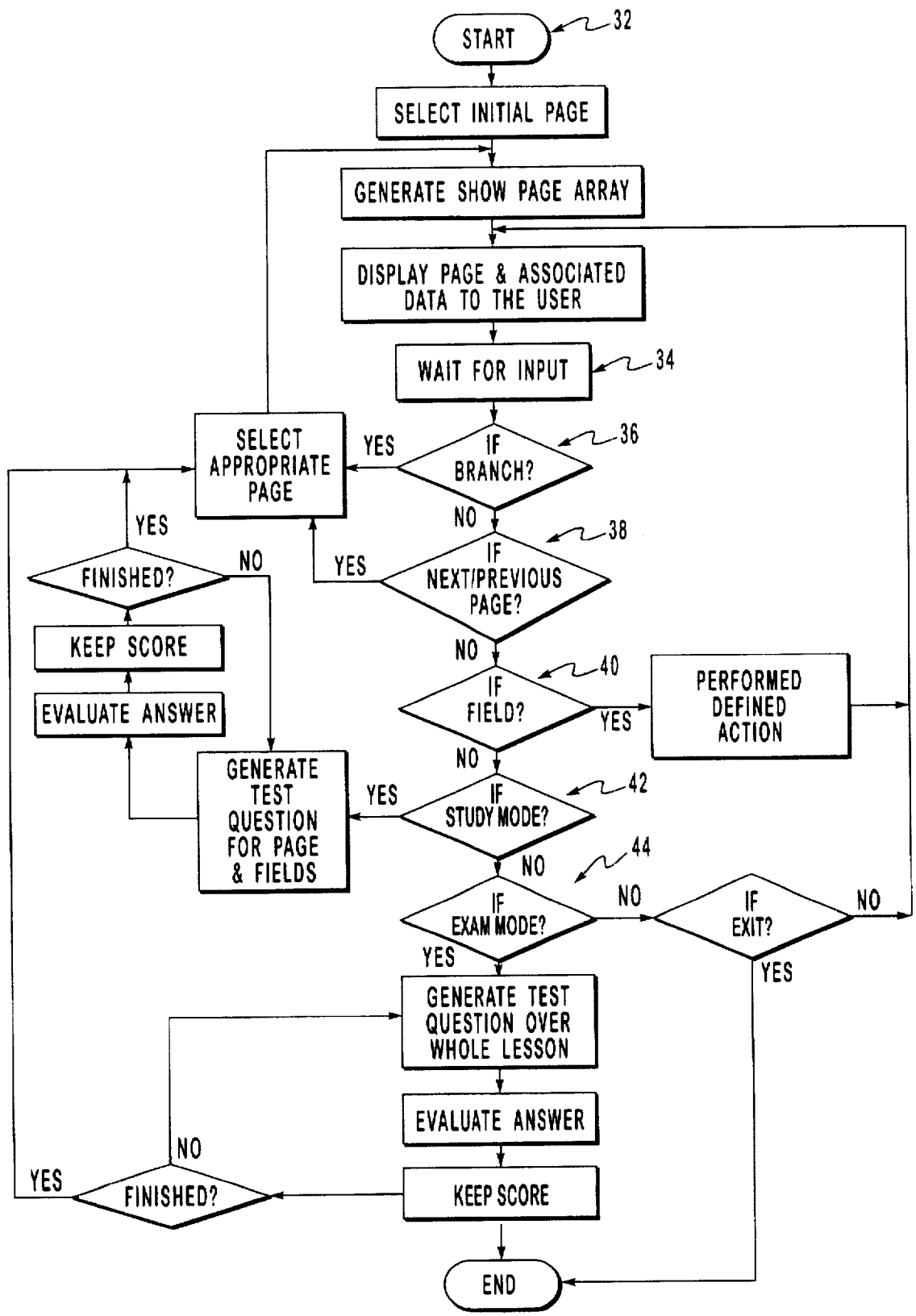
FIG. 2 is a basic flow chart showing how a student would execute options available in the presentation portion of a preferred embodiment of the system.

In order that the learning, response, and evaluation system may be more fully disclosed, FIG. 2 presents a basic flow diagram of one preferred embodiment. When the system is started, the flow begins at step 32 labeled start. The system then selects the initial page from lesson data store 20, generates the show page array for that page and displays the page with its associated data to the user. Within the context of this patent, the terms "page" refers to a unit of organized information. Pages may or may not be presented to the user. A page comprises various informational resources. These resources can include text, graphics, and sound. Within the scope of this patent, graphics refers to both illustration graphics such as a picture, and video graphics. Pages may also have identifiers associated with them. Examples of identifiers are discussed in conjunction with the authoring portion later.

Because a page can contain many different resources, a method must be developed for ensuring that the resources are presented to the user in the appropriate format and with the appropriate control structures which allows the user to access the resources. In one preferred embodiment, one such method comprises a show page array. The show page array can serve as a repository for the information needed to appropriately display the page, with its associated resources, to the user. For example, the show page array can contain such information such as where the graphic on the page is to be located, where the text on the page should be located, whether any sound associated with a page should be played immediately when the page is displayed, or whether a control button should be displayed which will allow the user to hear the sound when the control button is activated. Other information, such as branching information, control button layout, and the like, may also be included in the show page array. It is to be understood that there are other ways in which the resource information can be compiled and the concept of the show page array is given by way of example and not limitation.

Once the information of the page is displayed to the user, step 34 is entered where the system waits for the information from the user. Depending on the information displayed, and the resources available on the page, several actions may be possible. By way of example and not limitation, FIG. 2 shows five possible actions the user can initiate.

If the data in the lesson has been organized in a manner which allows branching from the current part of the lesson to another part of the lesson, the user may elect to take the branch as indicated by branch step 36. If such action is initiated, the system will select the appropriate page from lesson data store 20, generate the associated show page array and display the page to the user. By way of example, and not limitation, if a branch is taken, control buttons may be added to the display which allows the user to return from the branch to a predefined location in the lesson. Such a predefined location may be a page where the branch initiated or to a different page in the lesson. Furthermore, it is anticipated that when a user has taken multiple branches, multiple control buttons may be displayed to the user in order for the user to return to various levels of the lesson.

In one preferred embodiment, the branching capability provides a robust manner in which to hypersequentially traverse information related to the current page. As used within this patent, "hypersequentially" describes a manner of organizing pages so that they can be presented in a non-sequential manner. In addition to branching from the current page to another point in the current lesson, embodiments within the scope of the instant invention also allow branching to relevant information in an entirely different lesson. Furthermore, other embodiments within the scope of the instant invention allow branching to a location where questions covering the relevant information on the page are generated and presented to the user. In still other embodiments, it is contemplated that the branching capability could be utilized to branch to an entirely different lesson and questions on the relevant part of the entirely different lesson would be generated and presented to the user. In still other embodiments of the present invention it is anticipated that a branch could take the user to a point in the present or another lesson after which the system would sequentially present pages of data relevant to a particular topic without any further input from the user. Thus, a branch can take a user to a particular portion of the lesson where a "slide show" type presentation can be made.

In addition to the robust branching capability, embodiments within the scope of the instant invention contemplate a robust return capability. Thus, not only may a user be presented with control buttons which return the user to a predefined location, but also when the end of a branch is reached, the user may be automatically returned to a predefined location. Such a predefined location can be any where within the current lesson or, perhaps, in a different lesson.

Another option is for the user to display the next page or previous page of the lesson. This step is indicated by next/previous page step 38 in FIG. 2. If this option is selected, the appropriate page will be extracted from lesson data store 20 and presented to the user as previously described. If there are no more pages to be displayed, other action may be initiated. For example, the current page can be displayed. As another example, the display portion may enter a mode where the user is asked questions. As a still further example, when the option is not available, the control button can be disabled.

In order to provide extended capability beyond the basic resources to a page, special regions called "hot spots" may be defined on the page. When these regions are selected or activated by a user, an action can occur. For example, the branching capability previously discussed can be implemented via a hot spot. When the user activates this hot spot, the previously defined branch would be taken.

Another potential use of a hot spot is as a field. A field hot spot can be used to display additional information when activated. For example, when the field is activated, a sound may be presented to the user. As another example, a video may be displayed, or a text box or other information may be displayed. Thus, fields can be used to enhance the presentation of information to a user. Returning to FIG. 2, field step 40 shows that the action which has been bound to the field is performed and the information on the page continues to be displayed.

Other uses for such hot spot regions may also be developed. For example, the concept of control buttons which direct the system to perform certain actions can also be implemented via this technology. The examples given are thus not be construed as limitations in this patent.

As demonstrated in the background section, current learning, response, and evaluation systems have limitations on their ability to provide effective feedback to a user. In order to overcome these limitations, one preferred embodiment contemplated within this invention has the ability to enter a study mode. In FIG. 2, this capability is represented in study mode step 42. This mode can be available at virtually any point in a lesson. When study mode is selected by a user, the presentation portion generates test questions for the page and fields currently displayed. The user selects and appropriate answer which is evaluated. The system keeps track of the score achieved by the user.

In study mode, it is possible to develop a wide variety of exit rules. Exit rules are designed to exit the study mode when a specific event occurs. For example, a control button may be provided which allows the user to exit the study mode at will. As another example, the system may be directed to ask a predetermined number of questions and exit when the questions have been asked. As still another example, the system may ask a predetermined number of questions after which the user's score is evaluated. If the score is above a certain threshold, then the study mode will be exited. If, however, the score is below the threshold, then an additional set of questions may be asked.

In one preferred embodiment, the exit rules are determined by the author when the lesson is constructed. In another preferred embodiment, the exit rules are set by the user. In another preferred embodiment, different aspects of the exit rules are determined by the author and the user. As demonstrated by these examples, a wide variety of exit rules are possible and the examples given should not be interpreted as limiting the scope of this invention.

Upon exiting from the study mode, a wide variety of options are available. In one embodiment, upon exiting, the presentation portion returns to the page which was displayed before study mode was entered. In another embodiment, the presentation portion displays the next page of the lesson. In still another embodiment, the user is presented with a list of options from which to choose what action the presentation portion should take.

Since scores are evaluated when the study mode is entered, if a user utilizes the study mode for most or all of the information presented, an overall score covering the material in the lesson can be presented to the user without the need to resort to an overall examination on all material contained in the lesson. Furthermore, if desired, the user can receive a current score at any point in the lesson. This ability to provide scoring information at any point in the lesson greatly increases the effectiveness of feedback to the user. The user is able to evaluate how well the material is being learned while the learning process is still occurring. Thus, users are more likely to continue to study information that is not well learned rather than moving on to other topics. This ability, then, represents a significant improvement over tests where feedback is provided to the user after the focus of learning has shifted to new material.

A wide variety of scoring rules may be developed for use with the instant invention. In one embodiment, simple rules are contemplated. Such rules can include keeping track of the number of questions answered correct and the number of questions answered incorrect. If questions of a multiple choice format are asked, the question can be allowed to stay on the screen until the correct answer is selected. In this instance, a variable number of points may be awarded based on how many tries it takes to select the right answers. For example, if the correct answer was selected on the first try, 4 points may be awarded. If selected on the second try, 2 points may be awarded. Finally, 1 point may be awarded if the answer is selected on the third try. No points would be awarded for any subsequent selections.

More complicated scoring rules may also be developed. Such scoring rules include rules which deduct the number wrong from the number right. Further, testing theories could be used to develop still more complicated rules. Such rules would be useful, for example, if the system was being used to determine the likelihood of mastery of a given subject. Further, such rules would be necessary if scores from one person on one test were to be scaled relative to scores from another person on another test. Those skilled in the testing art would be able to develop such scoring rules.

Finally, a wide variety of options can be developed to display scoring information. In one embodiment, scores are displayed continually. In another embodiment, scores are displayed when requested by a user. In still another embodiment, scores are unavailable to the user and are only available to an instructor or teacher. Further, scores may be cumulative, or may be broken down by topic or section.

In order to further enhance feedback, it may be desirable to present a test covering all information in the lesson. In one preferred embodiment, this is achieved by entering an exam mode. In FIG. 2, this mode is illustrated by exam mode step 44. When exam mode is entered, questions over all material in the lesson are generated and presented to the user. Answers to the questions are evaluated and a score is kept. The score may be presented to the user as questions are asked and answered, or the score may be held until the exam mode is exited. In addition, the score may be held until the details are requested by the user. Finally, the score may be unavailable to the user and only available to a teacher or instructor.

As in the study mode discussion, the exam mode may be provided with exit rules. The exit rules may be determined by the author, the user, or a combination of both. Again a wide variety of exit rules are possible. By way of example and not limitation, one possibility is to exit the exam mode when requested by the user. Another possibility is to exit the exam mode when a determination has been made that the user has either mastered the material or has clearly not mastered the material. Such an exit rule would probably require application of various testing theories which are known to those skilled in the testing art. As another example, the exit rules may require a certain number of questions to be answered correctly before the mode is exited. As a final example, a specified number of questions could be asked, and depending on the score achieved, the mode can be exited or further questions can be asked.

Upon exiting, a determination must be made as to what should occur. For example, one possibility is to exit the lesson when the examination mode is exited. Another possibility, is to allow the user to return those sections of the material where further practice is needed. For example, if a user determines that they do not know the answer to questions regarding a certain topic, the user may chose to exit in such a manner as to bring the information on that topic to the screen. Alternatively, it may be possible to exit the exam mode in such a way so as to start another lesson. Other exit rules may be available and the type of exit rule employed should not be interpreted as limiting the scope of this invention.

It will be appreciated that the learning, response, and evaluation system can have numerous other capabilities. For example, lessons can be organized in order to present a table of contents to enable the user to go directly to that part of the lesson which is of most interest. In addition, a search capability may be included. Such a capability may be structured in order to allow the user to find a particular word or topic. Alternatively, such a search capability may allow the user to locate and go to a particular page in the lesson. Furthermore, a scan capability can be also included. Such a capability would allow the system to begin at a particular point in the lesson and present a page for a length of time before automatically presenting the successive page. In this manner, a user can quickly review a particular set of pages in a lesson without manually moving through the pages.

In addition to these capabilities, it is also possible to include a third testing capability. For example, the presentation portion of the system could be structured to keep track of the information seen by the user. A test could then be generated which covers only that material in which the user has studied. In addition, the system can keep track of the scores during the study mode and the exam mode or in a mode which tests on the materials seen by the user, the system would then emphasize questions where the user has displayed a particular weakness. In this manner, the user would be queried more on the material they had yet to master than on the material they had already mastered.

Figure 3:
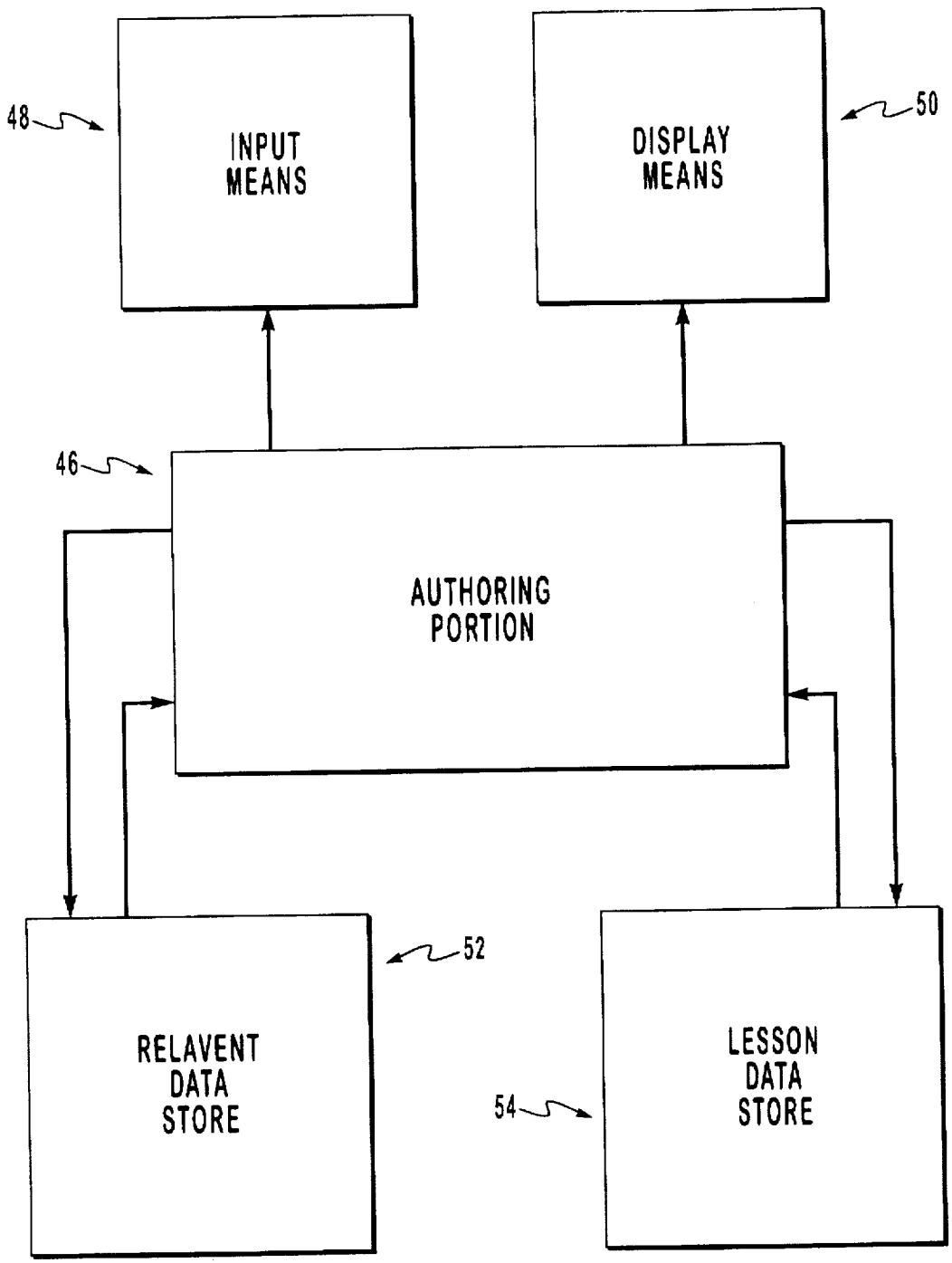
FIG. 3 top level is a structural diagram of an authoring portion of one preferred embodiment.

FIG. 3 presents a top level structural diagram of the authoring portion of the learning, response, and evaluation system. As previously discussed in conjunction with the presentation portion, authoring portion 46 is also encoded in software which is loaded onto the hardware platform to be executed by the CPU. The software may reside on a plurality of storage media known to those skilled in the computer art. By way of example, and not limitation, such storage media can include fixed or removable disks, CD-ROM, ROM, RAM, or any other computer readable media.

Authoring portion 46 receives input from input means 48 and displays information on display means 50. Input means 48 and display means 50 are part of the hardware platform as previously described with regards to the presentation portion. Thus, input means 48 comprises such elements as a keyboard, mouse, pen, voice input system, and the like. Display means 50 comprises such elements as a screen to display text and graphic material. Display means 50 also comprises means to play a sound for the user. Sounds include any sound which may be relevant to the lesson such as voice or music.

As illustrated structurally in FIG. 3, the primary focus of the authoring portion is to take data from relevant data store 52 and organize it into the proper format for inclusion in lesson data store 54. Lesson data store 54 is simply a name for the file containing the lesson data. Relevant data store 52 and lesson data store 54 typically reside on the hardware platform's permanent storage media such as a removable or fixed disk or CD-ROM. The specific concepts embodied in this invention are designed to provide an intuitive set of tools which allows an author to quickly and easily take a pool of data from the relevant data store and organize it into a lesson. The inventive concepts embodied herein allow the lesson data store to be produced without conventional programming. In combination, the concepts presented and embodied in this invention provide two fundamental benefits over the prior art. First, the time needed to develop a lesson by organizing relevant data into lesson data is dramatically reduced. Second, because the inventive concepts are combined in a unique manner, use of the authoring portion is highly intuitive. Thus, the time it takes to learn how to operate the authoring portion is dramatically reduced.

Figure 4:
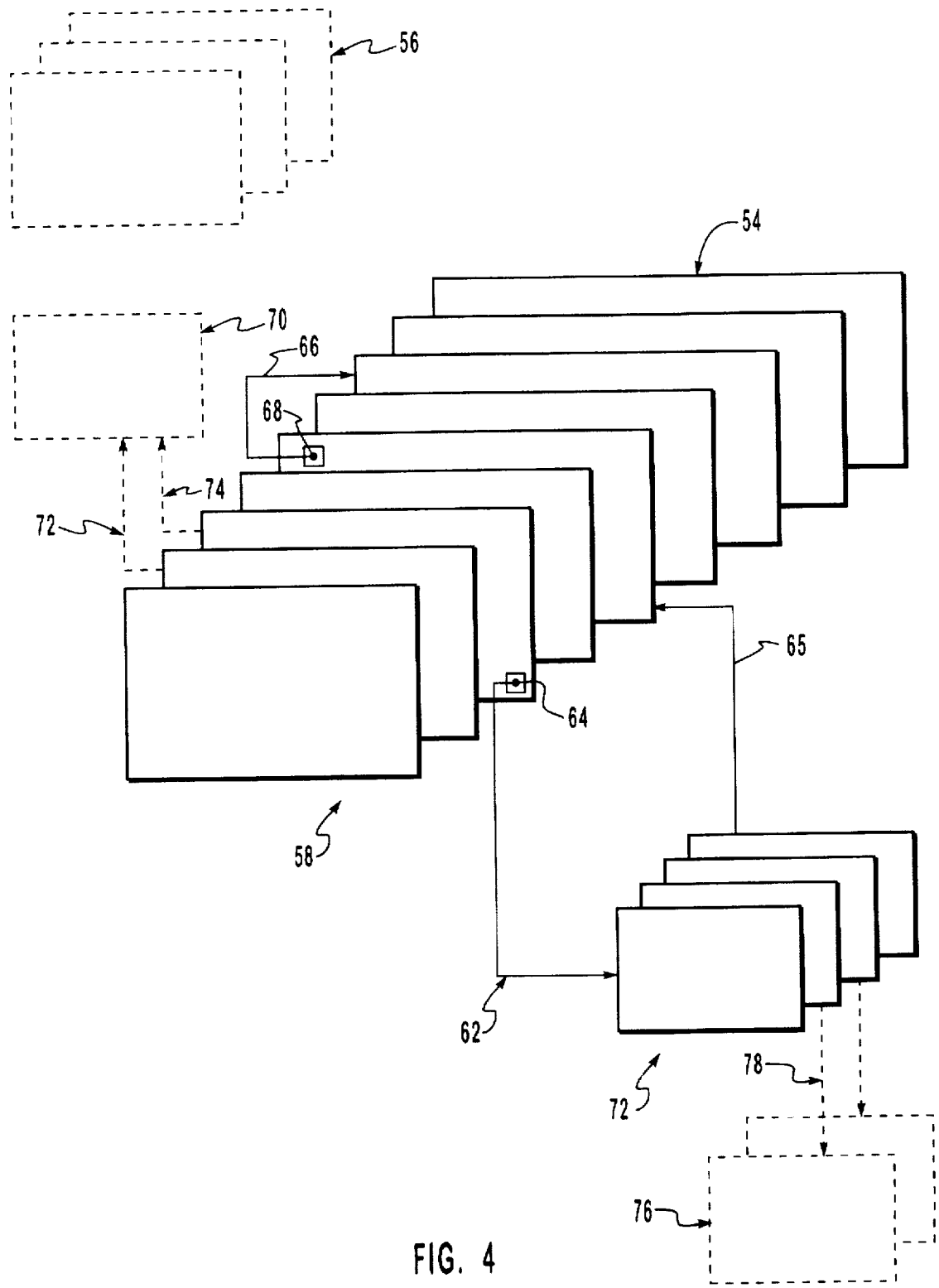
FIG. 4 is a diagram illustrating the page format of a lesson.

Referring first to FIG. 4, a conceptual representation of a lesson is presented. As previously discussed, in one preferred embodiment a lesson is organized into pages. A page is a unit of information and can contain a plurality of resources. Possible resources include text, graphics, and sound. In one preferred embodiment, a plurality of page types have been defined. Page types can include both visible pages and hidden pages. Visible pages are those pages which will be shown to the user when the lesson is activated via the presentation portion. Hidden pages are those pages which contain information which is not directly presented to the user in a form which is to be learned. The use of hidden pages will be explained in greater detail in the discussion describing how questions are generated presented later.

As depicted in FIG. 4, visible pages 54 are arranged so that they may be presented in a variety of ways. For example, FIG. 4 depicts a lesson which has a main pathway, shown generally as 58, where visible pages 54 are presented in a nominally sequential manner. All lessons, however, do not need to be organized in this manner. The authoring portion allows a developer or author to have ultimate control over any and all pathways which a user of the lesson may potentially take. For example, the lesson in FIG. 4 has a branch path, shown generally as 60, which may be reached by activating branch link 62 which has been tied to hot spot 64. In addition, the lesson in FIG. 4 also has a branch defined through the main pathway. This branch is taken by activating branch link 66 which is tied to hot spot 68. This branch illustrates that branches may be defined through any number of visible pages.

Returning again to branch path 60 which is reached through branch link 62, a feature of one preferred embodiment of the present invention is illustrated. As depicted in FIG. 4, branch path 60 is reached only when the user activates hot spot 64. Thus, if the user went through the lesson without activating hot spot 64, the information in branch path 60 would never be presented to the user. In contradistinction, the pages reached via link 66 when hot spot 68 is activated would have been reached any way if the user had continued through the lesson main path.

Also illustrated in FIG. 4 is return link 65. Return link 65 is used to determine what happens when the end of branch path 60 is reached. In the embodiment shown in FIG. 4, return link 65 takes the user to a point in the lesson different from where the user initiated the branch. As previously discussed in the section describing the presentation portion, such a return link may be utilized to return to a variety of locations. For example, return link 65 could be used to return the user to the initial page which initiated the branch. As another example, return link 65 may be used to move the user to a particular point in the lesson where questions are generated.

In addition to the single return link shown in FIG. 4, it is possible to generate a plurality of return links from branch path 60. For example, each page in branch path 60 may have a control button which allows the user to return to the main path in a predetermined location.

When presenting data to the user, it is often useful to distinguish between data which is presented solely for informational purposes and data which is to be learned. Thus, in order to provide the mechanism for the system to distinguish between these two types of information, a data page and a presentation page is defined in one preferred embodiment. In this preferred embodiment, a data page is utilized to present information which is to be learned by the user and which is to be included in any test questions which are generated. A presentation page, on the other hand, is utilized to present information to the user but will not be utilized in generating test questions.

It is possible to define any number of different types of data pages which would be useful in a particular preferred embodiment. For example, in one preferred embodiment it is useful to distinguish between information that is to be presented to the user and also included in test questions and information which is to be presented to the user but not included in test questions. In addition, it is useful to distinguish between pages in a lesson's main pathway and pages in a lesson's branch pathways. In one preferred embodiment, therefore, four different types of visible pages are defined. A presentation page, which is used to present information to a user along the main pathway, but which is not used in generating test questions. A branch presentation page which is used to present information to the user a long a branch pathway but which is not used in generating test questions. A data page which is used to present information to a user along a main pathway and which is used to generate test questions presented to a user. A branch data page which is used to present information along a branch pathway and which is used to generate test questions. In a preferred embodiment of the authoring portion, the author is presented with a simple method of defining which of the available page types are to be used for the current page being developed. Such a method may consist of a status line which shows the author what the current page type is and a control box which allows the author to quickly change the page type of the current page being developed.

In order to enhance the learning process and to more fully determine what level of skill has been obtained, it is often desirable to test on principles which have not been directly presented to the user and which are only analogous to those which have been presented to the user. Although there are many potential ways to identify information which should be used in testing but which should not be presented to the user, in one preferred embodiment, a hidden page type is used. In FIG. 4, hidden pages 56 are represented by phantom lines.

Depending on the particular type of lesson and the information involved, certain analogous information may be relevant to the entire lesson. Other analogous information, however, may only be relevant to a single page or a group of pages. In order to identify the portion of the lesson which is relevant to the analogous data contained on hidden pages, one preferred embodiment utilizes hidden page links. When information contained on a hidden page is relevant only to a particular page or a particular group of pages that information may be linked to those specific pages with hidden page links.

In FIG. 4, hidden page 70 is relevant to only two visible pages. Hidden page 70 is thus linked to those relevant visible pages by hidden page link 72 and hidden page link 74. Hidden data page 76, however, is only relevant to a single visible page. Thus, hidden page 76 is linked to the single relevant hidden page by hidden page link 78. In contradistinction, the group of hidden pages identified generally by 56 are relevant to the entire lesson. Thus, these pages are not linked to any specific page. It will be appreciated that other methodologies could be developed which identify the applicability of a page of hidden data. For example, hidden pages may have associated with them a scope parameter which identifies the range of pages in the lesson which are relevant to that page. In addition, default rules of association may be developed. The manner in which hidden pages are associated with visible pages has been given by way of illustration and should not be considered limiting of the scope of this invention.

Because of the wide variety of information that can be presented via the individual resources owned by a page and given the virtually infinite way in which pages may be organized into a lesson, it is imperative that the authoring portion include a robust set of tools which allows an author to quickly and easily assemble information into a completed lesson.

Figure 5:
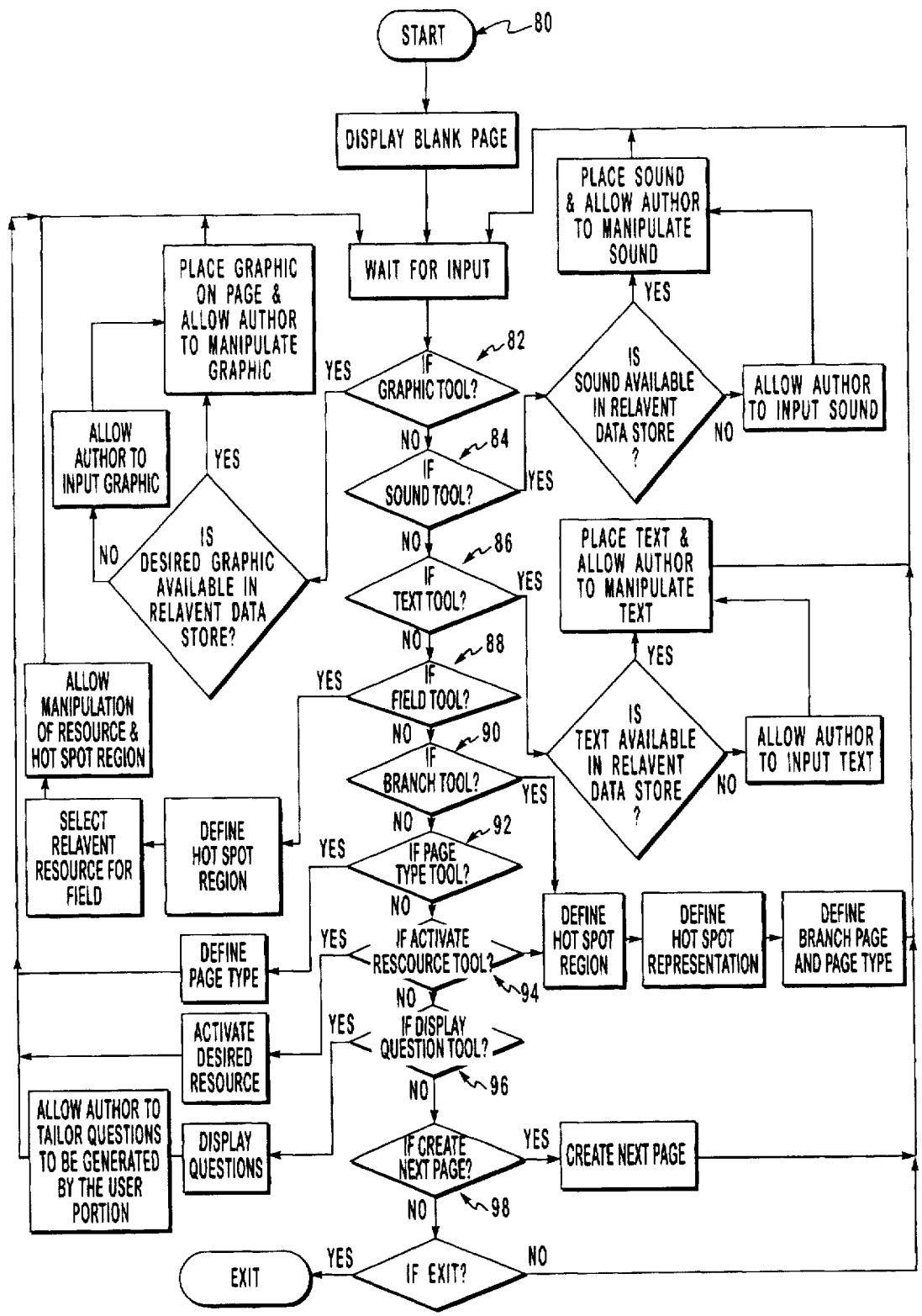
FIG. 5 is a basic flow chart showing how an author would execute options presented in the authoring portion of a preferred embodiment.

Turning next to FIG. 5, a basic flow diagram of one preferred embodiment within the scope of this invention is presented. In this preferred embodiment, it is desirable to allow the author to arrange data from the relevant data store into the appropriate page format without programming. This requires that the authoring portion present to the author a display which replicates what the user will see when the lesson is presented via the presentation portion. Thus, it is preferred at the present time that the display and authoring portion be presented in a WYSIWYG (what you see is what you get) format.

Since the data for a lesson is organized in pages, a simple, intuitive mechanism for allowing the author to view different pages must be presented. In one preferred embodiment, pages are displayed by activating a control button. In this embodiment, control buttons are provided which allow the author to move both forward and backward to successive pages. If the lesson is to contain visible pages and hidden pages, it is desirable to allow the author the alternative of moving through the lesson in such a way as to display both the visible pages and the hidden pages as well as in a way which allows the author to move through the lesson so that only visible pages are displayed. In one preferred embodiment, two sets of control buttons are provided. Depending on the set of control buttons activated, the authoring portion will either display only those pages visible to the user or will display both hidden pages and pages visible to the user. It is possible to utilize these control buttons to create a new page when the end of the available pages are reached. Alternatively, a separate control button to create a new page may be provided.

Since the purpose of the authoring portion is to allow an author to rapidly create a lesson by organizing relevant data into the proper format, means for quickly and easily handling various resources which are to be placed on a page is necessary. There are many ways of providing such a means. One way of providing such a means is to have a command line where the author enters commands which cause the authoring portion to place resources at various points on the page. In the alternative, selections or list boxes may also be used. In the presently preferred embodiment, however, a series of control buttons is used to provide "tools" which are utilized by an author to quickly and easily manipulate resources which are to be placed on a page. Potential resources which can be placed on a page include graphics, text, and sound. Individual tools tailored to manipulating each of these resources are thus desired in the preferred embodiment.

Turning now to FIG. 5, when the authoring system is first activated, the sequence begins at start step 80 and displays a blank page and waits for input from the author. If the author selects the graphic tool, as indicated by graphic tool step 82, in the preferred embodiment, the authoring portion allows the author to specify if the graphic is currently available in the relevant data store. As used herein, relevant data store refers to one or more files which are available to the authoring system in a format which can be used. If the desired graphic is available in such a format, the authoring portion places the graphic on the screen and allows the user to manipulate and position the graphic.

If, however, the graphic is not available in the relevant data store, in a preferred embodiment the authoring portion allows the user to input the graphic. The graphic may be input in a variety of ways. One such way would be to open a conventional drawing program and allow the user to draw and craft the graphic. Another method is to allow the user to scan the graphic into the system by way of a scanner. Still other methods may be to load the graphic from a removable disk, phone line, and the like. Once the graphic is in the relevant data store, then the authoring portion places the graphic on the page and allows the user to manipulate and position the graphic.

In order to allow the author to craft the page in the desired manner, a wide variety of manipulation capabilities may be provided. Such capabilities may allow the author crop the graphic. Cropping consists of cutting away a portion of the graphic and leaving only the portion desired by the author. Additional capability such as allowing the user to rotate, scale, flip, or invert the graphic may also be provided. Further capability such as allowing the author to modify the graphic through any number of conventional drawing tools such as shading, blending, erasing, drawing, and the like may also be provided.

The author must also be able to rapidly place the graphic in the desired location on the page. A wide variety of positioning methods may be utilized. For example the user can input a location which is used by the authoring portion to place the graphic. In the presently preferred embodiment, however, the author simply "drags" the graphic to the proper location in a manner typically used with graphical user interface (GUI) environments. A variety of positioning aids may also be provided. Such aids can include grids and grids lines, spacing aids which equalize space between objects, and alignment aids which align various portions of various objects.

Since a graphic resource includes not only still pictures but also video pictures, special tools designed to handle video pictures may also be provided. In addition to the tools which are useful for still graphics, additional capabilities such as the ability to control the speed of the video, the ability to overlay information on various video frames, the ability to synchronize a video resource and a sound resource, and the like may also be provided.

While many methods are available to allow the user to invoke these capabilities, in the presently preferred embodiment such capabilities are invoked through the control buttons, list boxes, menus, and the like common to GUI type operating environments.

Another resource that can be utilized on the page is a sound resource. This is illustrated in FIG. 5 by sound tool step 84. As with graphic resources, in the presently preferred embodiment, when the sound tool is activated, the authoring portion allows the author to locate a desired sound resource in the relevant data store. If the sound resource is not available in the relevant data store, the authoring system will then allow the user to input the sound resource. Inputting a sound resource may involve direct recording of the author's voice, music, or other sounds. Alternatively, inputting a sound resource may involve recording the sound from another storage medium such as a compact disk, an audio tape, a video tape, or other source. Furthermore, inputting a sound resource may include copying it from one computer medium to another such as loading by removable disk, phone line, network, and the like.

Once the relevant sound resource has been selected, the authoring portion places the sound resource in the page and allows the author manipulate the sound resource. Unlike a graphic, a sound resource has no inherent visual representation. The author must therefore decide how to display the sound resource to the user. One possible method of displaying the sound resource to the user is to set the sound to play immediately when the pages presented to the user. If such an option is selected, the author does not need to create any visual representation of the sound resource. When the page is presented, the sound will automatically begin playing.

Alternatively, it may be desirable for the sound resource to be activated only in response to some input by the user. If this option is selected, the author must create means by which the user can access the sound. Such means may include a visual representation in the form of an icon, a button box, or other similar visual representation. These visual representations may be implemented via the hot spot capabilities previously described in the presentation portion of this disclosure. In order to facilitate development of a visual representation of a sound, a wide variety of tools may be provided to the author. Such tools may include the capability of crafting a hot spot along with a desired visual representation such as an icon, text box, and the like. Such tools would preferably contain the ability to manipulate bit maps, icons, text, and other drawing objects. Alternatively, the authoring portion can automatically crate a standard visual representation which may be changed by the author if desired.

Furthermore, means to easily position the visual representation of the sound may also be included. In the presently preferred embodiment, it is desirable to allow the user to "drag" the visual representation to the proper location in a manner common to GUI operating environments. Furthermore, positioning aids may also be included. By way of example and not limitation, positioning aids can include grids and gridlines, aids which help space objects on a page, and alignment aids which align various locations of multiple objects. Additionally, the authoring portion can automatically position a visual representation which can then be changed by the author if desired.

Tools to manipulate the sound itself may also be provided. One capability that can be provided is the ability to speed up or slow down the sound. The ability to cut the sound off at a particular point, the ability to emphasis or de-emphasis specific frequency bands, and the ability to mix multiple sounds may also be desired. If a video graphic is provided, the ability to synchronize the video and a sound resource may also be desirable. Other sound manipulation tools may also be provided.

Another resource which can be included on a page is a text resource. As with the graphic resources and sound resources, in one preferred embodiment a text tool is made available to the author. This is illustrated in FIG. 5 by text tool step 86. When activated, this text tool allows the author to locate the desired text in the relevant data store. If, however, the text is not available in the relevant data store then in one preferred embodiment the text tool allows the author to input the desired text. Inputting the desired text may be in the form of common text editing type tools where the author would type or otherwise input the text. Text may also be input by obtaining relevant text from others sources. Such sources may include removable disk, network, phone line, and the like.

Once the text is available in a form which can be utilized by the authoring portion, the text is then placed on the page and the author is allowed to manipulate the text. In this context, manipulation of the text may occur by editing, highlighting, reformatting, or otherwise changing the visual presentation of the text. This includes modification of the display font, type face, and type size, as well as modification of the region over which the text will be displayed.

In the portion of this disclosure which discusses the presentation portion, the concept of a field was introduced. In one preferred embodiment, a field may be used to enhance and modify the information which is presented on a page. For example, when a field is activated by the user a sound may play, a video may play, a picture may be displayed, or text may be displayed. Fields provide a way for an author to present some information only upon activation by the user.

In order to provide this capability, one preferred embodiment of the authoring portion contains a robust set of tools to allow an author to quickly and easily craft a field. In FIG. 5, this is illustrated by field tool step 88. In one preferred embodiment, fields are activated via a hot spot. Thus, in this embodiment the first step in defining a field is to define the hot spot which will activate the field. Hot spots may be defined in a wide variety of ways. One way to define hot spots is to graphically select a portion of the page which will be used to define the hot spot. Such a graphic selection may be of any shape and size. Since any region of the page may be selected as a hot spot, hot spots which are used to activate fields may overlay other resources which have been placed on the page. For example, a graphic may have a portion defined as a hot spot. Thus, fields may be tied to a particular portion of a graphic which is located on the page.

Once the hot spot has been defined, in one preferred embodiment the next step is to select the resource which will be bound to the field. In one preferred embodiment, any resource available to the page may be bound to a field. In other embodiments, it may be desirable to restrict the type of resources that may be bound to a field. Because of the flexibility of fields, authors may select the type of action which into occur when the field is activated. For example, if a sound is bound to a field, when the field is activated the sound will play. On the other hand, if a video graphic resource is bound to the field, the video will play. If the resource is a picture graphic or text, the resource will be displayed at a particular location when the field is activated. Thus, once the resource is selected, the author need only specify where the resource will be displayed if the resource is of a visual type.

In order to provide maximum flexibility and ease of use, resources should be loaded from the relevant data store or input as previously described in graphic tool step 82, sound tool step 84, or text tool step 86. In addition, once the resource is available, in one preferred embodiment the authoring portion allows the author to manipulate the resource as previously described in graphic tool step 82, sound tool step 84, and text tool step 86.

Since fields are implemented using hot spot technology, when a user activates a field it may be desirable to provide some sort of visual or audible feedback that the field has been activated. In order to facilitate this capability, a preferred embodiment of the authoring portion includes the ability to define a feedback mechanism when a field is activated. Such a feedback mechanism may be to invert the color of the field, frame of the field, provide an audible response such as a sound, and the like. If such a capability is defined, it is desirable to provide tools to allow the author easily and quickly manipulate such effects.

In a preferred embodiment, it is possible to define many pathways through the data which comprises a lesson. Thus, the data in the lesson may be presented hypersequentially to the user. This involves creating branch links between various pages. It also may involve utilizing branch page types. In such a preferred embodiment, a branch tool is provided. Such a branch tool is illustrated in FIG. 5 by branch tool step 90. A branch tool allows an author to define branch links between pages in order to enhance the ability of the user to access information in an intuitive manner.

In order to provide branch capability, means for activating the branch must be provided. In one preferred embodiment, the means for activating a branch comprises a hot spot. Thus, in FIG. 5 one embodiment first asks the author to define the hot spot region which will be associated with the branch. Since any portion of the page may be defined as a hot spot, branches may be indicated by a variety of resources. For example, it may be preferable to bind an icon, text, picture, or other visual indication to the hot spot in order to alert the user that a branch is available.

In order to allow the author to quickly and easily define a hot spot representation, a set of tools suited for this purpose may be provided. Such a set of tools would draw on capabilities like those defined in graphic tool step 82, sound tool step 84, text tool step 86, and the like. By allowing to quickly and easily manipulate and define hot spot representations, the time necessary to develop learning application is decreased. Alternatively, the authoring portion may define a standard representation which may be modified and/or repositioned by the author if desired.

Once the visual representation of the hot spot is defined, the authoring portion may then present means for allowing the author to define the page to which the branch is linked. Although many potential representations of this capability are possible, in the presently preferred embodiment it is desired that menus, list boxes, icons, and other visual resources common to GUI operating environments will be used to construct such a representation. For example, in one preferred embodiment, the screen may present a plurality of pages contained in the lesson. The author can then define links between pages by graphically drawing a line between the pages which are to be linked. In another embodiment, a list of pages are presented to the author from which the branch page may be selected. In a further embodiment, the authoring portion allows the branch to be created page by page.

In one preferred embodiment, visible pages are divided in to regular pages and branch pages. Branch pages are those pages which are not accessible to the user except through activation of a particular branch. In this embodiment, the branch tool allows the author to define the page type which is utilized in the branch.

As previously discussed, an embodiment may distinguish between several different page types. This is represented in FIG. 5 by page type tool step 92. Distinguishing between various page types allows a particular embodiment to treat information contained on different pages differently. In one preferred embodiment four visible page types are defined. These page types are a data page type, a presentation page type, a branch data page type, and a presentation data page type. Presentation data page types are used to contain information that will be presented to the user but which will not be included when questions are generated. Data page types include information which will be presented to the user and which will be used to generate questions. Branch presentation page types are used to present information in a branch which will not be used to generate questions but which will be presented to the user when the branch is taken. Branch data page types are used to present information to the user which will be used in generating questions and which will be visible when a branch is taken.

In addition to visible page types, hidden page types may also be defined for a particular embodiment. In one preferred embodiment, four hidden page types are defined. A hidden data page, a question page, a right answer page, and a wrong answer page are all used to contain information which will not be presented to the user but which will be used to generate questions. Discussion of the hidden page types and their use in question generation is presented later.

As illustrated in page type tool step 92, an author can select which page type he would like to create. Although a wide variety of methods may be used to implement this capability, the presently preferred method is to utilize menus, tool buttons, list boxes, and other resources common to GUI operating environment. Furthermore, when hidden data pages are created, an easy way to define the scope of applicability of the hidden page is provided in one preferred embodiment. As previously illustrated in FIG. 4, by creating hidden page links between visible pages and hidden pages the scope of applicability of the hidden page can be limited. Similarly, if a hidden page is created without a hidden page link the scope of applicability is assumed to be the entire lesson.

In the presently preferred embodiment, a means to quickly and easily define the scope of a hidden page is included. In one embodiment, such means comprises a visual representation of hidden and visible pages and the author is allowed to graphically create links between them by drawing lines. In another embodiment the author is allowed to define links by selecting the pages which are relevant to a particular hidden page or group of hidden pages. In another embodiment lists are presented to the author from which the scope of a hidden page or group of hidden pages can be defined. In still another embodiment, default rules of association may be used. Other embodiments are also possible and the method of defining the scope of applicability of hidden pages should not be limiting of the scope of this invention.

Because the goal of the authoring portion is to reduce both the time it takes to develop a lesson and to reduce the time it takes an author to master the use or the authoring portion, in the presently preferred embodiment a WYSIWYG approach is utilized. In this approach, the lesson page is presented to the author in the same manner and format as it is presented to the user in the presentation portion. In order to more fully implement what the user will see in the presentation portion, means for activating resources may be included. In one preferred embodiment, the means for activating resources comprises means to activate sounds, video, branches, and fields. In FIG. 5, this capability is illustrated by activate resource tool step 94. When the activate resource tool step is selected, the desired resource is activated in the same manner in which it is activated for the user. For example, the activate resource tool step may include a button which causes the sound resources on the page to be played. Similarly, the activate resource tool step may include a button which causes video resources available on the page to play. In addition, means may be included by which the hot spots on the page can be activated. Thus, the author can see how the page will interact with a user when a branch is activated or when a field is activated.

One primary advantage of the instant invention over the prior art is the ability to generate a lesson with testing and question capability without ever generating any questions. In other words, the instant invention takes the data available in the lesson and creates or generates questions from the data. Thus, an author need not generate questions when the lesson is created. In order to provide such capability, means for generating questions are included in one preferred embodiment. The means for generating questions is illustrated in FIG. 5 by display question tool step 96.

In one preferred embodiment, questions are generated at two fundamental times. The first event that will cause questions to be generated is when display question tool step 96 is selected in the author portion. Another event that will cause questions to be generated is when the user selects a particular mode in the presentation portion. In one preferred embodiment of the presentation portion, such modes include the study mode and the exam mode. In one preferred embodiment, questions are generated by the authoring portion and by the presentation portion in exactly the same manner. In another preferred embodiment, the questions are generated by the authoring portion and the presentation portion in exactly the same manner except that the presentation portion generates the questions in a random fashion whereas the authoring portion generates the questions in a non-random fashion.

When the system generates questions, each question has three parts. The first part is the question part. The question part is the actual question that is asked. The next part is the right answer part which represents the right answer to the question. Finally, there is the wrong answer part. The wrong answer part comprises one or more wrong answers to the question.

In general, the question generation process pulls the question part, the right answer part, and the wrong answer part from the various resources contained on various pages located in the lesson. When questions are generated, a question template or format is utilized. The particular type of format used is dependent upon the resources selected for the question part, the right answer part, and the wrong answer part of the question.

In one preferred embodiment, the questions generated are multiple choice type questions. In this embodiment, one resource is selected as the question, and another resource is selected for the right answer part and the wrong answer part. The resources are then arranged on a page and presented to a user according to the type of resource utilized. Thus, if the question part comprised a graphic and the right answer part and wrong answer part comprised a sound resource then, the graphic and a plurality of sound resources would be arranged on the page and presented to the user. The user would then select from among the choices presented.

In one preferred embodiment, a single type of resource is selected for the question part, and a single type of resource is selected for the right answer part and the wrong answer part. In another preferred embodiment, a plurality of resources are selected for the question part and a single type of resource is selected for the right answer part and the wrong answer part. In still another embodiment, a single type of resource is selected for the question part and a plurality of resources are selected for the right answer part and the wrong answer part. In still another embodiment, a plurality of resources are selected for both the question part and for the right answer part and wrong answer part.

In one preferred embodiment, the questions generated also include fill in the blank type questions. In one preferred embodiment where fill in the blank type questions are utilized, the question part of the question comprises a single type of resource and the right answer part and wrong answer part comprise fill in the blank regions. In another embodiment utilizing fill in the blank questions, the question part comprises a plurality of resources and the right answer part and wrong answer part comprise fill in the blank regions.

When questions are presented to a user, the question part and right answer part and wrong answer part can be laid out on the page in any logical manner which accommodates the resources which comprise the various parts of the question. Where a sound resource is presented, the question format can be configured to automatically create a visual representation of the sound which can be activated by the user to hear the sound. When a plurality of resources are used for a single part, the resources can be laid out so as to clearly delineate the question part from the right answer part and wrong answer part. When multiple choice questions are presented, the system can be configured so as to automatically generate control buttons or check boxes which may be activated by a user to select a given answer. When fill in the blank type questions are presented, the system can automatically generate regions for the question to be answered.

Figure 6:
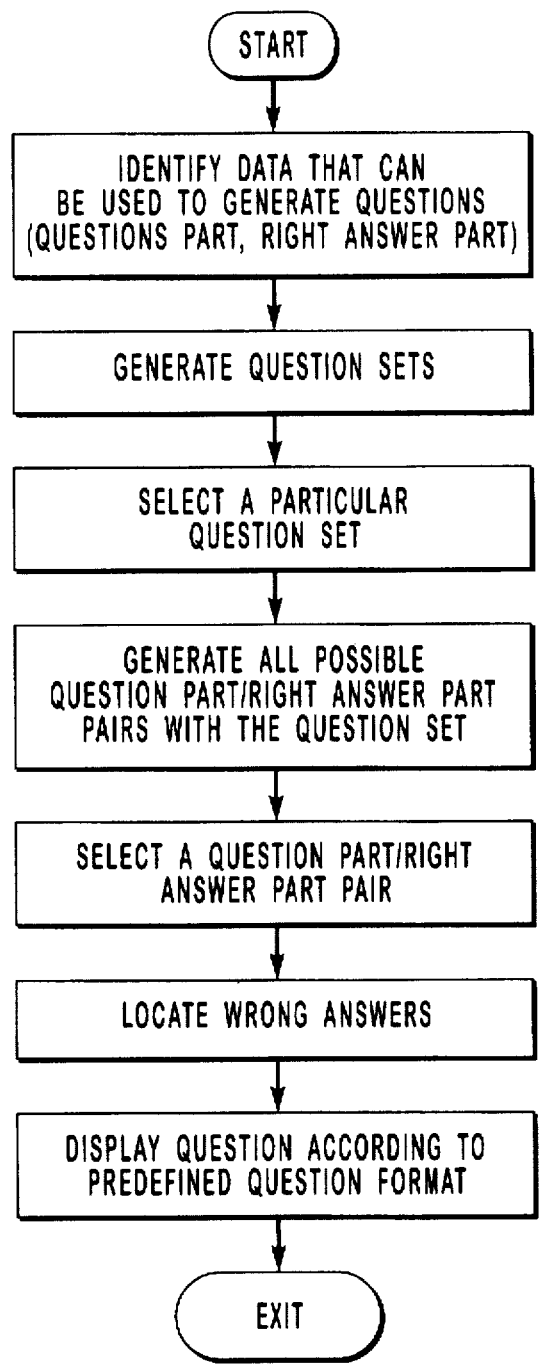
FIG. 6 is a top level flow chart illustrating the question generation process in one preferred embodiment.

Referring now to the FIG. 6, a basic flow diagram of the question generation process is presented. The question generation process begins with the system identifying all data that can be used to generate the question. As indicated in FIG. 6, this includes identifying sources of data for the question part and the right answer part of the question. In performing this search for relevant data, various search methodologies can be utilized. The scope of the search may be dependent upon where the question generation process is invoked. In one preferred embodiment when the question generation routine is invoked via the authoring portion with a data page is displayed, the scope of the search is such that all possible questions which can be asked about that data page can be generated. In another embodiment, when the question generation process is invoked in the authoring portion and the author is testing the questions that can be asked about the entire lesson, the scope of the search is such that all questions pertaining to the entire lesson can be generated. In still another embodiment, when the question generation process is invoked by the user in the presentation portion by study mode step 42, as illustrated in FIG. 2, the question generation process limits the scope of the search so as to include data necessary to generate questions relevant to the current page. In a still further embodiment, when the question generation process is invoked by the user in the presentation portion via exam mode step 44, as illustrated in FIG. 2, the scope of the search is directed to data necessary to generate questions over the entire lesson.

Other embodiments may be developed which tailor the search scope in order to test on various aspects of the lesson. For example, the search scope may be tailored to finding information necessary to generate questions over a particular topic included in a lesson. As another example, the search may be tailored to finding information necessary to generate questions over all material which has been presented to the user but exclude material which has not been presented to the user.

Returning now to FIG. 6, after the data has been identified which can be used to generate questions over the appropriate scope, the next step is to generate question sets. Question sets are used to identify where the question part and right answer part are to be found.

As previously identified, certain embodiments contemplated within the scope of this invention distinguish between various types of pages. In one preferred embodiment, four visible page types (data page, presentation page, branch data page, branch presentation page) and four hidden page types (hidden data page, question page, right answer page, wrong answer page) are identified. When a particular embodiment identifies between different page types, it is often useful to pair the page types in order to identify a question set from which a question including a question part and a right answer part can be generated. In one preferred embodiment, question sets comprise the following combinations: data/data, branch/branch, hidden/hidden, question/data, question/branch, question/hidden, data/right, branch/right, hidden/right, question/right, and field. In this list, "data" represents a data page, "branch" represents a branch data page, "hidden" represents a hidden data page, "question" represents a question page, and "right" represents a right answer page. "Field" represents a field set. In a preferred embodiment, in order for a question set comprising two different page types to be accepted, the two pages must be linked together.

Once the question sets have been identified, a particular question set is selected. In one preferred embodiment, the method used to select a particular question set depends on where the question generation process was invoked. For example, if the question generation process was invoked from the authoring portion, it may be desirable to select question sets in a sequential, non-repetitious fashion. This would allow an author to see all potential questions which could be generated within the given scope. If, however, the question generation process is invoked from the user portion it may be desirable to randomly select from among the available question sets. This would allow questions to be generated in a random fashion which provides better feedback during the learning process.

Returning now to FIG. 6, once a particular question set is selected, all possible question part/right answer part pairs associated with that question set are generated. In order to generate all possible question part/right answer part pairs, means to identify potential question parts and right answer parts must be included. In one preferred embodiment, such means comprises a question matrix. Since each page can contain a plurality of resources and since the information presented to the user on a single page inherently associates data in a "correct" manner, right answers and questions may be pulled from the various resources on a page. Thus, the individual resources on a page may be turned into the question part and the right answer part of a question.

As an example, consider a preferred embodiment where a page may contain a graphic resource, a sound resource, and four separate text resources. From these resources, it is possible to generate questions from each of the individual resources and from combinations of the resources. In one preferred embodiment, the possible question parts for these resources are graphic, sound, text 1, text 2, text 3, text 4, graphic-sound, graphic-text 1, graphic-text 2, graphic-text 3, graphic-text 4, sound-text 1, sound-text 2, sound-text 3, and sound-text 4. The same combination of resources can also be utilized for possible answer parts. In addition, it is possible to identify a fill-in-the-blank answer part. In one preferred embodiment, four separate fill-in-the-blank answer parts are identified.

Figure 7:
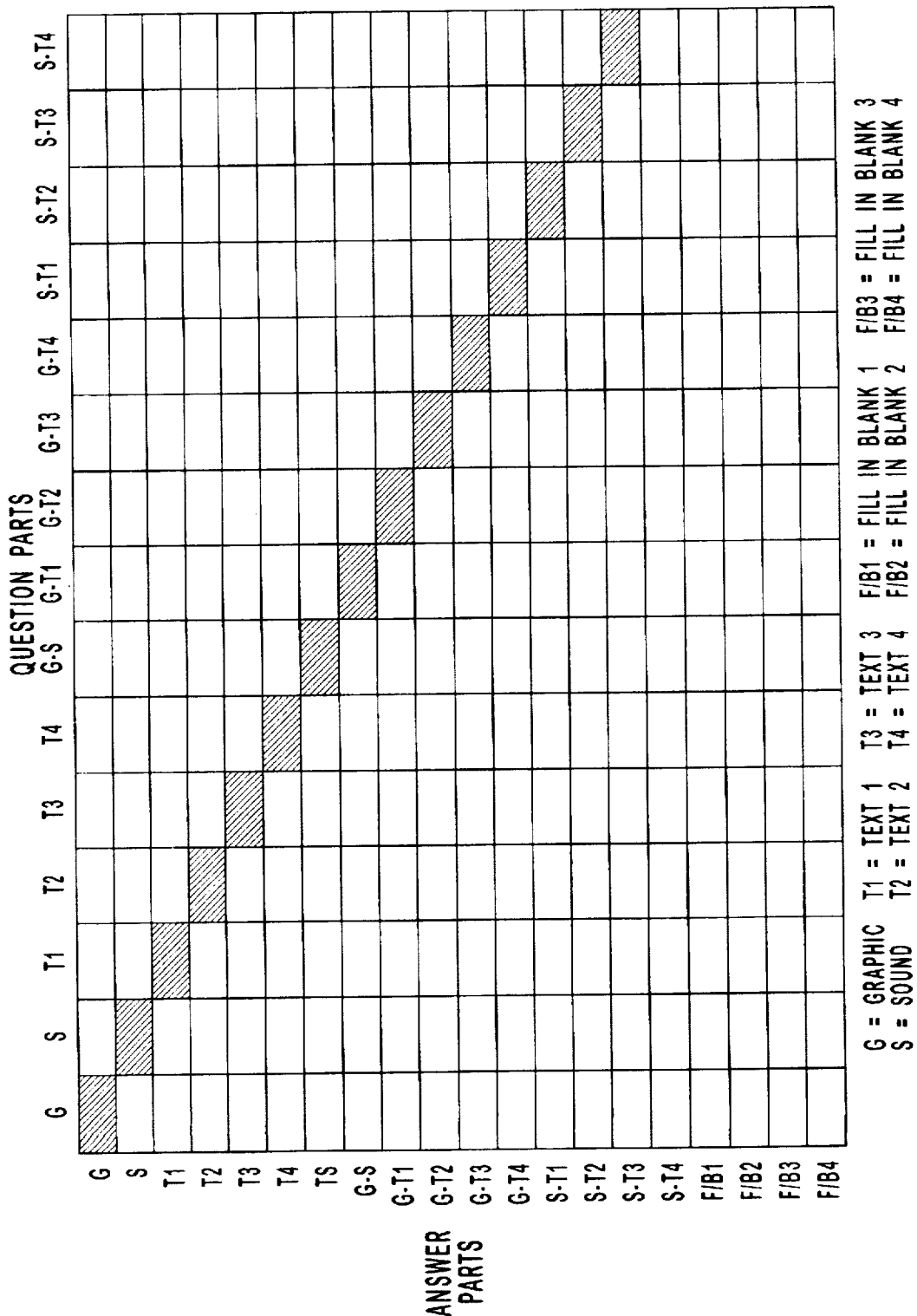
FIG. 7 represents a page question matrix.

Referring next to FIG. 7, a matrix is presented with the question parts along one axis of the matrix and the answer parts along another axis. Each box in the matrix represents a potential question part/answer part pair. As illustrated in FIG. 7, the boxes along the diagonal (such as graphic, graphic sound, sound and the like) have been eliminated since that would represent a question where the question part and the right answer part were identical. Since this is a nonsensical question, these combinations have been eliminated from consideration. Assuming that a page has all of the identified resources, then all remaining boxes represent the potential question part/right answer part pairs that can be generated from this page.

Suppose, however, that a page has only two text resources. In that case, all columns and rows where text 3 and text 4 resources are indicated represent non-possibilities. Such non-possibilities are eliminated from consideration. It will be appreciated that the number and type of resources available on a page is dependent upon the particular embodiment under consideration. The particular resources listed in FIG. 7 should thus not be construed as limiting of the present invention. A like methodology where potential resources which can be utilized as question parts are listed on one axis of a matrix and the potential resources which can be utilized as answer parts are listed on another axis of the matrix. In this configuration, the intersection of the rows and columns, after all useless questions or all non-existing resources have been eliminated represent the potential question part/right answer part pairs available on that page.

Such a question matrix can be generated for each individual page in the system containing information which is to be used in generating questions. In one preferred embodiment, the question set indicates which question matrix should be used. Table 1 contains example question sets and which corresponding question matrix should be used.

TABLE 1

| Question Set | Use Question Matrix from this Page |
|---|---|
| Data/Data | Data |
| Question/Data | Question |
| Data/Right | Right |
| Branch/Branch | Branch |
| Question/Branch | Question |
| Branch/Right | Right |
| Hidden/Hidden | Hidden |
| Question/Hidden | Question |
| Hidden/Right | Right |
| Question/Right (Question linked to Right) | Question |
| Question/Right (Right linked to Question) | Right |

The matrix replicated in FIG. 7 depicts question part/right answer part pairs which can be generated from the resources available on a page. As previously indicated, pages may all so have fields associated with them. Thus, it is possible that the field information may also be utilized to generate question part/right answer part pairs. In order to generate question part/right answer part pairs from field information, a similar methodology as that depicted in FIG. 7 can be utilized with potential question parts being listed on one axis of a matrix and potential answer parts being listed on another axis of a matrix.

As previously discussed, fields are defined by associating an action with a hot spot on a page. For example, when the hot spot is activated, a sold may be played, a video graphic may be displayed, a piece of textural information may be displayed, and the like. Thus, fields associate a particular region of the screen with a particular piece of information such as a graphic, sound, text, and the like.

Figure 8:
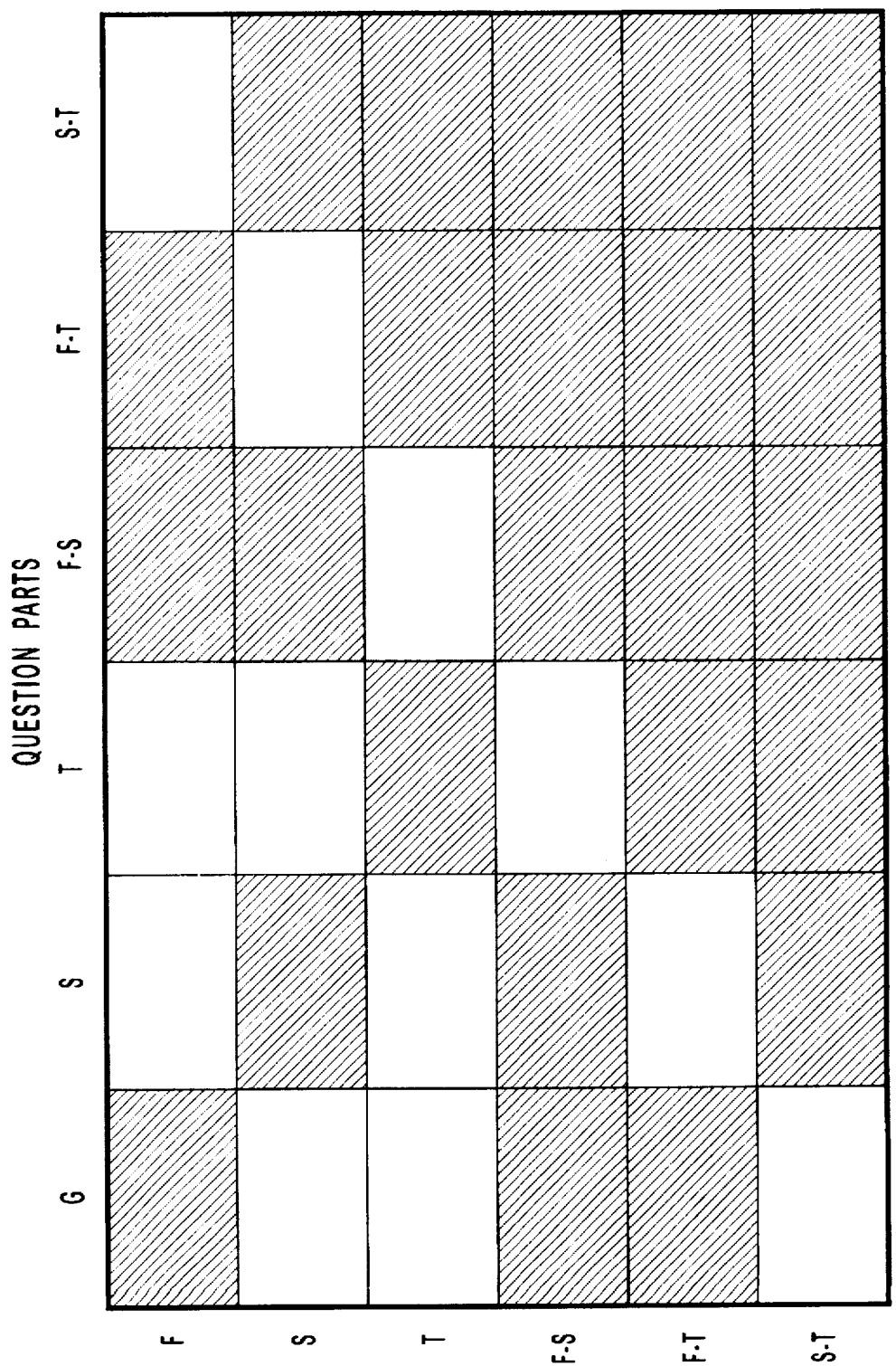
FIG. 8 represents a field question matrix.

In one preferred embodiment the question parts comprise the field, sound, text, field-sound, field-text, sound-text. Answer parts of one preferred embodiment comprise the field, sound, text, field-sound, field-text, and sound-text. FIG. 8 presents the field question matrix for this particular preferred embodiment with the nonsensical possibilities eliminated. What remains, as indicated in FIG. 8, is a total of 12 possible question part/right answer part pairs from the associated field and resources.

As illustrated in FIG. 7 and FIG. 8, various question parts/right answer part pairs are generated from different combinations of resources such as graphic (both still and video), sound, and text. It follows, therefore, that depending on the question part/right answer part pairs available, that the question can be presented to the user in a wide variety of formats. For example, suppose that the question part comprises one of the text fields and the answer part comprises another text field. Then, depending on the information selected as wrong answers, the question may be presented with the question part on one half of the screen and a list of possible answers on the other half of the screen. Given the wide variety of resources available for generating questions, a wide variety of formats are also available. Text boxes, graphics, control buttons, and the like may all be used in the format. In one preferred embodiment, question formats are associated with the individual question part/right answer part pairs. The question format determines how the information used to generate the question is displayed to the user.

Returning now to FIG. 6, once all possible questions part/right answer part pairs are generated, one question part/right answer part pair is selected for the individual question. As previously indicated, how the question part/right answer part pair is selected may be dependent upon where the question generation process is invoked. For example, if an author invokes the question generation process from the authoring portion, the question part/right answer part pairs may be selected in a sequential, non-random fashion so the author may view all potential questions which may be generated from a selected question set. Alternatively, if the question generation process is invoked by the user in the presentation part, the question part/right answer part pairs may be selected in a random fashion so as to enhance the effectiveness of either a study mode or an exam mode.

Figure 9:
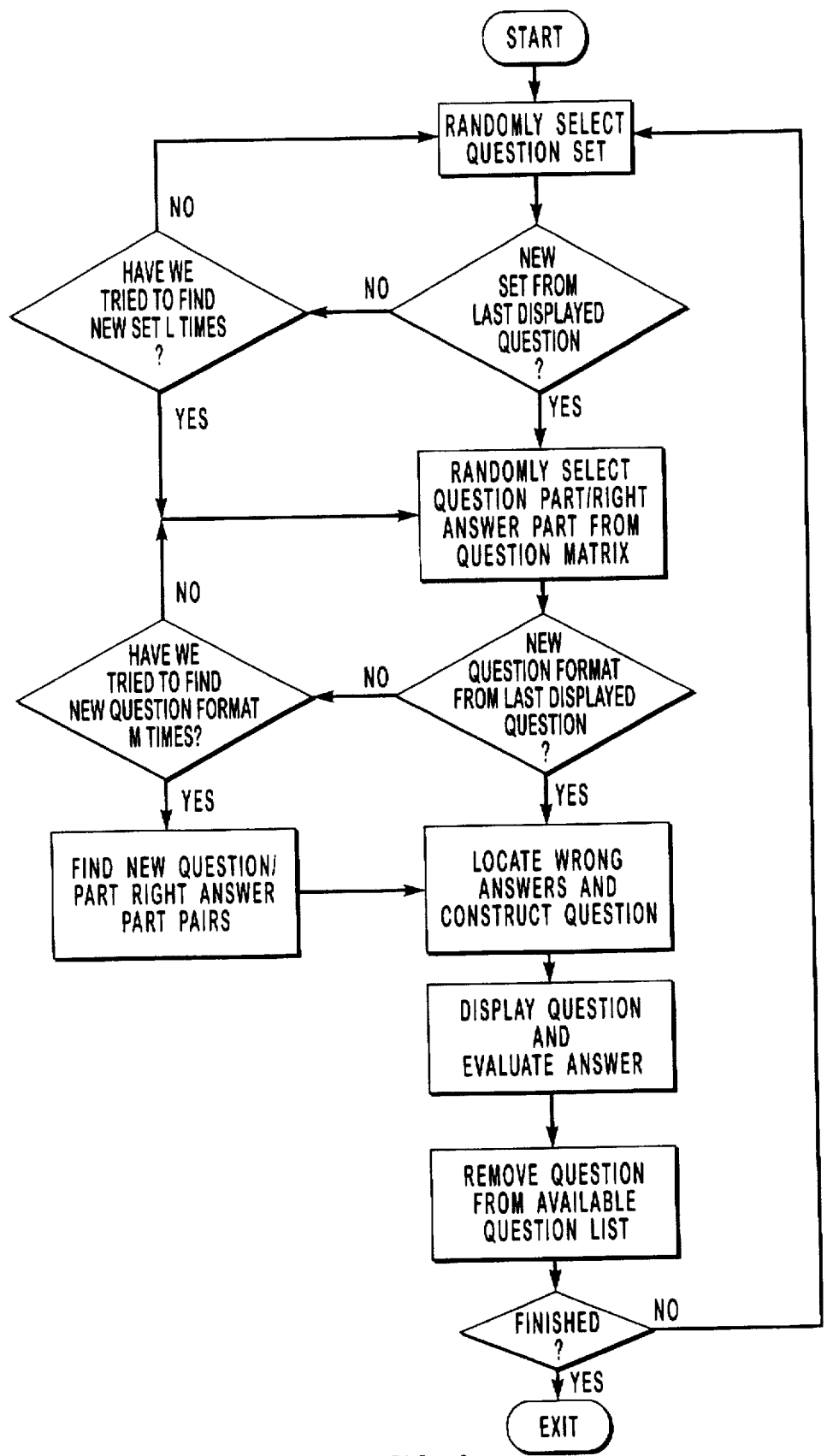
FIG. 9 is a flow chart illustrating how questions are randomly generated in one preferred embodiment of the presentation portion.

As previously indicated, not only can the particular question set be selected at random from among the question sets available, but also the particular question part/right answer part pair can be selected at random. This random methodology is particularly useful in the presentation part. In one preferred embodiment it is desired to randomly generate questions when the question generation process is invoked from the presentation portion in such a manner that questions are presented without repetition. Many procedures are available in order to accomplish selection of both question sets and question part/right answer part pairs in such a manner that the questions presented to the user are generated without repetition. One preferred embodiment to accomplish this is illustrated in FIG. 9.

In this preferred embodiment, the process begins by randomly selecting a question set. The selected question set is examined to determine if it is different from the question set from used to generate. If it is different then a question part/right answer part pair is randomly selected from the appropriate question matrix. If the new set is not different from the question set from which the last displayed question was drawn the process will try and find a new question set L times. In one preferred embodiment L=10.

Once the question part/right answer part has been randomly selected from the appropriate question matrix, the question format associated with that question part/right answer part is examined to determine if it is different from the last question format which was displayed. If it is different then wrong answers are located for the question part/right answer part and the question is constructed and displayed. If the format is not different then the process will try M times to find a new question format. If it cannot find a new question format in M times, then the process finds a question part/right answer part pair which has not yet been utilized in generating a question locates wrong answers, and constructs a question. In one preferred embodiment M=10.

Once the question has been constructed, the question is displayed to the user and any answer which is received is evaluated. After the question has been evaluated, the question is removed from the available question list and a new question set is randomly selected.

Returning now to FIG. 6, once a question part/right answer part pair has been selected, the next step is to locate wrong answers which would be appropriate for inclusion in the question. Many different procedures can be developed to select wrong answers from a lesson. In one preferred embodiment, wrong answers are located through the use of page identifiers. In one preferred embodiment a page identifier comprises a page title, a page topic, a page type, and linkage which is one or more links which identify pages which are associated with the current page.

Figure 10:
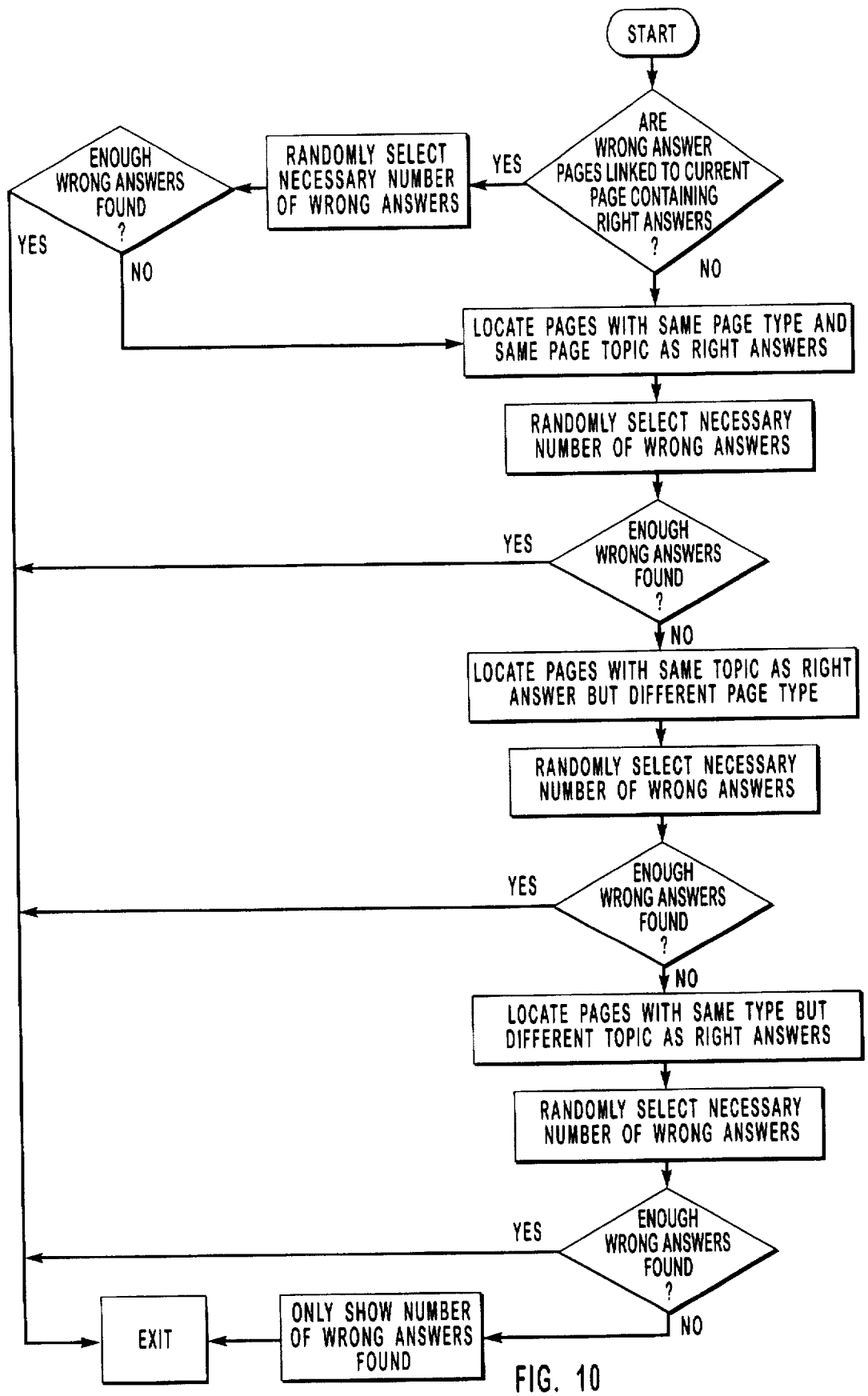
FIG. 10 is a flow chart illustrating how wrong answers are located.

In this particular embodiment, page identifiers are utilized in locating wrong answers as illustrated in FIG. 10. In this preferred embodiment, the routine first checks if a wrong answer page is linked to the current page from which the right answer was selected. If such a wrong answer page exists, the appropriate number of wrong answers are randomly selected from the page. If the number of wrong answers is insufficient for the particular question format which is being displayed, the routine next looks to pages which have the same page type and the same page topic as the page containing the right answer. Again, an appropriate number of wrong answers are selected randomly from the identified pages. If the number of wrong answers is insufficient, pages with the same page topic as the page containing the right answer but with a different page type are located. The appropriate number of wrong answers are randomly selected from these pages. If there are still insufficient wrong answers for the particular question format, pages with the same page type but different page topic as the page containing the right answer are located. An appropriate number of wrong answers are drawn from those pages. Finally, if an insufficient number of wrong answers still exist, the number of wrong answers displayed is reduced and the question is generated from the wrong answers which have been located.

Returning now to FIG. 6, once the right question part/right answer part has been identified along with a sufficient number of wrong answers for the question format which is to be presented, the question is displayed according to the pre-defined question format.

If the routine is invoked from the authoring portion, it is preferred that a simple mechanism exist which allows the author to quickly and easily scroll through all possible question part/right answer part pairs drawn from all possible question sets. In one preferred embodiment, means by which the question part and right answer part pairs may be viewed is provided. In the presently preferred embodiment, this means comprises menus, dialogue boxes, list boxes, icons, control buttons, and the like normally associated with the GUI environments preferred for this system.

In a preferred embodiment, the authoring portion allows the developer or author to have control over the number and/or type of questions asked in the user portion. A simple analogy is that the authoring portion specifies the rules which will be used to generate questions in the presentation portion. Thus, means by which an author may control the scope of questions asked is provided. In one preferred embodiment, this means allows the author to preview all possible questions which may be asked and mark those questions which should be excluded from the questions which may be asked in the presentation portion. In another preferred embodiment, the means comprises the ability to eliminate questions involving a particular resource. In still another preferred embodiment, the means comprises the ability to eliminate fields which may be used to generate questions in the presentation portion. It is anticipated that a wide variety of tools to allow the author to tailor the questions to be generated in the presentation portion will be provided.

Returning now to FIG. 5, create next page step 98 is included to illustrate that the authoring portion includes the ability to create and add pages to the lesson. Finally, it is anticipated that in some preferred embodiments additional capability will be provided. Such capability can include an automatic save feature which would automatically save the lesson at predetermined intervals, file management utilities which allow location and transfer of files associated with creating the lesson, and other capabilities which are common to the GUI environments preferred for this system. Other features may include the automatic generation of a table of contents page to the lesson.

In order to enhance the evaluation and feedback from the invention, other features may be included. For example, any of the testing methodologies employed by those in the testing art to evaluate a user's comprehension and grasp of the material can be included. Thus, the instant invention can be designed so as to vary the number and difficulty of questions in order to ascertain mastery of a particular subject. In one preferred embodiment, questions have associated with them specific parameters which allow evaluation of the question. In one preferred embodiment, these parameters include a measure of difficulty, a measure of the time a user takes to answer the question, and a measure of a passing or failing score.

Questions generated by the instant invention may also have an associated feedback parameter. Such a feedback parameter may include actions taken upon completion of the question. For example, feedback can come in the form of correct or incorrect response indication. As another example, feedback can be descriptive. Descriptive feedback includes situations where additional information is presented to the user. Thus, once a question is answered, the user can be informed of his or her score in relation to a predefined threshold, or in relation to other scores. Other additional information may also be presented with descriptive feedback.

Feedback may also be prescriptive. Prescriptive feedback helps the user reinforce his or her knowledge. Thus, upon answering a question, the user may be presented with an option to return to the particular part of the lesson where the information from which the question was generated is presented. In addition, the user may be presented with information particularly tailored by the author to provide a review over the subject material covered by the question. In some cases, it might be helpful to compel the user to learn or review more information based on an evaluation of the user's answers. Furthermore, when the time taken to answer a question is considered, tests can be crafted to measure the rapidity with which a user can work through a given test. Thus, overall time on a test or set of questions from a test may be measured, evaluated, and used to adapt the test to a particular user.

Questions may also be divided into groups which illustrate their relationship to the overall subject matter contained in the lesson. For example, questions which pertain to the same idea or same concept may be grouped into a question set. Feedback may then be given either on individual questions or on the entire question set or on both. Question sets can contain measures of difficulty, measures of time, measures of a passing or failing score, descriptive feedback, and prescriptive feedback.

As another example, question sets which are all related by a major concept or topic, may be grouped into a question set collection. The material presented in a question set collection can be taken from the material presented to the user or it can be new material which has not been presented to the user. Use of information not previously presented to the user is particularly useful when testing mastery of a concept. A question set collection can also contain a measure of the difficulty of the collection, a measure of time needed to complete the question set collection, a measure of a passing or failing score, descriptive feedback, and prescriptive feedback.

Questions which relate to a series of major topics can be indicated by grouping question set collections into a question series. A question series is designed to test over a plurality of major topics. A question series may also contain a measure of difficulty, a measure of time needed to complete the series, a measure of a passing or failing score, descriptive feedback, and prescriptive feedback.

Feedback, whether descriptive or prescriptive, can be given at any point along the way. For example, feedback may be given after each question, or feedback may be held until the completion of a group of questions. For example, feedback associated with a question set may be held until the question set is complete. Feedback associated with a question set collection or a question series may also be held until the question set collection or question series is complete.

Finally, questions may be asked in an exam mode. In one preferred embodiment, the exam mode asks each question once without feedback. In another preferred embodiment, each question is asked and feedback provided. The exam mode can contain such items as measures of difficulty for the questions asked, a measure of the time needed to complete the exam, measure of passing or failing score, descriptive feedback and prescriptive feedback.

In addition, questions asked either in an exam mode or due to another trigger such as a study button, may be used to modify the subsequent questions asked. In other words, evaluation of the questions answered thus far may be used to modify subsequent questions asked. For example, if the user answers a given number of questions of difficulty level one without mistakes, the system may begin asking questions of difficulty level two. As another example, if the system determines through an evaluation mechanism that the user either has clearly mastered or clearly not mastered the material, an action can be performed. Such an action might be to terminate asking questions or to begin presenting material. If the user has not mastered the material, the presented material may be review and learning material. If the user has mastered the material, it may be new material a user has not yet seen.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

```
#include "search.hpp"                    Appendix A

/*********************************************************************
Copyright: Taras Development Corporation, 1992
Program : Taras Tutor
Creator:
Description:  The User Interface of the Pace project.
Version:  1.0
**********************************************************************/

/*********************************************************************/
/*          Search Dialog Class              */
/*********************************************************************/

SearchDialog::SearchDialog(PTWindowsObject AParent, LPSTR AName):
 TDialog(AParent, AName)
{
} void SearchDialog::SetupWindow()
{
 TDialog::SetupWindow();

SendMessage(GetItemHandle(TextToSearchEdit), EM_LIMITTEXT, 30, 0L);
 SetWindowText(GetItemHandle(TextToSearchEdit), SearchString);

if (CaseSensitive)
    SendMessage(GetItemHandle(CaseCheck), BM_SETCHECK, 1, 0L);
 else
    SendMessage(GetItemHandle(CaseCheck), BM_SETCHECK, 0, 0L);

if (SearchScope==currentpage)
 {  SendMessage(GetItemHandle(CurrentPageCheck), BM_SETCHECK, 1, 0L);
    SendMessage(GetItemHandle(EntireLessonCheck), BM_SETCHECK, 0, 0L);
       }
 else
 {  SendMessage(GetItemHandle(EntireLessonCheck), BM_SETCHECK, 1, 0L);
    SendMessage(GetItemHandle(CurrentPageCheck), BM_SETCHECK, 0, 0L);
 } if (SearchDirect==forward)
    SendMessage(GetItemHandle(ForwardCheck), BM_SETCHECK, 1, 0L);
 else if (SearchDirect==backward)
    SendMessage(GetItemHandle(BackwardCheck), BM_SETCHECK, 1, 0L);
 else if (SearchDirect==frombegin)
    SendMessage(GetItemHandle(FromBeginCheck), BM_SETCHECK, 1, 0L);
} void SearchDialog::Ok(RTMessage Msg)
{
```

```
  char tempSearchString[30];
        strcpy(tempSearchString, SearchString);
GetWindowText(GetItemHandle(TextToSearchEdit),SearchString, sizeof(SearchString
if (strcmp(tempSearchString, SearchString))
   ISTEXTEXIST=FALSE;

// CaseSensitive check
if (SendMessage(GetItemHandle(CaseCheck), BM_GETCHECK, 0, 0L)==TRUE)
   CaseSensitive=TRUE;
else    CaseSensitive=FALSE;

// Current Page and Entire Lesson check.
if ( (   (SendMessage(GetItemHandle(CurrentPageCheck), BM_GETCHECK, 0, 0L)==TRUE
        &&(SendMessage(GetItemHandle(EntireLessonCheck), BM_GETCHECK, 0, 0L)==TRU
            ) || (SendMessage(GetItemHandle(CurrentPageCheck), BM_GETCHECK, 0, 0L
   SearchScope=currentpage;
else if ( SendMessage(GetItemHandle(EntireLessonCheck), BM_GETCHECK, 0, 0L)==TR
   SearchScope=entirelesson;

// Under Entire Lesson check.
if (SendMessage(GetItemHandle(ForwardCheck), BM_GETCHECK, 0,0L)==TRUE)
   SearchDirect=forward;
else if (SendMessage(GetItemHandle(BackwardCheck), BM_GETCHECK, 0,0L)==TRUE)
   SearchDirect=backward;
else if (SendMessage(GetItemHandle(FromBeginCheck), BM_GETCHECK, 0,0L)==TRUE)
   SearchDirect=frombegin;

// User select 'from beginning' this time.  Search from beginning when
// user switch from fwd/bwd to from begin.
if (PreviousSearchDirect!=SearchDirect && SearchDirect==frombegin)
   FIRSTTIMEFROMBEGIN=TRUE;

PreviousSearchDirect=SearchDirect;

if (!strcmp(SearchString, ""))
{ MessageBox(GetFocus(), "Please enter your search text", "Language Tutor", MB_
   SetFocus(HWindow);
}
else
   TDialog::Ok(Msg);
}
```

```c
#include "lesson.hpp"
/***********************************************************************
Copyright: Taras Development Corporation, 1992
Program : Taras Tutor
Creator:
Description: The User Interface of the Pace project.
Version: 1.0
/************************************************************************/

/************************************************************************/
/* Functions:
/* 1). char * GetLessonTextInfo(char *filepath)
/* 2). char * GetLessonLabelInfo(char *filepath)
/* 3). void LabelMaster(int PageNum, int NumbofLabel)
/* 4). char * CleanText(char *Text)
/* 5). char * GetBitmap(int PageNumb)
/* 6). char * GetText(int ResID)
/* 7). void TextMaster(int PageNumb, int NumbRegularText, int TextType)
/************************************************************************/ void CleanText(char *Text)
{
  int j = 0;
  int length = strlen(Text);
  for (int i=0; i<length; i++)
  {
    if (Text[i]=='\n')
    {
      Text[i]='\0';
      break;
    }
    else if (Text[i]!='[' && Text[i]!=']')
      Text[j++]=Text[i];
  }
  Text[j] = '\0';
}
//************************************************************************
void GetLessonTextInfo(char *filepath, char *TextString, int textlength)
{
  FILE *in;

// Read text file contents.

if ((in = fopen(filepath, "rt")) == NULL)
  {
    MessageBox(GetFocus(), "Text file is missing or unable to open.", filepath,
    fclose(in);
    return;
```

```
            strcat(lessontextname, ".txt");
        if (!(label=GetLessonLabelInfo(lessontextname)))
         { if (i==1)
              strcpy(RadioLabel1, "");
           if (i==2)
              strcpy(RadioLabel2, "");
           if (i==3)
              strcpy(RadioLabel3, "");
           if (i==4)
              strcpy(RadioLabel4, "");
         }
        else
         { if (i==1)
              strcpy(RadioLabel1, label);
           if (i==2)
              strcpy(RadioLabel2, label);
           if (i==3)
              strcpy(RadioLabel3, label);
           if (i==4)
              strcpy(RadioLabel4, label);
         }
      }
}

//*******************************************************************
int GetTextLength(char *filepath)
{
 int handle, length;

if (access(filepath, 0)!=0) // file does not exist
    return 0;
 if ((handle = open(filepath, O_CREAT | O_TEXT)) == -1)
 {
   MessageBox(GetFocus(), "Text file is missing or unable to open.", filepath, M
   close(handle);
   return 0;
 }
 else
 {
   length=(int)filelength(handle);
   close(handle);
   return length;
 }
} void TextMaster(int PageNumb, int NumbRegularText, int TextType)
{
    int i; int textnum;   char textnumstr[25];
    int textlength;
    int currentpage=Scrollbar->GetPosition();
    currentpage=ShowPageNumbArray[currentpage];
```

```
/********************* elds String *************, *************/
   if (TextType==fieldstext)
   {
     if (FileInfo->Record.IDCreated[currentpage].fieldscreated==TRUE)
     {
     strcpy(lessontextname, TarasTextPath);
         if (!strcmp(FileInfo->FieldString[PageNumb], ""))
         { strcpy(FieldText, "");
            return;
         }
         strcat(lessontextname, FileInfo->FieldString[PageNumb]);
         strcat(lessontextname, ".fst");
     textlength=GetTextLength(lessontextname);
         if (!textlength)
            strcpy(FieldText, "");
         else
         GetLessonTextInfo(lessontextname, FieldText, textlength);
     }
   }
/********************* Branch String ***************************/
   if (TextType==branchtext)
   {
     if (FileInfo->Record.IDCreated[currentpage].branchescreated==TRUE)
     {
         strcpy(lessontextname, TarasTextPath);
     if (!strcmp(FileInfo->Branch_branchString[PageNumb], ""))
         { strcpy(BranchText, "");
            return;
         }
     strcat(lessontextname, FileInfo->Branch_branchString[PageNumb]);
         strcat(lessontextname, ".bst");
     textlength=GetTextLength(lessontextname);

if (!textlength)
            strcpy(BranchText, "");
         else
     GetLessonTextInfo(lessontextname, BranchText, textlength);
     }
   }
/********************* Regular Data Page Text ******************/
   int PageID=0;
   if (TextType==regulartext)
   {   for (i=1; i<=NumbRegularText; i++)
       {
   if (text1created)
   { textnum=10000+PageNumb*10+1; text1created=FALSE; PageID=1; }
         else if (text2created)
   { textnum=10000+PageNumb*10+2; text2created=FALSE; PageID=2;}
         else if (text3created)
   { textnum=10000+PageNumb*10+3; text3created=FALSE; PageID=3;}
```

```
              else if (text4created)
{ textnum=10000+PageNu. *10+4; text4created=FALSE;  ageID=4;} itoa(textnum, textnumstr, 10);
        strcpy(lessontextname, TarasTextPath);
        strcat(lessontextname, textnumstr);
    strcat(lessontextname, ".txt");
    textlength=GetTextLength(lessontextname);

if (!textlength)
    { if (PageID==1)
//              strcpy(RadioText1, "");
       RadioText1=NULL;
        if (PageID==2)
//              strcpy(RadioText2, "");
       RadioText2=NULL;
        if (PageID==3)
//              strcpy(RadioText3, "");
       RadioText3=NULL;
        if (PageID==4)
//              strcpy(RadioText4, "");
       RadioText4=NULL;
        }
          else
    {
       if (PageID==1)
         { RadioText1 = new char [textlength];
    GetLessonTextInfo(lessontextname,RadioText1, textlength);
//     strcpy(RadioText1, "Test1");
//     CleanText(RadioText1);
         }
        if (PageID==2)
         { RadioText2 = new char [textlength];
    GetLessonTextInfo(lessontextname,RadioText2, textlength);
//     strcpy(RadioText1, "Test1");
//              CleanText(RadioText2);
         }
        if (PageID==3)
         { RadioText3 = new char [textlength];
    GetLessonTextInfo(lessontextname,RadioText3, textlength);
//     CleanText(RadioText3);
            }
        if (PageID==4)
         { RadioText4 = new char [textlength];
    GetLessonTextInfo(lessontextname,RadioText4, textlength);
//     CleanText(RadioText4);
            }
      }
        }
        text1created=text1createdbak; text2created=text2createdbak;
```

```
  text3created=text3createdbak; text4created=text4createdbak;
    }
}
char * GetBitmap(int PageNumb)
{
 char bitmappath[255];

if (!FileInfo->ReadFile(PageNumb))
   {    MessageBox(GetFocus(), "Error reading lesson file", "Language Tutor", MB_
 strcpy(bitmappath, "");
        return bitmappath;
   } if (FileInfo->Record.IDCreated[PageNumb].moviecreated)
     moviecreated=TRUE;
  strcpy(bitmappath, TarasBitmapPath);
  strcat(bitmappath, FileInfo->PictID);
  strcat(bitmappath, ".bmp");
  return bitmappath;
} char * GetTestTextInfo(char *filepath)
{
FILE *in;
char msg[1000];
if ((in=fopen(filepath, "rb"))==NULL)
     { MessageBox(GetFocus(), "Label file is missing or unable to open.", filepa
       fclose(in);
       return NULL;
     }
else
  { fgets(msg, 1000, in);
    fclose(in);
    int length=strlen(msg);
    if (length>=1000)
       MessageBox(GetFocus(), "Check your label file, there are might be some hid msg[1000]='\0';  // force it to have a terminator.

if (msg[length-1]=='\n')
       msg[length-1]='\0';
    if (msg[length-2]=='\r')
       msg[length-2]='\0';

fcloseall();

return msg;

}
}
```

```
char * GetText(int ResID)
{
 char textpath[255];
 char textnumstr[25], *text;
 char temp[1000];
 itoa(ResID, textnumstr, 10);
 strcpy(textpath, TarasTextPath);
 strcat(textpath, textnumstr);
 int currentpage=ShowPageNumbArray[Scrollbar->GetPosition()];
 if (FileInfo->Record.IDCreated[currentpage].fieldscreated==TRUE && ASKFIELDQUES
    strcat(textpath, ".fst");
 else
    strcat(textpath, ".txt");

text=GetTestTextInfo(textpath);
 if (!text)
    strcpy(temp, "");
 else
    { strcpy(temp, text);    // msgbox of text is garbage. !!!, but RadioText1 has
       if (ISFILLING==FALSE)
   CleanText(temp);
    }
 return temp;

}

/****************************************************************/
/*                                                              */
/*              Lesson Template Dialog Class                    */

// Current Functionality:
// 1).
// 2).
// 3).
// 4).
// 5).

/****************************************************************/

TemplateLessonDialog::TemplateLessonDialog(PTWindowsObject AParent, LPSTR AName)
        TDialog(AParent, AName)
 {
  InFields=FALSE;
  video = FALSE;
  hwndMci=NULL;
 }

TemplateLessonDialog::~TemplateLessonDialog()
 {
```

```
   if (hwndMci != NULL) MCIWndDestroy(hwndMci);
      hwndMci=NULL;
}
void TemplateLessonDialog::GetWindowClass(WNDCLASS& AWndClass)
{
        TDialog::GetWindowClass(AWndClass);
        CursorUp = LoadCursor(NULL, IDC_ARROW);
 AWndClass.hCursor = CursorUp;
} void TemplateLessonDialog::WMMouseMove(RTMessage Msg)
{
 int FieldsNumb=-1;
 POINT pt;
 pt.x=Msg.LP.Lo;
 pt.y=Msg.LP.Hi;
 RECT toprc;

HCURSOR OldCursor, NewCursor;

// If Version > 2.0
 if (stricmp(FileInfo->VersionName, "version 1.0.0") )
 {
   int currentpage=Scrollbar->GetPosition();
   currentpage=ShowPageNumbArray[currentpage];

/****************** Fields ************************************/
   if (FileInfo->Record.IDCreated[currentpage].fieldscreated==TRUE)
   {
     for (int i=0; i<FileInfo->NumbFields; i++)
     {
       SetRect(&toprc, X+FileInfo->FieldRect[i].left,
               Y+FileInfo->FieldRect[i].top, X+FileInfo->FieldRect[i].right,
               Y+FileInfo->FieldRect[i].bottom);
       if (PtInRect(&toprc, pt))
       {
         FieldsNumb=i;
         break;
       }
       else
         FieldsNumb=-1;
     }
   }
 } if (FieldsNumb!=-1)
 {
   OldCursor= (HCURSOR) GetClassWord(HWindow, GCW_HCURSOR);
```

```
    if (OldCursor!=NewBlackCursor)
   {
     NewCursor=NewBlackCursor;
     SetClassWord(HWindow, GCW_HCURSOR, (WORD)NewCursor);
     DeleteObject(OldCursor);
     SetCursor(NewCursor);
   }
 }
 else
 {
   OldCursor = (HCURSOR) GetClassWord(HWindow, GCW_HCURSOR);
   if (OldCursor!=CursorUp)
   {
     NewCursor=LoadCursor(NULL, IDC_ARROW);
     SetClassWord(HWindow, GCW_HCURSOR, (WORD)NewCursor);
     DeleteObject(OldCursor);
     SetCursor(NewCursor);
   }
 }

} void TemplateLessonDialog::ProcessRadioButton1(int DlgItemID, int DlgTextID, RTM
{
 if (SendMessage(GetItemHandle(DlgItemID), BM_GETCHECK, 0, 0L)==TRUE)
        SetWindowText(GetItemHandle(DlgTextID), RadioText1);
 else
        SetWindowText(GetItemHandle(DlgTextID), RadioText2);
 PeekText(Msg, DlgTextID, TRUE);
 DisplayRadioText1=TRUE;
} void TemplateLessonDialog::ProcessRadioButton2(int DlgItemID, int DlgTextID, RTM
{
 if (SendMessage(GetItemHandle(DlgItemID), BM_GETCHECK, 0, 0L)==TRUE)
        SetWindowText(GetItemHandle(DlgTextID), RadioText2);
 else
        SetWindowText(GetItemHandle(DlgTextID), RadioText1);
 PeekText(Msg, DlgTextID, TRUE);
 DisplayRadioText1=FALSE;
} void TemplateLessonDialog::ProcessRadioButton3(int DlgItemID, int DlgTextID, RTM
{
 if (SendMessage(GetItemHandle(DlgItemID), BM_GETCHECK, 0, 0L)==TRUE)
        SetWindowText(GetItemHandle(DlgTextID), RadioText3);
 else
        SetWindowText(GetItemHandle(DlgTextID), RadioText4);
 PeekText(Msg, DlgTextID, FALSE);
```

```
   DisplayRadioText3=TRUE;
} void TemplateLessonDialog::ProcessRadioButton4(int DlgItemID, int DlgTextID, RTM
{
 if (SendMessage(GetItemHandle(DlgItemID), BM_GETCHECK, 0, 0L)==TRUE)
        SetWindowText(GetItemHandle(DlgTextID), RadioText4);
 else
        SetWindowText(GetItemHandle(DlgTextID), RadioText3);
 PeekText(Msg, DlgTextID, FALSE);
 DisplayRadioText3=FALSE;
} void TemplateLessonDialog::PeekText(RTMessage Msg, int DlgTextID, BOOL RBUTTON12
{
 HWND hdlg;
 hdlg = GetParent(Msg.Receiver);
 HMENU hmenu = GetMenu(hdlg);
 if( ((GetMenuState(hmenu, TRS_TOPHIDE, MF_BYCOMMAND) == MF_CHECKED) &&
        RBUTTON12) || ((GetMenuState(hmenu, TRS_BUTTOMHIDE, MF_BYCOMMAND)
        == MF_CHECKED)) && !RBUTTON12)
 {
   Delay(1.0);
   SetWindowText(GetItemHandle(DlgTextID), "");
 }
} void TemplateLessonDialog::DrawBitMap()
{
 RECT rcClip, rc;
 HRGN hrgnClip;
 POINT ptleft, ptright;

// Get Data Page Client Area Coordinates.  (Drawing Area)
 HWND hdlg=GetDlgItem(HWindow, TRS_LESNCLIENTAREA);
 GetWindowRect(hdlg, &rc);

// Convert From Screen Coordinates to Client.
 ptleft.x=rc.left;
 ptleft.y=rc.top;
 ptright.x=rc.right;
 ptright.y=rc.bottom;

ScreenToClient(HWindow, &ptleft);
 ScreenToClient(HWindow, &ptright);

if (BitmapPtr->BitmapHandle)
// if (LessonBitmapHandle)
```

```
{
  HDC hDC=GetDC(HWindow);

// Set Clip Area (in case picture get too big).
  GetClipBox(hDC, &rcClip);
//     if (TemplateID==PictLesson)
//         ptright.x=(ptright.x)*2;
  hrgnClip=CreateRectRgn(ptleft.x+1, ptleft.y+1, ptright.x-1, ptright.y-1);
  SelectClipRgn(hDC, hrgnClip);

// Center Picture.
  WIDTH=BitmapPtr->PixelWidth;
  HEIGHT=BitmapPtr->PixelHeight;

Y = ptleft.y + (int) (ptright.y-ptleft.y - HEIGHT)/2;
  X = ptleft.x + (int) (ptright.x-ptleft.x - WIDTH)/2;

HDC MemoryDC = CreateCompatibleDC(hDC);
  HANDLE OldBitmapHandle = SelectObject(MemoryDC, BitmapPtr->BitmapHandle);
  if ( BitmapPtr->Mode == SRCCOPY )
  {
     SetBkColor(hDC, GetNearestColor(hDC, 0x800000L));
     SetTextColor(hDC, 0xFFFFFFL);
  }
  BitBlt(hDC, X, Y, WIDTH, HEIGHT, MemoryDC, 0, 0, BitmapPtr->Mode);
  SelectObject(MemoryDC, OldBitmapHandle);
  DeleteDC(MemoryDC);
  DeleteObject(hrgnClip);
  ReleaseDC(HWindow, hDC);
 }
} void TemplateLessonDialog::DrawRadioButtonText12(int DlgItem1ID, int DlgItem2ID,
{
 if (SendMessage(GetItemHandle(DlgItem2ID), BM_GETCHECK, 0, 0L) == TRUE)
    SetWindowText(GetItemHandle(DlgTextID), RadioText2);
 else if (SendMessage(GetItemHandle(DlgItem1ID), BM_GETCHECK, 0, 0L)==TRUE)
    SetWindowText(GetItemHandle(DlgTextID), RadioText1);
} void TemplateLessonDialog::DrawRadioButtonText34(int DlgItem3ID, int DlgItem4ID,
{
        if (SendMessage(GetItemHandle(DlgItem3ID), BM_GETCHECK, 0, 0L)==TRUE)
                SetWindowText(GetItemHandle(DlgTextID), RadioText3);
        else if (SendMessage(GetItemHandle(DlgItem4ID), BM_GETCHECK, 0, 0L)==TRUE
                SetWindowText(GetItemHandle(DlgTextID), RadioText4);
}
```

```
void TemplateLessonDialog  HandleWMDrawItem(RTMessage
{
 video = FALSE;
 if (moviecreated)
 {
   char lessonmoviename[255];
   sprintf(lessonmoviename, "%s%s.avi", TarasBitmapPath,
           FileInfo->MovieID);
   strcpy(avi_path, lessonmoviename);
   video = TRUE;
 } if (video)
 {
   VideoForWindowsVersion();
   HWND hwnd = GetDlgItem(HWindow, TRS_LESNCLIENTAREA);
   PlayFile(hwnd);
   RECT rc;
   GetWindowRect(hwnd, &rc);
   int height = rc.bottom-rc.top;
   int width  = rc.right-rc.left;
   RECT movierc;
   GetWindowRect(hwndMci, &movierc);
   MoveWindow(hwndMci, 1, 1, width-2, height-2, 1);
 }
   /************** Draw Regular Data Page1 Picture *****************/
 else
 {
   if (LesnBtmpRedrawFlag)
   {
     switch (TemplateID)
     {
       case Pict2TextRLesson:
         DrawBitMap();
         DrawRadioButtonText12(TRS_RBUTTON1, TRS_RBUTTON2, TRS_PICT2TXTRTEXT1);
       break;
       case Pict3TextRupLesson:
         DrawBitMap();
         DrawRadioButtonText12(TRS_PICT3TEXTRUPRBTN1,TRS_PICT3TEXTRUPRBTN2, TRS_
       break;
       case Pict3TextRdownLesson:
         DrawBitMap();
         DrawRadioButtonText34(TRS_PICT3TEXTDOWNRBTN3,TRS_PICT3TEXTDOWNRBTN4, TR
       break;
       case PictLesson:
       case Pict1TextLesson:
       case Pict2TextLesson:
        DrawBitMap();
       break;
       case Pict4TextRLesson:
```

```
            DrawBitMap();
            DrawRadioButtonText12(TRS_PICT4TXTRRBTN1, TR_PICT4TXTRRBTN2, TRS_PICT4
            DrawRadioButtonText34(TRS_PICT4TXTRRBTN3, TRS_PICT4TXTRRBTN4, TRS_PICT4
        break;
    }
}
/********** Draw Branch Rectangle ***********/
    int currentpage=ShowPageNumbArray[CurrentPageNumb]; //Scrollbar->GetPosition()

HDC DC=GetDC(HWindow);
    if (stricmp(FileInfo->VersionName, "version 1.0.0") )
    {
        if (FileInfo->Record.IDCreated[currentpage].branchescreated==TRUE)
        {
            HBRUSH tophbrush1=CreateSolidBrush(RGB(255,255,255));
            HBRUSH tophbrush2=CreateSolidBrush(RGB(0x7f,0x7f,0x7f));
            HRGN hrgn, hrgn1;
            RECT branchrect;

// Paint Branch Rectangles.
            for (int i=0; i<FileInfo->NumbBranches; i++)
            {
                hrgn = CreateRoundRectRgn(X+FileInfo->BranchRect[i].left,
                        Y+FileInfo->BranchRect[i].top,
                        X+FileInfo->BranchRect[i].right,
                        Y+FileInfo->BranchRect[i].bottom, 15, 15);
                hrgn1= CreateRoundRectRgn(X+FileInfo->BranchRect[i].left-1,
                        Y+FileInfo->BranchRect[i].top-1,
                        X+1+FileInfo->BranchRect[i].right,
                        Y+1+FileInfo->BranchRect[i].bottom, 15, 15);
                SetRect(&branchrect,X+FileInfo->BranchRect[i].left,
                        Y+FileInfo->BranchRect[i].top,
                        X+FileInfo->BranchRect[i].right,
                        Y+FileInfo->BranchRect[i].bottom);

int tempBranchShowMode=FileInfo->Branch_showMode[i];

if ((tempBranchShowMode & showWithFrame) || !(tempBranchShowMode &
                    showInsideWhite))
                {
                    if (tempBranchShowMode & showWithFrame)
                    {
                        FrameRgn(DC, hrgn, tophbrush2, 1,1);
                        FrameRgn(DC, hrgn1, tophbrush1, 1,1);
                    }
                    if (tempBranchShowMode & showInsideWhite)
                        InvertRgn(DC, hrgn);
                    SetTextColor(DC, RGB(0,0,128));
                    SetBkMode(DC, TRANSPARENT);
                    TextMaster(i,0, branchtext);
                    if (strcmp(BranchText, ""))
```

```
            DrawText(DC, BranchText, strlen(BranchText), &branchrect,
                DT_CE  ER|DT_VCENTER|DT_SINGLELI. .);
      }
      else
         InvertRgn(DC, hrgn);
         DeleteObject(hrgn);
         DeleteObject(hrgn1);
      }
      DeleteObject(tophbrush1);
      DeleteObject(tophbrush2);
    }
  }
  ReleaseDC(HWindow, DC);
 }
} void TemplateLessonDialog::WMControlColor(RTMessage Msg)
{
 switch (Msg.LP.Hi)
 {
    case CTLCOLOR_STATIC:
       SetBkColor((HDC)Msg.WParam, RGB(0xc0,0xc0,0xc0));
       SetTextColor((HDC)Msg.WParam, RGB(0,0,0));
       SetBkMode((HDC)Msg.WParam, TRANSPARENT);
    break;
    default:
       DefWndProc(Msg);
 }
} void TemplateLessonDialog::WMLButtonUp(RTMessage)
{
 RECT rc3;
 HDC  DC = GetDC(HWindow);
 if(Dirty)
 {
    // If paint the Frame.
    HBRUSH hbrush2 = CreateSolidBrush(RGB(0xc0,0xc0,0xc0));   //paint the size of
    if (InFields)
       SetRect(&rc3,X-fieldtextlength+FileInfo->FieldRect[FieldsNumb].left,   Y-2+
             FillRect(DC, &rc3, hbrush2);
    DeleteObject(hbrush2);
    SendMessage(HWindow, TRS_REDRAWITEM, 0, 0);
    Dirty = InFields = FALSE;
 }
 ReleaseDC(HWindow, DC);
}
```

```
void GetBranchLessonName(int currentpage, int i)
{
 char lessontextname[255];
 int textnum;

if (i<10)
    textnum=10000+currentpage*10+i;
 else if (i>=10 && i<20)
    textnum=20000+currentpage*10+i-10;
 else
    textnum=30000+currentpage*10+i-20;

sprintf(lessontextname, "%s%d.bls", TarasTextPath, textnum);

FILE *in;
 HFILE handle;
 OFSTRUCT ofs;
 char msg[130];

if ((handle=OpenFile(lessontextname,&ofs,OF_EXIST))==HFILE_ERROR)
    strcpy(branchlessonname, "");
 else
 {
    if ((in=fopen(lessontextname, "rt"))==NULL)
    {
      MessageBox(GetFocus(), "Text file is missing or unable to open.",
                 "Language Tutor", MB_OK);
      fclose(in);
      strcpy(branchlessonname, "");
    }
    else
    {
      fgets(msg, 128, in);
      int length = strlen(msg);
      if (length>=128)
        MessageBox(GetFocus(), "Check your text file, there are might be some hid fclose(in);
      msg[128]='\0';
      char temp[255];  // get the stored path, if not use the default exe path.
      GetPrivateProfileString(Section1, EntryDir, TarasPath, temp, sizeof(temp),
      strcpy(branchlessonname, temp);
      strcat(branchlessonname, msg);
    }
 }
 _lclose(handle);
 fcloseall();
} void TemplateLessonDialog::WMLButtonDown(RTMessage Msg)
```

```
{
 POINT pt;
 HDC DC;
 BOOL ShowMode, AutoMode;
 int currentpage=Scrollbar->GetPosition();
 currentpage=ShowPageNumbArray[currentpage];

pt.x=Msg.LP.Lo;
 pt.y=Msg.LP.Hi;
 Dirty=FALSE;

DC = GetDC(HWindow);

RECT toprc, toprc1, bottomrc;

// If Version > 2.0
 if (stricmp(FileInfo->VersionName, "version 1.0.0") )
 {
   /***************** Fields ***********************************/
   if (FileInfo->Record.IDCreated[currentpage].fieldscreated==TRUE)
   {
     for (int i=0; i<FileInfo->NumbFields; i++)
     {
       int TempShowMode = FileInfo->FieldShowMode[i];
       if (TempShowMode & fieldSelectFrameInvert)
         ShowMode = TRUE;
       else
         ShowMode = FALSE;
       if (UserClicked)
         AutoMode = FALSE;
       else if (TempShowMode & fieldAutoSound)
         AutoMode = TRUE;
       else if (TempShowMode & fieldNoAutoSound)
         AutoMode = FALSE;

SetRect(&toprc, X+FileInfo->FieldRect[i].left,
               Y + FileInfo->FieldRect[i].top,
               X + FileInfo->FieldRect[i].right,
               Y + FileInfo->FieldRect[i].bottom);
       SetRect(&toprc1, X - 1 + FileInfo->FieldRect[i].left,
               Y - 1 + FileInfo->FieldRect[i].top,
               X + 1 + FileInfo->FieldRect[i].right,
               Y + 1 + FileInfo->FieldRect[i].bottom);

if (PtInRect(&toprc, pt) || AutoMode)
       {
         InFields = TRUE;
         FieldsNumb = i;
         if (!(TempShowMode & fieldSelectNoInvert) )
         {
           if (ShowMode )
```

```
    {
    /******** Paint Top Frame **********/
      HBRUSH tophbrush1=CreateSolidBrush(RGB(255,255,255));
      FrameRect(DC, &toprc, tophbrush1);
      DeleteObject(tophbrush1);
      HBRUSH tophbrush2 = CreateSolidBrush(RGB(0x7f,0x7f,0x7f));
      FrameRect(DC, &toprc1, tophbrush2);
      DeleteObject(tophbrush2);
    }
    else
      InvertRect(DC, &toprc);
  }
  /******** Paint Bottom Frame ******/
  TextMaster(i,0, fieldstext);
  fieldtextlength = strlen(FieldText) * 3 + 5;
  SetRect(&bottomrc, X - fieldtextlength+FileInfo->FieldRect[i].left,
  Y + 1 + FileInfo->FieldRect[i].bottom,
  X + fieldtextlength + FileInfo->FieldRect[i].right,
  Y + 20 + FileInfo->FieldRect[i].bottom);
  if (strcmp(FieldText, ""))     // if fieldtext is valid
  {
    HPEN bottomhpen=CreatePen(PS_SOLID, 1, RGB(0,0,128));
    Rectangle(DC, bottomrc.left, bottomrc.top, bottomrc.right, bottomrc.bo
    DeleteObject(bottomhpen);
  }

/********* Paint Field Text ********/
  bottomrc.top++;        // So text won't be outside of the boundary.
  SetTextColor(DC, RGB(0,0,128));
  if (strcmp(FieldText, ""))     // if fieldtext is valid
    DrawText(DC, FieldText, strlen(FieldText), &bottomrc, DT_CENTER);

/******* Play Field Sound *****/ if (strcmp(FileInfo->FieldSndName[i], ""))
  {
    sprintf(lessonsoundname, "%s%s.wav", TarasSoundPath,
            FileInfo->FieldSndName[i]);
    sndPlaySound(lessonsoundname, SND_SYNC);
  }
  Dirty = TRUE;
  if (!AutoMode)
    break;
  else
  {
    Delay(1.0);
    SendMessage(HWindow, WM_LBUTTONUP,0, 0L);
  }
  if (StopAtRightButtonClick(HWindow))
    break;
}  // end of if
```

```
   }      // end of for.
   UserClicked=TRUE;
}         // end of fields.

/***************************** Branches ************************************/
// currentpage: the scrollbar number --- showpagenumb.
// ShowPageNumbArray[currentpage]: the actual page numb.
if (FileInfo->Record.IDCreated[currentpage].branchescreated==TRUE)
{
   for (int i = 0; i < FileInfo->NumbBranches; i++)
   {
      SetRect(&toprc, X + FileInfo->BranchRect[i].left,
            Y + FileInfo->BranchRect[i].top,
            X + FileInfo->BranchRect[i].right,
            Y + FileInfo->BranchRect[i].bottom);

// Mouse in branch Rect.
      if (PtInRect(&toprc, pt))
      {
         InBranch = TRUE;
         GetBranchLessonName(currentpage, i);

// Blink the Field Rect.
         BranchID = i;    // Branch Button No.
         SendMessage(HWindow, Branch_Blink, 1, 0L);

// Remember the Home Page.
         // First time hit the branch button
         Branch = new BranchRecord;
         if (BranchLevel == 0)
         {
            curBranchHomePtr = new HomeBranchRecord;
            curBranchHomePtr->buttonNumb=i;
            curBranchHomePtr->pageNumb=Scrollbar->GetPosition();
            strcpy(curBranchHomePtr->lessonname, LessonFileName);

// Branch Original Info.
            Branch->buttonNumb=i;
            Branch->pageNumb=currentpage;  //FileInfo->Branch_pageBranch[i];
            Branch->startpageNumb= ShowPageNumbArray[0]; //Scrollbar->GetPosition()
            strcpy(Branch->lessonname, LessonFileName);
            Branch->prevBranchPtr=Branch;

if (strcmp(branchlessonname, ""))
               strcpy(LessonFileName, branchlessonname);
         }
         // Second time hit the branch button
         else
         {
            strcpy(curBranchPtr->lessonname, LessonFileName);   // remember current
            currentpage=Scrollbar->GetPosition();
```

```
        curBranchPtr->pageNumb=currentpage;
        curBranchPtr->st.  .pageNumb = ShowPageNumbAr  /[0];
        Branch->prevBranchPtr = curBranchPtr;   // remember the old branch page
        Branch->buttonNumb = i;              // reset the new branch Record.
        Branch->pageNumb=currentpage;
        Branch->startpageNumb=ShowPageNumbArray[0];
        if (strcmp(branchlessonname, ""))
           strcpy(LessonFileName, branchlessonname);
        strcpy(Branch->lessonname, LessonFileName);
    } curBranchPtr=Branch;

BranchLevel++;
    HWND hdlg=GetParent(Msg.Receiver);
    ReturnPageNumb=FileInfo->Branch_pageReturn[i];
    ReturnPageMode=FileInfo->Branch_returnMode[i]; // new version if (!strcmp(branchlessonname, ""))
    {
      int temp=0;
      BOOL BRANCHPAGE_EXIST=FALSE;
//         for (int j=FileInfo->Branch_pageBranch[i]; j<FileInfo->Record.NumbPages
//         {
         int BranchPageNumber=FileInfo->Branch_pageBranch[i];
         if (FileInfo->Record.PageType[BranchPageNumber]==branchpage || FileInfo-
     BRANCHPAGE_EXIST=TRUE;
//         }
            // If branch to a branch page.
            if (BRANCHPAGE_EXIST)
            {
       for (int j=FileInfo->Branch_pageBranch[i]; j<FileInfo->Record.NumbPages;
       {
     if (FileInfo->Record.PageType[j]==branchpage || FileInfo->Record.PageType[
     {
       if (FileInfo->Record.EndOfBranch[j] != 1)
          ShowPageNumbArray[temp++]=j;
     }
     if (FileInfo->Record.PageType[j]==datapage || FileInfo->Record.PageType[j]
                 FileInfo->Record.EndOfBranch[j]==1)
     {
       if (FileInfo->Record.EndOfBranch[j] == 1)
          ShowPageNumbArray[temp++] = j;
       break;
     }
     }
            }

TotalShowPageNumb=temp;
          Scrollbar->SetRange(0, temp-1);
```

```
                  // Branch to Branch page.
   if (BRANCHPAGE_EXIS.
   { CurrentPageNumb=0;
Scrollbar->SetPosition(0);
          }
    else  // Branch to Data Page.
    { CurrentPageNumb=FileInfo->Branch_pageBranch[i];
      int temp=0;
      for (int *t=0; t<FileInfo->Record.NumbPages; t++)
        ShowPageNumbArray[t]=0;

if (FileInfo->Record.PageType[CurrentPageNumb]==prespage ||
FileInfo->Record.PageType[CurrentPageNumb]==datapage || FileInfo->Record.Pag
      {
         for (int i=0; i<FileInfo->Record.NumbPages; i++)
   { if (FileInfo->Record.PageType[i]==prespage || FileInfo->Record.PageType[i
      {    ShowPageNumbArray[temp++]=i;
  TotalShowPageNumb++;
      }
              }
       }
             Scrollbar->SetPosition(CurrentPageNumb);
    } short gotoMode=FileInfo->Branch_gotoMode[i];
    if (gotoMode == branchPageQuest)
    { CurrentPageNumb=FileInfo->Branch_pageBranch[i];
SendMessage(hdlg, Branch_ToPageQuest, 0,0L);
            }
    else
    { SetCursor(LoadCursor(NULL, IDC_WAIT));
SetCapture(HWindow);
SendMessage(hdlg, TRS_SCROLLBARMOVED, 0,0L);
ReleaseCapture();
    }
           break;
         }
  else
  {
    short gotoMode=FileInfo->Branch_gotoMode[i];
    CurrentPageNumb=FileInfo->Branch_pageBranch[i];

if (gotoMode == branchLessonQuest)
SendMessage(hdlg, Branch_ToLessonQuest, 0, 0L);
    else
    { if (gotoMode == branchLessonScan)
   BRANCHTOLSNSCAN=TRUE;
SendMessage(hdlg, Branch_ToLesson, 0, 0L);
           }
    break;
         }
```

```
       } // If Point if Pranch.
      }
    }   // End of handle for branches.
  }       // End of Special handle if Version is >2.0 .

ReleaseDC(HWindow, DC);
} void TemplateLessonDialog::HandleBranchBlink(RTMessage Msg)
{
        HDC DC=GetDC(HWindow);
 HRGN hrgn=CreateRectRgn(X+FileInfo->BranchRect[BranchID].left, Y+FileInfo->Bran
        int numbBlinks=Msg.WParam;
 if (numbBlinks<0 || numbBlinks>10)
    numbBlinks=4;

for (int i=0; i<numbBlinks; i++)
        { InvertRgn(DC, hrgn);
          Delay(0.056);
        }
        DeleteObject(hrgn);
        ReleaseDC(HWindow, DC);
} void TemplateLessonDialog::HandleBranchTo(short CurBranch)
{
        short pageNumb, pageType;
        short gotoMode=FileInfo->Branch_gotoMode[CurBranch];

if (gotoMode !=branchPageGoto && gotoMode !=branchLesson &&
            gotoMode !=branchPageQuest && gotoMode !=branchLessonScan)
           return;      // Nothing Happens.

if (gotoMode == branchPageGoto)
        {
           pageNumb=FileInfo->Branch_pageBranch[CurBranch];
           pageType=FileInfo->Record.PageType[pageNumb];
           if (pageNumb<0 || pageNumb>FileInfo->Record.NumbPages ||
               (pageType !=prespage && pageType !=datapage &&
                pageType !=branchprespage && pageType !=branchpage) )
              return;   // Nothing Happens
        } if (gotoMode == branchPageQuest)
        {
           pageNumb=FileInfo->Branch_pageBranch[CurBranch];
           pageType=FileInfo->Record.PageType[pageNumb];
           if (pageNumb<0 || pageNumb>FileInfo->Record.NumbPages ||
               (pageType !=datapage && pageType !=branchpage) )
              return;   // Nothing Happens
        }
```

```
        if (gotoMode == branchLesson || gotoMode == branchPageGoto ||
            gotoMode == branchPageQuest || gotoMode == branchLessonScan)
        { // Define Branch Record.
        } if (gotoMode==branchLesson || gotoMode==branchLessonScan)
        {
        } else if (gotoMode == branchPageGoto)
        {
        }
        else if (gotoMode == branchPageQuest)
        {
        }
}

/*********************************************************************/
/*                    Pict2TextR Lesson Dialog Class                 */
/*********************************************************************/

PictText_LessonDialog::PictText_LessonDialog(PTWindowsObject AParent, LPSTR ANam
        TemplateLessonDialog(AParent, AName)
{
} void PictText_LessonDialog::SetupWindow()
{
 TDialog::SetupWindow();
 MoveWindow(HWindow, 0,29, 640, 420, 1);

if (DisplayRadioText1)
  { SendMessage(GetItemHandle(TRS_RBUTTON1), BM_SETCHECK, TRUE,0L);
        SetWindowText(GetItemHandle(TRS_PICT2TXTRTEXT1), RadioText1);
     }
     else
     { SendMessage(GetItemHandle(TRS_RBUTTON2), BM_SETCHECK, TRUE,0L);
        SetWindowText(GetItemHandle(TRS_PICT2TXTRTEXT1), RadioText2);
     }
} void PictText_LessonDialog::HandleRadionButton1(RTMessage Msg)
{
        ProcessRadioButton1(TRS_RBUTTON1, TRS_PICT2TXTRTEXT1, Msg);
} void PictText_LessonDialog::HandleRadionButton2(RTMessage Msg)
```

```
{
        ProcessRadioButton(TRS_RBUTTON2, TRS_PICT2TXTEXT1, Msg);
} void PictText_LessonDialog::WMDrawItem(RTMessage)
{
        SendMessage(HWindow, TRS_REDRAWITEM, 0, 0);
}

/*********************************************************************/
/*                PictText1 Lesson Dialog Class                      */
/*********************************************************************/

Pict1Text_LessonDialog::Pict1Text_LessonDialog(PTWindowsObject AParent, LPSTR AN
        TemplateLessonDialog(AParent, AName)
{
} void Pict1Text_LessonDialog::SetupWindow()
{
 TDialog::SetupWindow();
 MoveWindow(HWindow, 0,29, 640, 420, 1);
        SetWindowText(GetItemHandle(TRS_PICTTEXT1EDIT), RadioText1);
} void Pict1Text_LessonDialog::WMDrawItem(RTMessage)
{
        SendMessage(HWindow, TRS_REDRAWITEM, 0, 0);
}

/*********************************************************************/
/*                Pict4TextR Lesson Dialog Class                     */
/*********************************************************************/

Pict4TextR_LessonDialog::Pict4TextR_LessonDialog(PTWindowsObject AParent, LPSTR
        TemplateLessonDialog(AParent, AName)
{
} void Pict4TextR_LessonDialog::SetupWindow()
{
 TDialog::SetupWindow();
 MoveWindow(HWindow, 0,29, 640, 420, 1);
        if (DisplayRadioText1)
          { SendMessage(GetItemHandle(TRS_PICT4TXTRRBTN1), BM_SETCHECK, TRUE,0L);
            SetWindowText(GetItemHandle(TRS_PICT4TXTRRTXT1), RadioText1);
          }
```

```
            else
            { SendMessage(GetItemHandle(TRS_PICT4TXTRRBTN2, BM_SETCHECK, TRUE,0L);
              SetWindowText(GetItemHandle(TRS_PICT4TXTRRTXT1), RadioText2);
            }
            if (DisplayRadioText3)
            { SendMessage(GetItemHandle(TRS_PICT4TXTRRBTN3), BM_SETCHECK, TRUE,0L);
              SetWindowText(GetItemHandle(TRS_PICT4TXTRRTXT2), RadioText3);
            }
            else
            { SendMessage(GetItemHandle(TRS_PICT4TXTRRBTN4), BM_SETCHECK, TRUE,0L);
              SetWindowText(GetItemHandle(TRS_PICT4TXTRRTXT2), RadioText4);
            }
} void Pict4TextR_LessonDialog::HandleRadionButton1(RTMessage Msg)
{
        ProcessRadioButton1(TRS_PICT4TXTRRBTN1, TRS_PICT4TXTRRTXT1, Msg);
} void Pict4TextR_LessonDialog::HandleRadionButton2(RTMessage Msg)
{
        ProcessRadioButton2(TRS_PICT4TXTRRBTN2, TRS_PICT4TXTRRTXT1, Msg);
} void Pict4TextR_LessonDialog::HandleRadionButton3(RTMessage Msg)
{
        ProcessRadioButton3(TRS_PICT4TXTRRBTN3, TRS_PICT4TXTRRTXT2, Msg);
} void Pict4TextR_LessonDialog::HandleRadionButton4(RTMessage Msg)
{
        ProcessRadioButton4(TRS_PICT4TXTRRBTN4, TRS_PICT4TXTRRTXT2, Msg);
} void Pict4TextR_LessonDialog::WMDrawItem(RTMessage)
{
        SendMessage(HWindow, TRS_REDRAWITEM, 0, 0);
}

/**********************************************************************/
/*                  Pict3TextRup Lesson Dialog Class                  */
/**********************************************************************/

Pict3TextRup_LessonDialog::Pict3TextRup_LessonDialog(PTWindowsObject AParent, LP
        TemplateLessonDialog(AParent, AName)
{
}
```

```
void Pict3TextRup_LessonDialog::SetupWindow()
{
 TDialog::SetupWindow();
 MoveWindow(HWindow, 0,29, 640, 420, 1);

if (DisplayRadioText1)
         { SendMessage(GetItemHandle(TRS_PICT3TEXTRUPRBTN1), BM_SETCHECK, TRUE,0L)
           SetWindowText(GetItemHandle(TRS_PICT3TEXTRUPTEXT1), RadioText1);
         }
         else
         { SendMessage(GetItemHandle(TRS_PICT3TEXTRUPRBTN2), BM_SETCHECK, TRUE,0L)
           SetWindowText(GetItemHandle(TRS_PICT3TEXTRUPTEXT1), RadioText2);
         }

SetWindowText(GetItemHandle(TRS_PICT3TEXTRUPEDIT1), RadioText3);
} void Pict3TextRup_LessonDialog::HandleRadionButton1(RTMessage Msg)
{
        ProcessRadioButton1(TRS_PICT3TEXTRUPRBTN1, TRS_PICT3TEXTRUPTEXT1, Msg);
} void Pict3TextRup_LessonDialog::HandleRadionButton2(RTMessage Msg)
{
        ProcessRadioButton2(TRS_PICT3TEXTRUPRBTN2, TRS_PICT3TEXTRUPTEXT1, Msg);
} void Pict3TextRup_LessonDialog::WMDrawItem(RTMessage)
{
        SendMessage(HWindow, TRS_REDRAWITEM, 0, 0);
}

/****************************************************************************/
/*                    Pict3TextRDown Lesson Dialog Class                    */
/****************************************************************************/

Pict3TextRDown_LessonDialog::Pict3TextRDown_LessonDialog(PTWindowsObject AParent
        TemplateLessonDialog(AParent, AName)
{
} void Pict3TextRDown_LessonDialog::SetupWindow()
{
        TDialog::SetupWindow();
 MoveWindow(HWindow, 0,29, 640, 420, 1);
        if (DisplayRadioText1)
```

```
            { SendMessage(GetItemHandle(TRS_PICT3TEXTDOWNRBTN3), BM_SETCHECK, TRUE,0
              SetWindowText(Ge. _emHandle(TRS_PICT3TEXTDOW  EXT1), RadioText3);
            }
          else
            { SendMessage(GetItemHandle(TRS_PICT3TEXTDOWNRBTN4), BM_SETCHECK, TRUE,0L
              SetWindowText(GetItemHandle(TRS_PICT3TEXTDOWNTEXT1), RadioText4);
            }
//          if (RadioText1!=NULL)
//      SetWindowText(GetItemHandle(TRS_PICT3TEXTDOWNEDIT), RadioText1);
//    else
//      SetWindowText(GetItemHandle(TRS_PICT3TEXTDOWNEDIT), RadioText2);
} void Pict3TextRDown_LessonDialog::HandleRadionButton3(RTMessage Msg)
{
        ProcessRadioButton3(TRS_PICT3TEXTDOWNRBTN3, TRS_PICT3TEXTDOWNTEXT1, Msg);
} void Pict3TextRDown_LessonDialog::HandleRadionButton4(RTMessage Msg)
{
        ProcessRadioButton4(TRS_PICT3TEXTDOWNRBTN4, TRS_PICT3TEXTDOWNTEXT1, Msg);
} void Pict3TextRDown_LessonDialog::WMDrawItem(RTMessage)
{
    SetWindowText(GetItemHandle(TRS_PICT3TEXTDOWNEDIT), RadioText1);
    SetWindowText(GetItemHandle(TRS_PICT3TEXTDOWNEDIT), RadioText2);

SendMessage(HWindow, TRS_REDRAWITEM, 0, 0);
}

/*******************************************************************/
/*               Pict Lesson Dialog Class                        */
/*******************************************************************/

Pict_LessonDialog::Pict_LessonDialog(PTWindowsObject AParent, LPSTR AName):
        TemplateLessonDialog(AParent, AName)
{
} void Pict_LessonDialog::SetupWindow()
{
 TDialog::SetupWindow();
 MoveWindow(HWindow, 0,29, 640, 420, 1);
} void Pict_LessonDialog::WMDrawItem(RTMessage)
```

```c
{
        SendMessage(HWindow, TRS_REDRAWITEM, 0, 0);
}

/****************************************************************/
/*                  Text4 Lesson Dialog Class                  */
/****************************************************************/

Text4_LessonDialog::Text4_LessonDialog(PTWindowsObject AParent, LPSTR AName):
        TemplateLessonDialog(AParent, AName)
{
} void Text4_LessonDialog::SetupWindow()
{
 TDialog::SetupWindow();
 MoveWindow(HWindow, 0,29,640,420,1);

/* ***************************Reading text directly from file.
FILE *in;
char *weii;
int handle;

if ((handle=open("c:\\test\\text\\coop.txt", O_CREAT | O_TEXT))==-1)
        MessageBox(NULL, "can not open file", "", MB_OK);

if ((in=fopen("c:\\test\\text\\coop.txt", "rt"))==NULL)
 MessageBox(NULL, "cannot open file for reading", "", MB_OK);

if ((weii=(char *) malloc(filelength(handle)))==NULL)
        MessageBox(NULL, "cannot allocate enough space", "", MB_OK);

fread(weii, filelength(handle), 1,in);
int i, length;
length=strlen(weii);
for (i=0; i<length; i++)
        if (weii[i]=='\r' || weii[i]=='\n')
                weii[i]=' ';
weii[strlen(weii)-1]='\0';
//      strcpy(temp, "Modeling is the process of creating a model by defining th
        SetWindowText(GetItemHandle(TRS_TXTLESNSTTEXT1), weii);

free(weii);
fclose(in);
close(handle);

*/
        SetWindowText(GetItemHandle(TRS_TXTLESNSTTEXT1), RadioText1);
        SetWindowText(GetItemHandle(TRS_TXTLESNSTTEXT2), RadioText2);
```

```
        SetWindowText(GetItemHandle(TRS_TXTLESNSTTEXT3), RadioText3);
        SetWindowText(GetItemHandle(TRS_TXTLESNSTTEXT4, RadioText4);
}
/*********************************************************************/
/*                 Pict2Text Lesson Dialog Class                     */
/*********************************************************************/

Pict2Text_LessonDialog::Pict2Text_LessonDialog(PTWindowsObject AParent, LPSTR AN
        TemplateLessonDialog(AParent, AName)
{
} void Pict2Text_LessonDialog::SetupWindow()
{
 TDialog::SetupWindow();
 MoveWindow(HWindow, 0,29,640,420,1);
        if (RadioText1!=NULL)
   SetWindowText(GetItemHandle(TRS_PICT2TXTSTTEXT1), RadioText1);
 else
   SetWindowText(GetItemHandle(TRS_PICT2TXTSTTEXT1), RadioText2);
        if (RadioText3!=NULL)
   SetWindowText(GetItemHandle(TRS_PICT2TXTSTTEXT2), RadioText3);
 else
   SetWindowText(GetItemHandle(TRS_PICT2TXTSTTEXT2), RadioText4);
} void Pict2Text_LessonDialog::WMDrawItem(RTMessage)
{
        SendMessage(HWindow, TRS_REDRAWITEM, 0, 0);
}

/*********************************************************************/
/*                   Text Lesson Dialog Class                        */
/*********************************************************************/

Text_LessonDialog::Text_LessonDialog(PTWindowsObject AParent, LPSTR AName):
        TemplateLessonDialog(AParent, AName)
{
} void Text_LessonDialog::SetupWindow()
{
 TDialog::SetupWindow();
 MoveWindow(HWindow, 0,29,640,420,1);
        SetWindowText(GetItemHandle(TRS_TEXTEDIT1), RadioText1);
}
```

```
/*********************************************************************/
/*                    Text2V Lesson Dialog Class                     */
/*********************************************************************/

Text2V_LessonDialog::Text2V_LessonDialog(PTWindowsObject AParent, LPSTR AName):
        TemplateLessonDialog(AParent, AName)
{
} void Text2V_LessonDialog::SetupWindow()
{
 TDialog::SetupWindow();
 MoveWindow(HWindow, 0,29,640,420,1);
        SetWindowText(GetItemHandle(TRS_TEXT2VEDIT1), RadioText1);
        SetWindowText(GetItemHandle(TRS_TEXT2VEDIT2), RadioText2);
}

/*********************************************************************/
/*                    Text2H Lesson Dialog Class                     */
/*********************************************************************/

Text2H_LessonDialog::Text2H_LessonDialog(PTWindowsObject AParent, LPSTR AName):
        TemplateLessonDialog(AParent, AName)
{
} void Text2H_LessonDialog::SetupWindow()
{
 TDialog::SetupWindow();
 MoveWindow(HWindow, 0,29, 640, 420, 1);
 SetWindowText(GetItemHandle(TRS_TEXT2HEDIT1), RadioText1);
        SetWindowText(GetItemHandle(TRS_TEXT2HEDIT2), RadioText2);
}

/*********************************************************************/
/*                    Text3Top2 Lesson Dialog Class                  */
/*********************************************************************/

Text3Top2_LessonDialog::Text3Top2_LessonDialog(PTWindowsObject AParent, LPSTR AN
```

```
        TemplateLessonDialog(AParent, AName)
{
} void Text3Top2_LessonDialog::SetupWindow()
{
 TDialog::SetupWindow();
 MoveWindow(HWindow, 0,29, 640, 420, 1);
 SetWindowText(GetItemHandle(TRS_TEXT3TOP2EDIT1), RadioText1);
 SetWindowText(GetItemHandle(TRS_TEXT3TOP2EDIT2), RadioText2);
 SetWindowText(GetItemHandle(TRS_TEXT3TOP2EDIT3), RadioText3);
}

/*********************************************************************/
/*                 Text3Top1 Lesson Dialog Class                     */
/*********************************************************************/

Text3Top1_LessonDialog::Text3Top1_LessonDialog(PTWindowsObject AParent,LPSTR ANa
        TemplateLessonDialog(AParent, AName)
{
} void Text3Top1_LessonDialog::SetupWindow()
{
 TDialog::SetupWindow();
 MoveWindow(HWindow, 0,29, 640, 420, 1);
 SetWindowText(GetItemHandle(TRS_TEXT3TOP1EDIT1), RadioText1);
 SetWindowText(GetItemHandle(TRS_TEXT3TOP1EDIT2), RadioText2);
 SetWindowText(GetItemHandle(TRS_TEXT3TOP1EDIT3), RadioText3);
}
```

BITMAP.CPP

```
lude "bitmap.hpp"

/************************************************************************
right:      Taras Development Corporation 1992
ram :       Taras Tutor
tor:
ription:    The User Interface of the Pace project.
ion:        1.0
************************************************************************/ apWindow::BitmapWindow()

C DCHandle;

tmapHandle = 0;
Handle = CreateDC("Display", NULL, NULL, NULL);
 ( GetDeviceCaps(DCHandle, NUMCOLORS) < 3 )
Mode = NOTSRCCOPY;
se
Mode = SRCCOPY;
leteDC(DCHandle);

apWindow::~BitmapWindow()

farfree(plgpl);
 ( BitmapHandle ) -
DeleteObject(BitmapHandle);

opys the bitmap bit data from the file into memory. Since
pying cannot cross a segment (64K) boundary, we are forced
 do segment arithmetic to compute the next segment.  Created
LongType type to simplify the process. */

BitmapWindow::GetBitmapData(int TheFile, HANDLE BitsHandle,long BitsByteSize)

ng Count;
ng Start, ToAddr, Bits;
```

Page 1

43

BITMAP.CPP

```
art = 0L;
ts = (long)GlobalLock(BitsHandle);
unt = BitsByteSize - Start;
ile ( Count > 0 )

ToAddr = MAKELONG(LOWORD(Start),
                  HIWORD(Bits) + (HIWORD(Start) * FP_OFF(__ahIncr)));
if ( Count > 0x4000 )
  Count = 0x4000;
_lread(TheFile, (LPSTR)ToAddr, (WORD)Count);
Start = Start + Count;
Count = BitsByteSize - Start;

obalUnlock(BitsHandle);

ttempt to open a Windows 3.0 device independent bitmap. */

BitmapWindow::OpenDIB(int TheFile, BOOL newdialog, HWND HWindow)

WORD bitCount;
WORD size;
long longWidth;
HDC DCHandle;
LPSTR BitsPtr;
BITMAPINFO *BitmapInfo;
HBITMAP BitsHandle , NewBitmapHandle;
DWORD NewPixelWidth , NewPixelHeight;
BOOL retval;

tval= TRUE;
lseek(TheFile, 28, 0);
read(TheFile, (LPSTR)&bitCount, sizeof(bitCount));
  ( bitCount <= 8 )

size = sizeof(BITMAPINFOHEADER) + ((1 << bitCount) * sizeof(RGBQUAD));
BitmapInfo = (BITMAPINFO *)new char[size];
_llseek(TheFile, sizeof(BITMAPFILEHEADER), 0);
_lread(TheFile, (LPSTR)BitmapInfo, size);
NewPixelWidth = BitmapInfo->bmiHeader.biWidth;
NewPixelHeight = BitmapInfo->bmiHeader.biHeight;
```

Page 2

BITMAP.CPP

/************* Choose graphic own palette.**********/
ART
int cColors;
if(BitmapInfo->bmiHeader.biClrUsed != 0)
    cColors=(unsigned int)BitmapInfo->bmiHeader.biClrUsed;

therwise, the number of colors depends on the bits per pixel
if (BitmapInfo->bmiHeader.biBitCount==1)
    cColors=2;
if (BitmapInfo->bmiHeader.biBitCount==4)
    cColors=16;
if (BitmapInfo->bmiHeader.biBitCount==8)
    cColors=256;

reate new palette.
HPALETTE hpal;
plgpl=(LPLOGPALETTE) farmalloc(sizeof(LOGPALETTE)+cColors*
                    sizeof(PALETTEENTRY));

plgpl->palNumEntries=cColors;
plgpl->palVersion=0x0300;

LPBITMAPINFO p_bi=(LPBITMAPINFO)BitmapInfo;

for (int i=0; i<cColors; i++)
{
    plgpl->palPalEntry[i].peRed=p_bi->bmiColors[i].rgbRed;
    plgpl->palPalEntry[i].peGreen=p_bi->bmiColors[i].rgbGreen;
    plgpl->palPalEntry[i].peBlue=p_bi->bmiColors[i].rgbBlue;
    plgpl->palPalEntry[i].peFlags=NULL; //PC_RESERVED;
}
hpal=CreatePalette(plgpl);
  LocalFree((HLOCAL) plgpl);
D1 longWidth = (((NewPixelWidth * bitCount) + 31)/32) * 4;
BitmapInfo->bmiHeader.biSizeImage = longWidth * NewPixelHeight;
GlobalCompact(-1);
BitsHandle = (HBITMAP)GlobalAlloc(GMEM_MOVEABLE | GMEM_ZEROINIT,
  BitmapInfo->bmiHeader.biSizeImage);
GetBitmapData(TheFile, BitsHandle, BitmapInfo->bmiHeader.biSizeImage);
  DCHandle = CreateDC("Display", NULL, NULL, NULL);
```

BITMAP.CPP

```
DCHandle=GetDC(HWindow);
BitsPtr = (LPSTR)GlobalLock((HGLOBAL)BitsHandle);

NTINUE END1
eplace system palette.
HPALETTE hpalold;
hpalold = SelectPalette(DCHandle, hpal, FALSE);
RealizePalette(DCHandle);

NewBitmapHandle =
   CreateDIBitmap(DCHandle, &(BitmapInfo->bmiHeader), CBM_INIT, BitsPtr,
   BitmapInfo, 0);

InvalidateRect(HWindow, NULL, TRUE);
SelectPalette(DCHandle, hpalold, FALSE);
DeleteObject(hpal);

ND

ReleaseDC(HWindow, DCHandle);
   DeleteDC(DCHandle);
GlobalUnlock(BitsHandle);
GlobalFree(BitsHandle);
farfree(plgpl);
delete BitmapInfo;
if ( NewBitmapHandle )
{
   if ( BitmapHandle && newdialog)
     DeleteObject(BitmapHandle);   // Clear any previous handle.
   BitmapHandle = NewBitmapHandle;
     DeleteObject(NewBitmapHandle);   //wei
   PixelWidth = (WORD)NewPixelWidth;
   PixelHeight = (WORD)NewPixelHeight;
}
else
{ retval = FALSE;
   BitmapHandle=NULL;
} se
 retval = FALSE;
 BitmapHandle=NULL;
```

Page 4

BITMAP.CPP

```
rn retval;

est if the passed file is a Windows 3.0 DI bitmap and if so read it.
port errors if unable to do so. Adjust the Scroller to the new
tmap dimensions. */

BitmapWindow::LoadBitmapFile(LPSTR Name, BOOL newdialog, HWND HWindow)

int TheFile;
long TestWin30Bitmap;

eFile = _lopen(Name, OF_READ);
 ( TheFile != -1 )

_llseek(TheFile, 14, 0);
_lread(TheFile, (LPSTR)&TestWin30Bitmap, sizeof(TestWin30Bitmap));
if ( TestWin30Bitmap == 40 )
     { if ( OpenDIB(TheFile, newdialog, HWindow) )
       { _lclose(TheFile);
          return TRUE;
       }
       else
        { MessageBox(GetFocus(),"Unable to create Windows 3.0 bitmap from file",
age Tutor", MB_OK);
           _lclose(TheFile);
           return FALSE;
        }
    }
else
   {  MessageBox(GetFocus(), "Not a Windows 3.0 bitmap file", "Language Tutor",
;
     _lclose(TheFile);
     return FALSE;
   } se
 MessageBox(GetFocus(), "Cannot open bitmap file", "Language Tutor", MB_OK|MB_I
);
 _lclose(TheFile);
 return FALSE;
```

Page 5

BITMAP.CPP

```
_lclose(TheFile);
return TRUE;
``` esponds to an incoming "paint" message by redrawing the bitmap.
The Scroller's BeginView method, which sets the viewport origin
elative to the present scroll position, has already been called.)  */

```
 BitmapWindow::Paint(HDC, PAINTSTRUCT& PaintInfo)

C MemoryDC;
NDLE OldBitmapHandle;

( BitmapHandle )

MemoryDC = CreateCompatibleDC(PaintInfo.hdc);
OldBitmapHandle = SelectObject(MemoryDC, BitmapHandle);
if ( Mode == SRCCOPY )
{
  SetBkColor(PaintInfo.hdc, GetNearestColor(PaintInfo.hdc, 0x800000L));
  SetTextColor(PaintInfo.hdc, 0xFFFFFFL);
}
BitBlt(PaintInfo.hdc, 58, 100, PixelWidth, PixelHeight,MemoryDC, 0, 0, Mode);
SelectObject(MemoryDC, OldBitmapHandle);
DeleteDC(MemoryDC);
```

Page 6

EXAM.CPP

```
lude "exam.hpp"

/************************************************************************
right:      Taras Development Corporation, 1992
ram :       Taras Tutor
tor:
ription:    The User Interface of the Pace project.
ion:        1.0
************************************************************************/

/************************************************************************/
/*                  Start Exam Dialog Class                             */
/************************************************************************/

Dialog::ExamDialog(PTWindowsObject AParent, LPSTR AName):
    TDialog(AParent, AName)

ExamDialog::SetupWindow()

char PageName[200], pagenumb[5];
    int i;

TDialog::SetupWindow();
    SendMessage(GetItemHandle(TRS_EXAMLIST), LB_RESETCONTENT, 0, 0);
    for (i=0; i<30; .i++)
    { if (WrongLessonPage[i]!=-1)
       { if (WrongLessonPage[i]<10)
            strcpy(PageName, "   ");
         else
            strcpy(PageName, " ");
         sprintf(pagenumb, "%d", WrongLessonPage[i]);
         strcat(PageName, pagenumb);
         strcat(PageName, ". ");
         strcat(PageName, FileInfo->Record.PageTitle[ShowPageNumbArray[WrongLes
[i]]]);
         if (SendMessage(GetItemHandle(TRS_EXAMLIST), LB_FINDSTRING, 0, (LPARAM
R)PageName)==LB_ERR)
             SendMessage(GetItemHandle(TRS_EXAMLIST), LB_ADDSTRING, 0, (LPARAM)
```

Page 1

EXAM.CPP

```
PageName);
        }
    }
    SendMessage(GetItemHandle(TRS_EXAMLIST), LB_SETSEL, 1, 0);

time_t t;
    time(&t);
    SetWindowText(GetItemHandle(TRS_EXAMDATE), ctime(&t));
    SetWindowText(GetItemHandle(TRS_LESNTOPIC), ExamTopic);
    SetWindowText(GetItemHandle(TRS_EXAMPERCENT), ExamGrade);
    SetWindowText(GetItemHandle(TRS_EXAMTIME), elapsedtime);
    DWORD count= SendMessage(GetItemHandle(TRS_EXAMLIST), LB_GETCOUNT, 0, 0L);
    char temp[10];
    strcpy(temp, Pref_TotalNumQ);
    SetWindowText(GetItemHandle(TRS_EXAMQNUM), temp);

ExamDialog::Save(RTMessage)

ar text[100], string[200], temp[20], Path[255];
t i; DWORD count;
STRUCT ofs;

rcpy(Path, TarasPath); strcat(Path, "EXAM.INI");
 (OpenFile(Path,&ofs,OF_EXIST)!=HFILE_ERROR)
    OpenFile(Path, &ofs, OF_DELETE);

tWindowText(GetItemHandle(TRS_EXAMDATE), text, sizeof(text));
itePrivateProfileString("EXAM RESULTS", "Exam Date", text, Path);
tWindowText(GetItemHandle(TRS_LESNTOPIC), text, sizeof(text));
itePrivateProfileString("EXAM RESULTS", "Lesson Topic", text, Path);
tWindowText(GetItemHandle(TRS_EXAMPERCENT), text, sizeof(text));
itePrivateProfileString("EXAM RESULTS", "Correct Percentage", text, Path);
tWindowText(GetItemHandle(TRS_EXAMTIME), text, sizeof(text));
itePrivateProfileString("EXAM RESULTS", "Exam Time", text, Path);
tWindowText(GetItemHandle(TRS_EXAMQNUM), text, sizeof(text));
itePrivateProfileString("EXAM RESULTS", "Number of Questions", text, Path);
itePrivateProfileString("EXAM RESULTS", "Lesson Pages Missed", "", Path);
unt = SendMessage(GetItemHandle(TRS_EXAMLIST), LB_GETCOUNT, 0, 0L);
r (i=0; i<count; i++)
    SendMessage(GetItemHandle(TRS_EXAMLIST), LB_GETTEXT, i, (LPARAM) ((LPSTR) str
```

Page 2

EXAM.CPP

```
  sprintf(temp, "%d", i+1); strcat(temp, ") ");
  WritePrivateProfileString("EXAM RESULTS", temp, string, Path);

ssageBox(GetFocus(), "File saved as exam.ini in the tutor directory", "Language
, MB_OK|MB_ICONASTERISK);
tFocus(HWindow);

ExamDialog::Review(RTMessage)

int pageno, currentpage, i; DWORD count; char string[100];
HWND hdlg;

if(SendMessage(GetItemHandle(TRS_EXAMLIST), LB_GETSELCOUNT, 0, 0L)>0){
currentpage=Scrollbar->GetPosition();
hdlg=GetParent(HWindow);
ExamMode=TRUE; ExamReview=TRUE;

ShowWindow(HWindow, SW_HIDE);

LesnBtmpRedrawFlag=0;    // Lesson page bitmap redraw flag.
InvalidateRect(NULL, NULL, 0);
HideButton();
ShowWindow(ptTemplateLessonDialog->HWindow, SW_HIDE);
InvalidateRect(HWindow, NULL, TRUE);
firsttime=TRUE;
ShowWindow(HWindow, SW_HIDE);
count=SendMessage(GetItemHandle(TRS_EXAMLIST), LB_GETCOUNT, 0, 0L);
for (i=0; i<=count-1; i++)
{
 if (SendMessage(GetItemHandle(TRS_EXAMLIST), LB_GETSEL, i, 0L))
  {
    SendMessage(GetItemHandle(TRS_EXAMLIST), LB_SETSEL, 0, i);
    SendMessage(GetItemHandle(TRS_EXAMLIST), LB_GETTEXT, i, (LPARAM)((LPSTR) st char tt[25];
      sprintf(tt, "%d,%d", GetPageNo(string),ShowPageNumbArray[GetPageNo(string)
      MessageBox(NULL, tt, "no, showpageno", MB_OK);
      pageno=ShowPageNumbArray[GetPageNo(string)];
    pageno=GetPageNo(string);
    Scrollbar->SetPosition(pageno);
```

EXAM.CPP

```
    SendMessage(hdlg, TRS_HITTESTBUTTON,0, 0L);
    }
}
ExamMode=FALSE;
ExamReview=FALSE;
Scrollbar->SetPosition(currentpage);
LesnBtmpRedrawFlag=1; strcpy(DialogName, "");
ShowWindow(ptTemplateLessonDialog->HWindow, SW_SHOW);
ShowButton();
ShowWindow(HWindow, SW_SHOW);

se
MessageBox(GetFocus(), "Please make your selection(s).", "Language Tutor", MB_O
SetFocus(HWindow);

ExamDialog::HandleExamList(RTMessage Msg)

switch (Msg.LP.Hi)
    {
            case LBN_DBLCLK:
                    SendMessage(HWindow, WM_COMMAND, TRS_EXAMREVIEW, 0);
                    break;
    }
```

Page 4

LESNLIST.CPP

```cpp
lude "lesnlist.hpp"

/***********************************************************************
right:      Taras Development Corporation, 1992
ram :       Taras Tutor
tor:              ;
ription:    The User Interface of the Pace project.
ion:        1.0
***********************************************************************/

/***********************************************************************/
/*              Lesson Content Dialog Box                              */
/***********************************************************************/
onListBox::LessonListBox(PTWindowsObject AParent, LPSTR AName):
    TDialog(AParent, AName)

LessonListBox::WMControlColor(RTMessage Msg)

switch (Msg.LP.Hi) {
            case CTLCOLOR_LISTBOX:
     { SetBkColor((HDC)Msg.WParam, RGB(0xc0,0xc0,0xc0));
             SetTextColor((HDC)Msg.WParam, RGB(0,64,128));
             SetBkMode((HDC)Msg.WParam, TRANSPARENT);
             Msg.Result = (LRESULT)GetStockObject(LTGRAY_BRUSH);
     }
                             break;
             case CTLCOLOR_DLG:
  Msg.Result = (LRESULT)GetStockObject(LTGRAY_BRUSH);
             break;
             case CTLCOLOR_STATIC:
  SetBkColor((HDC)Msg.WParam, RGB(0xc0,0xc0,0xc0));
  SetTextColor((HDC)Msg.WParam, RGB(0,0,0));
                 SetBkMode((HDC)Msg.WParam, TRANSPARENT);
                 Msg.Result = (LRESULT)GetStockObject(LTGRAY_BRUSH);
             break;
             default:
                     DefWndProc(Msg);
```

LESNLIST.CPP

```cpp
LessonListBox::SetupWindow()

int i; char PageName[50], temp[200];
    struct ffblk ffblk; int done;

TDialog::SetupWindow();
    MoveWindow(HWindow, 0,0, 640, 480, 1);

SendMessage(GetItemHandle(LessonContentListBox), LB_RESETCONTENT, 0, 0);

// get the stored path, if not use the default exe path.
    GetPrivateProfileString(Section1, EntryDir, TarasPath, temp, sizeof(temp),
e);
    strcat(temp, "*.lsn");
    done=findfirst(temp, &ffblk, 0);        // on success, return 0
    while (!done)
    {
        for (i=0; i<50; i++)
        {   if (!stricmp(ffblk.ff_name, LessonOriginalName[i]))
            {   strcpy(PageName, LessonListName[i]);
                SendMessage(GetItemHandle(LessonContentListBox), LB_ADDSTRING,
RAM) (LPSTR)PageName);
                i=50;
            }
        }
        done=findnext(&ffblk);
    }
    SendMessage(GetItemHandle(LessonContentListBox), LB_SETCURSEL, SelectedLess
, 0);

LessonListBox::Ok(RTMessage Msg)

DWORD index;
  if  (SendMessage(GetItemHandle(LessonContentListBox), LB_GETCOUNT, 0, 0L))
  {   index=SendMessage(GetItemHandle(LessonContentListBox), LB_GETCURSEL, 0, 0L)
                        SendMessage(GetItemHandle(LessonContentListBox), LB
T, index, (LPARAM) ((LPSTR) TarasFileName));
                        NOLESSONFILE=FALSE; LesnBtmpRedrawFlag=TRUE;
```

Page 2

LESNLIST.CPP

```
                    SelectedLessonIndex=index;
}
else
{  MessageBox(HWindow, "No Tutor lesson has been found in the default tutor di
 . Please use 'Open Tutor File' under File Menu to check where your Tutor lesso
de. ", "Language Tutor", MB_OK |MB_ICONSTOP);
                    NOLESSONFILE=TRUE; LesnBtmpRedrawFlag=FALSE;
}
TDialog::Ok(Msg);

LessonListBox::HandleLessonListBox(RTMessage Msg)

switch (Msg.LP.Hi)
    {
            case LBN_DBLCLK:
                SendMessage(HWindow, WM_COMMAND, IDOK, 0);
             break;

case LBN_SELCHANGE:
            default:
                break;
    }

**********************************************************************/
                 ListBox   Dialog Class                               */
**********************************************************************/ sListBoxDialog::TarasListBoxDialog(PTWindowsObject AParent, LPSTR AName):
    TDialog(AParent, AName)

TarasListBoxDialog::SetupWindow()

TDialog::SetupWindow();
    char PageName[255], string[10]; int i;

SendMessage(GetItemHandle(TRS_LISTBOX), LB_RESETCONTENT, 0, 0);
```

LESNLIST.CPP

```cpp
    for (i=1; i<TotalShowPageNumb; i++)
    {  itoa(i, string, 10);
        if (i<10)
            strcpy(PageName, "   ");
        else     .
            strcpy(PageName, "  ");

strcat(PageName, string);
        strcat(PageName, ".  ");
        strcat(PageName, FileInfo->Record.PageTitle[ShowPageNumbArray[i]]);
        SendMessage(GetItemHandle(TRS_LISTBOX), LB_ADDSTRING, 0, (LPARAM) (LPST
ame);
    }
    SendMessage(GetItemHandle(TRS_LISTBOX), LB_SETCURSEL, 0, 0);

TarasListBoxDialog::TarasGotoButton(RTMessage Msg)

int pageno; DWORD index; char string[100];

index=SendMessage(GetItemHandle(TRS_LISTBOX), LB_GETCURSEL, 0, 0L);
    SendMessage(GetItemHandle(TRS_LISTBOX), LB_GETTEXT, index, (LPARAM) ((LPSTR
g));
    pageno=GetPageNo(string);
    HWND hdlg;
    hdlg= GetParent(Msg.Receiver);
    Scrollbar->SetPosition(pageno);
    CurrentPageNumb=pageno;
    TDialog::Ok(Msg);
    SendMessage(hdlg, TRS_SCROLLBARMOVED, 0,0L);

TarasListBoxDialog::TRS_HANDLELISTBOX(RTMessage Msg)

switch (Msg.LP.Hi)
    {
            case LBN_DBLCLK:
                SendMessage(HWindow, WM_COMMAND, TRS_GOTOBUTTON,0);
            break;
```

LESNLIST.CPP

```cpp
        case LBN_SELCHANGE:
            index=SendMessage(GetItemHandle(TRS_LISTBOX), LB_GETCURSEL, 0, SendMessage(GetItemHandle(TRS_LISTBOX), LB_GETTEXT, index, (LP
(LPSTR) string));
            MessageBox(NULL, string, "You have selected", MB_OK);
            EnableWindow(GetItemHandle(TRS_GOTOBUTTON), FALSE);
            GetApplication()->MakeWindow(new PictText_LessonDialog(this, "
DLG"));
            SendMessage(GetItemHandle(TRS_LISTBOX), LB_SETCURSEL,1,0);
        default:
            break;
    }
```

```c
include "utility.hpp"

/*******************************************************************
Copyright: Taras Development Corporation, 1992
Program : Taras Tutor
Creator:
Description: The User Interface of the Pace project.
Version: 1.0
*******************************************************************/

/*******************************************************************/
/* Functions:
1). BOOL StopAtRightButtonClick(HWND hwindow)
2). void EnableMenu(HWND HWindow)
3). void DisableMenu(HWND HWindow)
4). void Delay(float seconds)
5). void getresourceinfo(char Path[255])
6). void EraseCtrlArea(HWND hwindow, int CtrlID)
7). void InvalidArea(HWND hWindow, int CtrlID)
8). int GetPageNo(char *string)
9). void HideButton();
10).void ShowButton();
11). void DisableButton();
12). int GetRandomNumber(int min, int max)
13). RemoveFieldsImpossibleQuestions();
14). RemoveNonDataImpossibleQuestions(QuestionRecord *Question)
15). RemoveDataImpossibleQuestions(QuestionRecord *Question)
16). DebugPageQuestion(QuestionRecord *Question, int QuestionPageNum, int Answer
17). SimilarQuestion(short questType1, short questType2)
18). SimilarAnswer(short answerType1, short answerType2)
19). GetTextResID(int pageNumb, int ResourceType, BOOL question)
20)  int GetWrongAnswers(short numbAnswerChoices)
21)  BOOL IDsCreated(short answerType, short pageNumb)

/*******************************************************************/

BOOL StopAtRightButtonClick(HWND hwindow)
{
 MSG msg;
 BOOL returnValue = TRUE;
 if (PeekMessage(&msg, hwindow, WM_KEYFIRST, WM_KEYLAST, PM_REMOVE))
    if (msg.message == WM_KEYDOWN )
       returnValue = TRUE;

if (PeekMessage(&msg, hwindow, WM_MOUSEFIRST, WM_MOUSELAST, PM_REMOVE))
 {
    if (msg.message == WM_RBUTTONDOWN )
       returnValue = TRUE;
    else
```

```
      {
        TranslateMessage(&msg);
        DispatchMessage(&msg);
        returnValue = FALSE;
      }
    }
    return returnValue;
} void EnableMenu(HWND HWindow)
{
  HMENU hmenu=GetMenu(HWindow);
//  EnableMenuItem(hmenu, TRS_OPEN, MF_GRAYED);
  EnableMenuItem(hmenu, TRS_CLOSE, MF_ENABLED);
  EnableMenuItem(hmenu, TRS_PREF, MF_ENABLED);
  EnableMenuItem(hmenu, TRS_TOPHIDE, MF_ENABLED);
  EnableMenuItem(hmenu, TRS_BUTTOMHIDE, MF_ENABLED);
  EnableMenuItem(hmenu, TRS_TBCONTENT, MF_ENABLED);
  EnableMenuItem(hmenu, TRS_LAST, MF_ENABLED);
  EnableMenuItem(hmenu, TRS_FIRST, MF_ENABLED);
  EnableMenuItem(hmenu, TRS_NEXT, MF_ENABLED);
  EnableMenuItem(hmenu, TRS_PREVIOUS, MF_ENABLED);
  EnableMenuItem(hmenu, TRS_FORWARD, MF_ENABLED);
  EnableMenuItem(hmenu, TRS_BACKWARD, MF_ENABLED);
  EnableMenuItem(hmenu, TRS_CURRENT, MF_ENABLED);
  EnableMenuItem(hmenu, TRS_SLOW, MF_ENABLED);
  EnableMenuItem(hmenu, TRS_FAST, MF_ENABLED);
  EnableMenuItem(hmenu, TRS_WRAP, MF_ENABLED);
  EnableMenuItem(hmenu, TRS_STEXAM, MF_ENABLED);
  EnableMenuItem(hmenu, TRS_SEARCH, MF_ENABLED);
  EnableMenuItem(hmenu, TRS_SEARCHAGAIN, MF_ENABLED);
} void DisableMenu(HWND HWindow)
{
  HMENU hmenu=GetMenu(HWindow);
//        EnableMenuItem(hmenu, TRS_CLOSE, MF_GRAYED);
  EnableMenuItem(hmenu, TRS_PREF, MF_GRAYED);
  EnableMenuItem(hmenu, TRS_TOPHIDE, MF_GRAYED);
  EnableMenuItem(hmenu, TRS_BUTTOMHIDE, MF_GRAYED);
  EnableMenuItem(hmenu, TRS_TBCONTENT, MF_GRAYED);
  EnableMenuItem(hmenu, TRS_LAST, MF_GRAYED);
  EnableMenuItem(hmenu, TRS_FIRST, MF_GRAYED);
  EnableMenuItem(hmenu, TRS_NEXT, MF_GRAYED);
  EnableMenuItem(hmenu, TRS_PREVIOUS, MF_GRAYED);
  EnableMenuItem(hmenu, TRS_FORWARD, MF_GRAYED);
  EnableMenuItem(hmenu, TRS_BACKWARD, MF_GRAYED);
  EnableMenuItem(hmenu, TRS_CURRENT, MF_GRAYED);
  EnableMenuItem(hmenu, TRS_SLOW, MF_GRAYED);
  EnableMenuItem(hmenu, TRS_FAST, MF_GRAYED);
  EnableMenuItem(hmenu, TRS_WRAP, MF_GRAYED);
```

```
    EnableMenuItem(hmenu, TRS_STEXAM, MF_GRAYED);
    EnableMenuItem(hmenu, TR_PLAYFIELD, MF_GRAYED);
} void Delay(float seconds)
{
/* time_t first, second;
 first=time(NULL);
 while(1)
    { second= time(NULL);
      if ((float)difftime(second, first)>seconds)
     break;
    }
*/
 DWORD first, second;
 first=GetTickCount();
 while(1)
 {
   second=GetTickCount();
   if( (second-first)>(int)(seconds*1000))
      break;
      }
} void getresourceinfo(char Path[255])
{
// Get Lesson resource dir name.   TarasFileName is: path+filename.

// 1) i.e.  c:\\test\\wei.lsn
    char *ptr = TarasFileName +strlen(TarasFileName);
    while(*ptr-- != '.' && ptr > TarasFileName);           // chop the .lsn name o
    *(ptr+1) = 0;                                          // i.e. chapter1\lesson
// 2) i.e.  c:\\test\\wei
    strcpy(Path, TarasFileName);

// Get Lesson Topic.
    char *ptr1=TarasFileName + strlen(TarasFileName);      // Get the name after \
    while (*ptr1-- !='\\' && ptr1 > TarasFileName);

// 3) i.e. wei
    char lessonname[20];
    strcpy(lessonname, 2+ptr1);
    strcpy(ExamTopic, lessonname);

// Get the Directory
// 4) i.e.  c:\\test
    char wei[200];
    char *tempptr=TarasFileName + strlen(TarasFileName);   // Get the name befor
    while (*tempptr-- !='\\' && tempptr > TarasFileName);
    *(tempptr+1)='\0';
    strcpy(wei, TarasFileName);
```

```
// Make TarasFileName as a Path For Later Use.
    strcat(TarasFileName, "\\");
    WritePrivateProfileString(Section1, EntryDir, TarasFileName, FileName);
} void EraseCtrlArea(HWND hwindow, int CtrlID)
{
 RECT rect; HBRUSH hbr; HPEN hpen;
 POINT ptleft, ptright;

HWND hdlg=GetDlgItem(hwindow, CtrlID);
 GetWindowRect(hdlg, &rect);

ptleft.x=rect.left;
    ptleft.y=rect.top;
    ptright.x=rect.right;
    ptright.y=rect.bottom;

ScreenToClient(hwindow, &ptleft);
    ScreenToClient(hwindow, &ptright);

HDC hDC1=GetDC(hwindow);
 hbr=CreateSolidBrush(RGB(0xc0,0xc0,0xc0));
 hpen=CreatePen(PS_NULL, 1, 0);
        SelectObject(hDC1, hpen);
 SelectObject(hDC1, hbr);
//   Rectangle(hDC1,rect.left-10, rect.top-55, rect.right+5, rect.bottom-30);
 Rectangle(hDC1,ptleft.x, ptleft.y, ptright.x+2, ptright.y+2);
 DeleteObject(hbr);
        DeleteObject(hpen);
        ReleaseDC(hwindow, hDC1);
} void InvalidArea(HWND hWindow, int CtrlID)
{
 HDC hdc; RECT rect1;
 POINT ptleft, ptright;

hdc=GetDC(hWindow);
 HWND hdlg=GetDlgItem(hWindow, CtrlID);
 GetWindowRect(hdlg, &rect1);

ptleft.x=rect1.left;
    ptleft.y=rect1.top;
    ptright.x=rect1.right;
    ptright.y=rect1.bottom;
```

```
    ScreenToClient(hWindow, ptleft);
    ScreenToClient(hWindow, &ptright);
//  Rectangle(hdc,ptleft.x, ptleft.y, ptright.x, ptright.y);
//  Rectangle(hdc, rect1.left, rect1.top, rect1.right, rect1.bottom);
 rect1.left=ptleft.x;
 rect1.top=ptleft.y;
 rect1.right=ptright.x;
 rect1.bottom=ptright.y;

InvalidateRect(hWindow, &rect1,0);
        ReleaseDC(hWindow, hdc);
} int GetPageNo(char *string)
{
 int pageno, i=0;  char temp[100];
        char *pt ;

pt=string;
 while(*pt++==' ');
    pt--;
 strcpy(temp, pt);
 while (temp[i++]!='.');
        temp[--i]=0;
 pageno=atoi(temp);
 return pageno;
} void HideButton()
{
 ButtonPlay->Show(SW_HIDE);
 ButtonPPlay->Show(SW_HIDE);
 ButtonRecord->Show(SW_HIDE);
 ButtonTest->Show(SW_HIDE);
 ButtonHome->Show(SW_HIDE);
 ButtonBranch->Show(SW_HIDE);
 Scrollbar->Show(SW_HIDE);
}
void ShowButton()
{
 Scrollbar->Show(SW_SHOW);
 ButtonPlay->Show(SW_SHOW);
 ButtonPPlay->Show(SW_SHOW);
 ButtonRecord->Show(SW_SHOW);
 ButtonTest->Show(SW_SHOW);
 ButtonHome->Show(SW_SHOW);
 ButtonBranch->Show(SW_SHOW);
```

```c
}
void DisableButton()
{
        EnableWindow(ButtonPlay->HWindow, FALSE);
        EnableWindow(ButtonPPlay->HWindow, FALSE);
        EnableWindow(ButtonRecord->HWindow, FALSE);
        EnableWindow(ButtonTest->HWindow, FALSE);
        EnableWindow(ButtonHome->HWindow, FALSE);
        EnableWindow(ButtonBranch->HWindow, FALSE);
        EnableWindow(Scrollbar->HWindow, FALSE);
}

//*******************************************************************
// Select a random Number between min and max-1
int GetRandomNumber(int min, int max)
{
 time_t t; int number, i;

if (max < min)
 {
   number = max;
   max = min;
   min = number;
 }
 srand((unsigned)time(&t)+i);
 number = min + rand()%(max - min + 1);
 return number;
} void RemoveDataImpossibleQuestions(QuestionRecord *Question)
{
Question->questType[questpict][answerpict] = FALSE;
Question->questType[questpict][answerpictsound] = FALSE;
Question->questType[questpict][answerpicttext1] = FALSE;
Question->questType[questpict][answerpicttext2] = FALSE;
Question->questType[questpict][answerpicttext3] = FALSE;
Question->questType[questpict][answerpicttext4] = FALSE;

Question->questType[questnothing][answerpict] = FALSE;
Question->questType[questnothing][answersound] = FALSE;
Question->questType[questnothing][answertext1] = FALSE;
Question->questType[questnothing][answertext2] = FALSE;
Question->questType[questnothing][answertext3] = FALSE;
Question->questType[questnothing][answertext4] = FALSE;
Question->questType[questnothing][answerpictsound] = FALSE;
Question->questType[questnothing][answersoundtext1] = FALSE;
Question->questType[questnothing][answersoundtext2] = FALSE;
Question->questType[questnothing][answersoundtext3] = FALSE;
Question->questType[questnothing][answersoundtext4] = FALSE;
```

```
Question->questType[questnothing] [answerpicttext1] = FALSE;
Question->questType[quest.  ching] [answerpicttext2] =   LSE;
Question->questType[questnothing] [answerpicttext3] = FALSE;
Question->questType[questnothing] [answerpicttext4] = FALSE;

Question->questType[questsound]  [answersound]=FALSE;
Question->questType[questsound]  [answerpictsound]=FALSE;
Question->questType[questsound]  [answersoundtext1]=FALSE;
Question->questType[questsound]  [answersoundtext2]=FALSE;
Question->questType[questsound]  [answersoundtext3]=FALSE;
Question->questType[questsound]  [answersoundtext4]=FALSE;

Question->questType[questtext1]  [answertext1]=FALSE;
Question->questType[questtext1]  [answersoundtext1]=FALSE;
Question->questType[questtext1]  [answerpicttext1]=FALSE;
Question->questType[questtext1]  [answerfill1]=FALSE;

Question->questType[questtext2]  [answertext2]=FALSE;
Question->questType[questtext2]  [answersoundtext2]=FALSE;
Question->questType[questtext2]  [answerpicttext2]=FALSE;
Question->questType[questtext2]  [answerfill2]=FALSE;

Question->questType[questtext3]  [answertext3]=FALSE;
Question->questType[questtext3]  [answersoundtext3]=FALSE;
Question->questType[questtext3]  [answerpicttext3]=FALSE;
Question->questType[questtext3]  [answerfill3]=FALSE;

Question->questType[questtext4]  [answertext4]=FALSE;
Question->questType[questtext4]  [answersoundtext4]=FALSE;
Question->questType[questtext4]  [answerpicttext4]=FALSE;
Question->questType[questtext4]  [answerfill4]=FALSE;

Question->questType[questpictsound]  [answersound] = FALSE;
Question->questType[questpictsound]  [answerpict] = FALSE;
Question->questType[questpictsound]  [answerpictsound] = FALSE;
Question->questType[questpictsound]  [answersoundtext1] = FALSE;
Question->questType[questpictsound]  [answersoundtext2] = FALSE;
Question->questType[questpictsound]  [answersoundtext3] = FALSE;
Question->questType[questpictsound]  [answersoundtext4] = FALSE;
Question->questType[questpictsound]  [answerpicttext1] = FALSE;
Question->questType[questpictsound]  [answerpicttext2] = FALSE;
Question->questType[questpictsound]  [answerpicttext3] = FALSE;
Question->questType[questpictsound]  [answerpicttext4] = FALSE;

Question->questType[questsoundtext1]  [answersound] = FALSE;
Question->questType[questsoundtext1]  [answertext1] = FALSE;
Question->questType[questsoundtext1]  [answerpictsound] = FALSE;
Question->questType[questsoundtext1]  [answersoundtext1] = FALSE;
Question->questType[questsoundtext1]  [answersoundtext2] = FALSE;
Question->questType[questsoundtext1]  [answersoundtext3] = FALSE;
```

```
Question->questType[questsoundtext1]    [answersoundtext4] = FALSE;
Question->questType[questsoundtext1]    [answerpicttext1]  = FALSE;
Question->questType[questsoundtext1]    [answerfill1]      = FALSE;

Question->questType[questsoundtext2]    [answersound]      = FALSE;
Question->questType[questsoundtext2]    [answertext2]      = FALSE;
Question->questType[questsoundtext2]    [answerpictsound]  = FALSE;
Question->questType[questsoundtext2]    [answersoundtext1] = FALSE;
Question->questType[questsoundtext2]    [answersoundtext2] = FALSE;
Question->questType[questsoundtext2]    [answersoundtext3] = FALSE;
Question->questType[questsoundtext2]    [answersoundtext4] = FALSE;
Question->questType[questsoundtext2]    [answerpicttext2]  = FALSE;
Question->questType[questsoundtext2]    [answerfill2]      = FALSE;

Question->questType[questsoundtext3]    [answersound]      = FALSE;
Question->questType[questsoundtext3]    [answertext3]      = FALSE;
Question->questType[questsoundtext3]    [answerpictsound]  = FALSE;
Question->questType[questsoundtext3]    [answersoundtext1] = FALSE;
Question->questType[questsoundtext3]    [answersoundtext2] = FALSE;
Question->questType[questsoundtext3]    [answersoundtext3] = FALSE;
Question->questType[questsoundtext3]    [answersoundtext4] = FALSE;
Question->questType[questsoundtext3]    [answerpicttext3]  = FALSE;
Question->questType[questsoundtext3]    [answerfill3]      = FALSE;

Question->questType[questsoundtext4]    [answersound]      = FALSE;
Question->questType[questsoundtext4]    [answertext4]      = FALSE;
Question->questType[questsoundtext4]    [answerpictsound]  = FALSE;
Question->questType[questsoundtext4]    [answersoundtext1] = FALSE;
Question->questType[questsoundtext4]    [answersoundtext2] = FALSE;
Question->questType[questsoundtext4]    [answersoundtext3] = FALSE;
Question->questType[questsoundtext4]    [answersoundtext4] = FALSE;
Question->questType[questsoundtext4]    [answerpicttext4]  = FALSE;
Question->questType[questsoundtext4]    [answerfill4]      = FALSE;

Question->questType[questpicttext1]     [answerpict]       = FALSE;
Question->questType[questpicttext1]     [answertext1]      = FALSE;
Question->questType[questpicttext1]     [answerpictsound]  = FALSE;
Question->questType[questpicttext1]     [answersoundtext1] = FALSE;
Question->questType[questpicttext1]     [answerpicttext1]  = FALSE;
Question->questType[questpicttext1]     [answerpicttext2]  = FALSE;
Question->questType[questpicttext1]     [answerpicttext3]  = FALSE;
Question->questType[questpicttext1]     [answerpicttext4]  = FALSE;
Question->questType[questpicttext1]     [answerfill1]      = FALSE;

Question->questType[questpicttext2]     [answerpict]       = FALSE;
Question->questType[questpicttext2]     [answertext2]      = FALSE;
Question->questType[questpicttext2]     [answerpictsound]  = FALSE;
Question->questType[questpicttext2]     [answersoundtext2] = FALSE;
Question->questType[questpicttext2]     [answerpicttext1]  = FALSE;
Question->questType[questpicttext2]     [answerpicttext2]  = FALSE;
Question->questType[questpicttext2]     [answerpicttext3]  = FALSE;
```

```
Question->questType[questpicttext2] [answerpicttext4] = FALSE;
Question->questType[questpicttext2] [answerfill2] = FALSE;

Question->questType[questpicttext3] [answerpict] = FALSE;
Question->questType[questpicttext3] [answertext3] = FALSE;
Question->questType[questpicttext3] [answerpictsound] = FALSE;
Question->questType[questpicttext3] [answersoundtext3] = FALSE;
Question->questType[questpicttext3] [answerpicttext1] = FALSE;
Question->questType[questpicttext3] [answerpicttext2] = FALSE;
Question->questType[questpicttext3] [answerpicttext3] = FALSE;
Question->questType[questpicttext3] [answerpicttext4] = FALSE;
Question->questType[questpicttext3] [answerfill3] = FALSE;

Question->questType[questpicttext4] [answerpict] = FALSE;
Question->questType[questpicttext4] [answertext4] = FALSE;
Question->questType[questpicttext4] [answerpictsound] = FALSE;
Question->questType[questpicttext4] [answersoundtext4] = FALSE;
Question->questType[questpicttext4] [answerpicttext1] = FALSE;
Question->questType[questpicttext4] [answerpicttext2] = FALSE;
Question->questType[questpicttext4] [answerpicttext3] = FALSE;
Question->questType[questpicttext4] [answerpicttext4] = FALSE;
Question->questType[questpicttext4] [answerfill4] = FALSE;

} void RemoveNonDataImpossibleQuestions(QuestionRecord *Question)
{
Question->questType[questnothing] [answerpict] = FALSE;
Question->questType[questnothing] [answersound] = FALSE;
Question->questType[questnothing] [answertext1] = FALSE;
Question->questType[questnothing] [answertext2] = FALSE;
Question->questType.[questnothing] [answertext3] = FALSE;
Question->questType[questnothing] [answertext4] = FALSE;
Question->questType[questnothing] [answerpictsound] = FALSE;
Question->questType[questnothing] [answersoundtext1] = FALSE;
Question->questType[questnothing] [answersoundtext2] = FALSE;
Question->questType[questnothing] [answersoundtext3] = FALSE;
Question->questType[questnothing] [answersoundtext4] = FALSE;
Question->questType[questnothing] [answerpicttext1] = FALSE;
Question->questType[questnothing] [answerpicttext2] = FALSE;
Question->questType[questnothing] [answerpicttext3] = FALSE;
Question->questType[questnothing] [answerpicttext4] = FALSE;
} void RemoveFieldsImpossibleQuestions()
{ // FieldRecord is filling in everytime you goto a different page.
  // So the following refers to the current page.

FileInfo->FieldRecord.questType[fieldquestfield-FQT_BASE] [fieldquestfield-FQT_B
FileInfo->FieldRecord.questType[fieldquestfield-FQT_BASE] [fieldanswerfieldsound
```

```
FileInfo->FieldRecord.questType[fieldquestfield-FQT_BASE][fieldquestfieldtext- FileInfo->FieldRecord.questType[fieldquestsound-FQT_BASE][fieldanswersound-FQT_
FileInfo->FieldRecord.questType[fieldquestsound-FQT_BASE][fieldanswerfieldsound
FileInfo->FieldRecord.questType[fieldquestsound-FQT_BASE][fieldanswersoundtext- FileInfo->FieldRecord.questType[fieldquesttext-FQT_BASE][fieldanswertext-FQT_BA
FileInfo->FieldRecord.questType[fieldquesttext-FQT_BASE][fieldanswerfieldtext-F
FileInfo->FieldRecord.questType[fieldquesttext-FQT_BASE][fieldanswersoundtext-F FileInfo->FieldRecord.questType[fieldquestfieldsound-FQT_BASE][fieldanswerfield
FileInfo->FieldRecord.questType[fieldquestfieldsound-FQT_BASE][fieldanswersound
FileInfo->FieldRecord.questType[fieldquestfieldsound-FQT_BASE][fieldanswerfield
FileInfo->FieldRecord.questType[fieldquestfieldsound-FQT_BASE][fieldanswerfield
FileInfo->FieldRecord.questType[fieldquestfieldsound-FQT_BASE][fieldquestsoundt FileInfo->FieldRecord.questType[fieldquestfieldtext-FQT_BASE][fieldanswerfield-
FileInfo->FieldRecord.questType[fieldquestfieldtext-FQT_BASE][fieldanswertext-F
FileInfo->FieldRecord.questType[fieldquestfieldtext-FQT_BASE][fieldanswerfields
FileInfo->FieldRecord.questType[fieldquestfieldtext-FQT_BASE][fieldanswerfieldt
FileInfo->FieldRecord.questType[fieldquestfieldtext-FQT_BASE][fieldanswersoundt FileInfo->FieldRecord.questType[fieldquestsoundtext-FQT_BASE][fieldanswersound-
FileInfo->FieldRecord.questType[fieldquestsoundtext-FQT_BASE][fieldanswertext-F
FileInfo->FieldRecord.questType[fieldquestsoundtext-FQT_BASE][fieldanswerfields
FileInfo->FieldRecord.questType[fieldquestsoundtext-FQT_BASE][fieldanswerfieldt
FileInfo->FieldRecord.questType[fieldquestsoundtext-FQT_BASE][fieldanswersoundt

} void DebugPageQuestion(QuestionRecord *Question, int QuestionPageNum, int Answer
{
short i, j;
BOOL questPictCreated, questSoundCreated, questMovieCreated;
BOOL questText1Created, questText2Created, questText3Created, questText4Created;
BOOL answertPictCreated, answerSoundCreated, answerMovieCreated;
BOOL answerText1Created, answerText2Created, answerText3Created, answerText4Crea questPictCreated  = FileInfo->Record.IDCreated[QuestionPageNum].pictcreated;
questSoundCreated =FileInfo->Record.IDCreated[QuestionPageNum].soundcreated;
questMovieCreated =FileInfo->Record.IDCreated[QuestionPageNum].moviecreated;
questText1Created =FileInfo->Record.IDCreated[QuestionPageNum].text1created;
questText2Created =FileInfo->Record.IDCreated[QuestionPageNum].text2created;
questText3Created =FileInfo->Record.IDCreated[QuestionPageNum].text3created;
questText4Created =FileInfo->Record.IDCreated[QuestionPageNum].text4created;

answertPictCreated  = FileInfo->Record.IDCreated[AnswerPageNum].pictcreated;
answerSoundCreated =FileInfo->Record.IDCreated[AnswerPageNum].soundcreated;
answerMovieCreated =FileInfo->Record.IDCreated[AnswerPageNum].moviecreated;
answerText1Created =FileInfo->Record.IDCreated[AnswerPageNum].text1created;
```

```
answerText2Created =FileInfo->Record.IDCreated[AnswerPageNum].text2created;
answerText3Created =FileInfo->Record.IDCreated[AnswerPageNum].text3created;
answerText4Created =FileInfo->Record.IDCreated[AnswerPageNum].text4created;

if (questPictCreated == FALSE && questMovieCreated ==FALSE)
{ for (j=0; j<QT_NUMB_COLS; j++)
{
 Question->questType[questpict][j]      = FALSE;
 Question->questType[questpictsound][j]  = FALSE;
 Question->questType[questpicttext1][j]  = FALSE;
 Question->questType[questpicttext2][j]  = FALSE;
 Question->questType[questpicttext3][j]  = FALSE;
 Question->questType[questpicttext4][j]  = FALSE;
}
//  MessageBox(NULL, "Q/pict", "", MB_OK);
} if (answertPictCreated == FALSE && answerMovieCreated ==FALSE)
{ for (i=0; i<QT_NUMB_ROWS; i++)
{
 Question->questType[i][answerpict]     = FALSE;
 Question->questType[i][answerpictsound] = FALSE;
 Question->questType[i][answerpicttext1] = FALSE;
 Question->questType[i][answerpicttext2] = FALSE;
 Question->questType[i][answerpicttext3] = FALSE;
 Question->questType[i][answerpicttext4] = FALSE;
}
//   MessageBox(NULL, "A/pict", "", MB_OK);
} if (questSoundCreated == FALSE)
{ for (j=0; j<QT_NUMB_COLS; j++)
{
 Question->questType[questsound][j]      =FALSE;
 Question->questType[questpictsound][j]  =FALSE;
 Question->questType[questsoundtext1][j] =FALSE;
 Question->questType[questsoundtext2][j] =FALSE;
 Question->questType[questsoundtext3][j] =FALSE;
 Question->questType[questsoundtext4][j] =FALSE;
}
//   MessageBox(NULL, "Q/sound", "", MB_OK);
} if (answerSoundCreated == FALSE)
{ for (i=0; i<QT_NUMB_ROWS; i++)
{
 Question->questType[i][answersound]     =FALSE;
 Question->questType[i][answerpictsound] =FALSE;
```

```
       Question->questType[i][answersoundtext1] =FALSE;
      Question->questType[i][a  wersoundtext2] =FALSE;
      Question->questType[i][answersoundtext3] =FALSE;
      Question->questType[i][answersoundtext4] =FALSE;
     }
//    MessageBox(NULL, "A/pict", "", MB_OK);
   } if (questText1Created== FALSE)
 {
 for(j=0; j<QT_NUMB_COLS; j++)
  {
   Question->questType[questtext1][j] = FALSE;
   Question->questType[questpicttext1][j] = FALSE;
   Question->questType[questsoundtext1][j] = FALSE;
  }
//    MessageBox(NULL, "Q/text1", "", MB_OK);
 } if (answerText1Created==FALSE)
 {
 for (i=0; i<QT_NUMB_ROWS; i++)
   {
    Question->questType[i][answertext1]= FALSE;
    Question->questType[i][answersoundtext1]= FALSE;
    Question->questType[i][answerpicttext1]= FALSE;
    Question->questType[i][answerfill1]= FALSE;
   }
//    MessageBox(NULL, "A/text1", "", MB_OK);
 } if (questText2Created==FALSE)
 {
 for (j=0; j<QT_NUMB_COLS; j++)
   {
    Question->questType[questtext2][j]= FALSE;
    Question->questType[questsoundtext2][j]= FALSE;
    Question->questType[questpicttext2][j]= FALSE;
   }
//      MessageBox(NULL, "Q/text2", "", MB_OK);
 } if (answerText2Created==FALSE)
 {
 for (i=0; i<QT_NUMB_ROWS; i++)
    {
     Question->questType[i][answertext2]= FALSE;
     Question->questType[i][answersoundtext2]= FALSE;
```

```
   Question->questType[i][answerpicttext2]= FALSE;
   Question->questType[i][ swerfill2]= FALSE;
 }
//      MessageBox(NULL, "A/text2", "", MB_OK);
} if (questText3Created==FALSE)
{
for (j=0; j<QT_NUMB_COLS; j++)
  {
  Question->questType[questtext3][j]= FALSE;
  Question->questType[questsoundtext3][j]= FALSE;
  Question->questType[questpicttext3][j]= FALSE;
  }
//      MessageBox(NULL, "Q/text3", "", MB_OK);
} if (answerText3Created==FALSE)
{
for (i=0; i<QT_NUMB_ROWS; i++)
  {
  Question->questType[i][answertext3]= FALSE;
  Question->questType[i][answersoundtext3]= FALSE;
  Question->questType[i][answerpicttext3]= FALSE;
  Question->questType[i][answerfill3]= FALSE;
  }
//      MessageBox(NULL, "A/text3", "", MB_OK);
} if (questText4Created==FALSE)
{
for (j=0; j<QT_NUMB_COLS; j++)
  {
  Question->questType[questtext4][j]= FALSE;
  Question->questType[questsoundtext4][j]= FALSE;
  Question->questType[questpicttext4][j]= FALSE;
  }
//      MessageBox(NULL, "Q/text4", "", MB_OK);
} if (answerText4Created==FALSE)
{
for (i=0; i<QT_NUMB_ROWS; i++)
  {
  Question->questType[i][answertext4]= FALSE;
  Question->questType[i][answersoundtext4]= FALSE;
  Question->questType[i][answerpicttext4]= FALSE;
```

```
    Question->questType[i][answerfill4]= FALSE;
  }
//      MessageBox(NULL, "A/text4", "", MB_OK);
}

// Remove all filling tempararily.

// for (i=0; i<QT_NUMB_ROWS; i++)
//   {
//     Question->questType[i][answerfill1]= FALSE;
//     Question->questType[i][answerfill2]= FALSE;
//     Question->questType[i][answerfill3]= FALSE;
//     Question->questType[i][answerfill4]= FALSE;
//   }

}

BOOL SimilarQuestion(short questType1, short questType2)
{
if ((questType1==questpict &&
  (questType2 ==questpict || questType2==questpictsound ||
   questType2 ==questpicttext1 || questType2 ==questpicttext2 ||
   questType2 ==questpicttext3 || questType2 ==questpicttext4)) ||

(questType1==questsound &&
   (questType2 ==questsound || questType2==questpictsound ||
    questType2 ==questsoundtext1 || questType2 ==questsoundtext2 ||
    questType2 ==questsoundtext3 || questType2 ==questsoundtext4)) ||

((questType1==questtext1 && questType1==questtext2 ||
    questType1 ==questtext3 || questType1==questtext4) &&
   ( questType2 ==questtext1 || questType2 ==questtext2 ||
    questType2 ==questtext3 || questType2 ==questtext4 ||
    questType2 ==questsoundtext1 || questType2 ==questsoundtext2 ||
    questType2 ==questsoundtext3 || questType2 ==questsoundtext4 ||
    questType2 ==questpicttext1 || questType2 ==questpicttext2 ||
    questType2 ==questpicttext3 || questType2 ==questpicttext4)) ||

(questType1 == questpictsound &&
    (questType2 == questpictsound ||
     questType2 ==questsoundtext1 || questType2 ==questsoundtext2 ||
     questType2 ==questsoundtext3 || questType2 ==questsoundtext4 ||
     questType2 ==questpicttext1 || questType2 ==questpicttext2 ||
     questType2 ==questpicttext3 || questType2 ==questpicttext4)) ||

((questType1 == questsoundtext1 ||questType1 == questsoundtext2 ||
      questType1 == questsoundtext3 || questType1 == questsoundtext4) &&
     (questType2 ==questsoundtext1 || questType2 ==questsoundtext2 ||
      questType2 ==questsoundtext3 || questType2 ==questsoundtext4 ||
      questType2 ==questpicttext1 || questType2 ==questpicttext2 ||
      questType2 ==questpicttext3 || questType2 ==questpicttext4)) ||
```

```
  ((questType1 ==questpicttext1 || questType1 ==questpicttext2 ||
   questType1 ==questpicttext3 || questType1 ==questpicttext4) &&
   (questType2 ==questpicttext1 || questType2 ==questpicttext2 ||
   questType2 ==questpicttext3 || questType2 ==questpicttext4))) {
   return TRUE;
  }
 else
  return FALSE;
 }

BOOL SimilarAnswer(short answerType1, short answerType2)
{
 if ((answerType1==answerpict &&
   (answerType2 ==answerpict || answerType2==answerpictsound ||
    answerType2 ==answerpicttext1 || answerType2 ==answerpicttext2 ||
    answerType2 ==answerpicttext3 || answerType2 ==answerpicttext4)) ||

(answerType1==answersound &&
   (answerType2 ==answersound || answerType2==answerpictsound ||
    answerType2 ==answersoundtext1 || answerType2 ==answersoundtext2 ||
    answerType2 ==answersoundtext3 || answerType2 ==answersoundtext4)) ||

((answerType1==answertext1 && answerType1==answertext2 ||
    answerType1 ==answertext3 || answerType1==answertext4) &&
   ( answerType2 ==answertext1 || answerType2 ==answertext2 ||
    answerType2 ==answertext3 || answerType2 ==answertext4 ||
    answerType2 ==answersoundtext1 || answerType2 ==answersoundtext2 ||
    answerType2 ==answersoundtext3 || answerType2 ==answersoundtext4 ||
    answerType2 ==answerpicttext1 || answerType2 ==answerpicttext2 ||
    answerType2 ==answerpicttext3 || answerType2 ==answerpicttext4)) ||

(answerType1 == answerpictsound &&
    (answerType2 == answerpictsound ||
    answerType2 ==answersoundtext1 || answerType2 ==answersoundtext2 ||
    answerType2 ==answersoundtext3 || answerType2 ==answersoundtext4 ||
    answerType2 ==answerpicttext1 || answerType2 ==answerpicttext2 ||
    answerType2 ==answerpicttext3 || answerType2 ==answerpicttext4)) ||

((answerType1 == answerfill1 ||answerType1 == answerfill2 ||
     answerType1 == answerfill3 || answerType1 == answerfill4)&&
    (answerType2 ==answerfill1 || answerType2 ==answerfill2 ||
    answerType2 ==answerfill3 || answerType2 ==answerfill4)) ||

((answerType1 ==answerpicttext1 || answerType1 ==answerpicttext2 ||
     answerType1 ==answerpicttext3 || answerType1 ==answerpicttext4) &&
    (answerType2 ==answersoundtext1 || answerType2 ==answersoundtext2 ||
    answerType2 ==answersoundtext3 || answerType2 ==answersoundtext4 ||
    answerType2 ==answerpicttext1 || answerType2 ==answerpicttext2 ||
```

```c
     answerType2 ==answerpicttext3 || answerType2 ==answerpicttext4))) {
    return TRUE;
  }
 else
  return FALSE;
} int GetTextResID(int pageNumb, int ResourceType, BOOL question)
{
    short resID;

int currentpage=ShowPageNumbArray[Scrollbar->GetPosition()];//Scrollbar->GetPosi if (FileInfo->Record.IDCreated[currentpage].fieldscreated==TRUE && ASKFIELDQUEST
 {
        if (pageNumb<10)
            resID=10000+10+pageNumb;
        else
            resID=20000+10+pageNumb;
 } else
 {
   if (question)
    { if (ResourceType==questtext1 || ResourceType==questpicttext1 ||
    ResourceType==questsoundtext1)
        resID=10000 + 10*pageNumb + 1;

else if (ResourceType==questtext2 || ResourceType==questpicttext2 ||
              ResourceType==questsoundtext2)
        resID=10000 + 10*pageNumb + 2;

else if (ResourceType==questtext3 || ResourceType==questpicttext3 ||
          ResourceType==questsoundtext3)
        resID=10000 + 10*pageNumb + 3;

else if (ResourceType==questtext4 || ResourceType==questpicttext4 ||
    ResourceType==questsoundtext4)
        resID=10000 + 10*pageNumb + 4;
    } else
    { if (ResourceType==answertext1 || ResourceType==answerpicttext1 ||
    ResourceType==answersoundtext1 || ResourceType==answerfill1)
        resID=10000 + 10*pageNumb + 1;

else if (ResourceType==answertext2 || ResourceType==answerpicttext2 ||
          ResourceType==answersoundtext2 ||ResourceType==answerfill2)
        resID=10000 + 10*pageNumb + 2;
```

```c
    else if (ResourceType==answertext3 || ResourceType==answerpicttext3 ||
        ResourceType==answersoundtext3 || ResourceType==answerfill3)
      resID=10000 + 10*pageNumb + 3;

else if (ResourceType==answertext4 || ResourceType==answerpicttext4 ||
        ResourceType==answersoundtext4 || ResourceType==answerfill4)
      resID=10000 + 10*pageNumb + 4;
  }
}
  return resID;
}

//**********************************************************************
define noSound   -1
define noString  -1
short CountFieldQuest(short fieldNumb)
{
 short i, j, count;

// Remove the sound ones.
 if (!strcmp(FileInfo->FieldSndName[fieldNumb], ""))
 {
    FileInfo->FieldRecord.questType[fieldquestfield - FQT_BASE][fieldanswersound
    FileInfo->FieldRecord.questType[fieldquestfield - FQT_BASE][fieldanswersound FileInfo->FieldRecord.questType[fieldquestsound - FQT_BASE][fieldanswerfield
    FileInfo->FieldRecord.questType[fieldquestsound - FQT_BASE][fieldanswertext
    FileInfo->FieldRecord.questType[fieldquestsound - FQT_BASE][fieldanswerfield FileInfo->FieldRecord.questType[fieldquesttext - FQT_BASE][fieldanswersound
    FileInfo->FieldRecord.questType[fieldquesttext - FQT_BASE][fieldanswerfields FileInfo->FieldRecord.questType[fieldquestfieldtext - FQT_BASE][fieldanswers FileInfo->FieldRecord.questType[fieldquestfieldsound - FQT_BASE][fieldanswer FileInfo->FieldRecord.questType[fieldquestsoundtext - FQT_BASE][fieldanswerf
 }

// Remove the Text ones.
 if (!strcmp(FileInfo->FieldString[fieldNumb], "") )
 {
    FileInfo->FieldRecord.questType[fieldquestfield - FQT_BASE][fieldanswertext
    FileInfo->FieldRecord.questType[fieldquestfield - FQT_BASE][fieldanswersound FileInfo->FieldRecord.questType[fieldquestsound - FQT_BASE][fieldanswertext
    FileInfo->FieldRecord.questType[fieldquestsound - FQT_BASE][fieldanswerfield FileInfo->FieldRecord.questType[fieldquesttext - FQT_BASE][fieldanswerfield
    FileInfo->FieldRecord.questType[fieldquesttext - FQT_BASE][fieldanswersound
```

```
        FileInfo->FieldRecord.questType[fieldquesttext - FQT_BASE][fieldanswerfield FileInfo->FieldRecord.questType[fieldquestfieldsound - FQT_BASE][fieldanswer FileInfo->FieldRecord.questType[fieldquestfieldtext - FQT_BASE][fieldanswers FileInfo->FieldRecord.questType[fieldquestsoundtext - FQT_BASE][fieldanswerf
  } count=0;
 for (i=0; i<FQT_NUMB_ROWS; i++)
    for(j=0; j<FQT_NUMB_COLS; j++)
 if (FileInfo->FieldRecord.questType[i][j]==TRUE)
    count++;
 FileInfo->FieldRecord.numbPossibleQuests=count;
 return (count);

}

//*********************************************************************
BOOL IDsCreated(short answerType, short pageNumb)
{
 BOOL found=FALSE;

while (!found)
 {
   if (answerType==answerpict &&
       (FileInfo->Record.IDCreated[pageNumb].pictcreated ||
         FileInfo->Record.IDCreated[pageNumb].moviecreated) )
      found=TRUE;
   else if (answerType==answersound &&
         FileInfo->Record.IDCreated[pageNumb].soundcreated )
           found=TRUE;
   else if (answerType==answertext1 &&
         FileInfo->Record.IDCreated[pageNumb].text1created )
      found=TRUE;
   else if (answerType==answertext2 &&
         FileInfo->Record.IDCreated[pageNumb].text2created )
      found=TRUE;
   else if (answerType==answertext3 &&
         FileInfo->Record.IDCreated[pageNumb].text3created )
           found=TRUE;
   else if (answerType==answertext4 &&
         FileInfo->Record.IDCreated[pageNumb].text4created )
      found=TRUE;
   else if (answerType==answerpictsound &&
         (FileInfo->Record.IDCreated[pageNumb].pictcreated ||
   FileInfo->Record.IDCreated[pageNumb].moviecreated) &&
   FileInfo->Record.IDCreated[pageNumb].soundcreated )
           found=TRUE;
   else if (answerType==answersoundtext1 &&
```

```
                (FileInfo->Record IDCreated[pageNumb].soundcreated &&
        FileInfo->Record.IDCreated[pageNumb].text1created)
            found=TRUE;
        else if (answerType==answersoundtext2 &&
                (FileInfo->Record.IDCreated[pageNumb].soundcreated &&
        FileInfo->Record.IDCreated[pageNumb].text2created) )
            found=TRUE;
        else if (answerType==answersoundtext3 &&
                (FileInfo->Record.IDCreated[pageNumb].soundcreated &&
        FileInfo->Record.IDCreated[pageNumb].text3created) )
            found=TRUE;
        else if (answerType==answersoundtext4 &&
                (FileInfo->Record.IDCreated[pageNumb].soundcreated &&
        FileInfo->Record.IDCreated[pageNumb].text4created) )
            found=TRUE;
        else if (answerType==answerpicttext1 &&
                (FileInfo->Record.IDCreated[pageNumb].pictcreated ||
                 FileInfo->Record.IDCreated[pageNumb].moviecreated) &&
        FileInfo->Record.IDCreated[pageNumb].text1created )
            found=TRUE;
        else if (answerType==answerpicttext2 &&
                (FileInfo->Record.IDCreated[pageNumb].pictcreated ||
                 FileInfo->Record.IDCreated[pageNumb].moviecreated) &&
        FileInfo->Record.IDCreated[pageNumb].text2created )
            found=TRUE;
        else if (answerType==answerpicttext3 &&
                (FileInfo->Record.IDCreated[pageNumb].pictcreated ||
                 FileInfo->Record.IDCreated[pageNumb].moviecreated) &&
        FileInfo->Record.IDCreated[pageNumb].text3created )
            found=TRUE;
        else if (answerType==answerpicttext4 &&
                (FileInfo->Record.IDCreated[pageNumb].pictcreated ||
                 FileInfo->Record.IDCreated[pageNumb].moviecreated) &&
        FileInfo->Record.IDCreated[pageNumb].text4created )
            found=TRUE;
        break;
        }
        return found;
}

//*********************************************************************
int GetWrongAnswers(short numbAnswerChoices)
{
    short   rightAnswer, CurWrongNo, pageNumb, randno, j;
    short   availAnswerPage[200], numbAvailAnswerPages;
    short   curPageNum = ShowPageNumbArray[Scrollbar->GetPosition()];
    char    curTopic[255];
    BOOL    wrongAnswerPageFound = FALSE;

// Set right answer
    rightAnswer = 0;
```

```
// Set the current topic
strcpy(curTopic, FileInfo->Record.PageTopic[answerPageNum[rightAnswer]]);

// Get the Wrong answers from wrong answer pages.
CurWrongNo = 1;
if (CurWrongNo < numbAnswerChoices)
{
  numbAvailAnswerPages = 0;
  for ( pageNumb = 0; pageNumb < FileInfo->Record.NumbPages ; pageNumb++ )
  {
    if (FileInfo->Record.PageType[pageNumb] == wrongpage &&
      FileInfo->Record.PageLink[pageNumb] == answerPageNum[rightAnswer])
    {
      if (IDsCreated(testanswertype, pageNumb))
      {
        availAnswerPage[numbAvailAnswerPages] = pageNumb;
        numbAvailAnswerPages++;
      }
    }
  }
  if (numbAvailAnswerPages > 0)
    wrongAnswerPageFound = TRUE;

while (numbAvailAnswerPages > 0)
  {
    randno = GetRandomNumber(0, numbAvailAnswerPages - 1);
    answerPageNum[CurWrongNo] = availAnswerPage[randno];
    CurWrongNo++;
    if (CurWrongNo < numbAnswerChoices)
    {
      // Remove Item From Available Pages.
      for ( j = randno ; j < numbAvailAnswerPages - 1 ; j++ )
        availAnswerPage[j] = availAnswerPage[j+1];
      numbAvailAnswerPages--;
    }
    else
      break;
  }
} if (!wrongAnswerPageFound)
{
// Get remaining wrong answers
// same page type, Same topic as the right answer page.
  if (CurWrongNo < numbAnswerChoices)
  {
    numbAvailAnswerPages=0;
    for ( pageNumb = 0 ; pageNumb < FileInfo->Record.NumbPages ; pageNumb++ )
    {
      if (pageNumb != questPageNum && pageNumb != answerPageNum[rightAnswer] &&
```

```
        pageNumb != curPageNum)
    {  // if same topic
      if (strcmp(FileInfo->Record.PageTopic[pageNumb], curTopic) == 0)
      { // if same type
        if (FileInfo->Record.PageType[pageNumb] == FileInfo->Record.PageType[
        {
          if (IDsCreated(testanswertype, pageNumb))
          {
            availAnswerPage[numbAvailAnswerPages] = pageNumb;
            numbAvailAnswerPages++;
          }
        }
      }
    }
  }
  while (numbAvailAnswerPages>0)
  {
    randno = GetRandomNumber(0, numbAvailAnswerPages - 1);
    answerPageNum[CurWrongNo] = availAnswerPage[randno];
    CurWrongNo++;
    if (CurWrongNo < numbAnswerChoices)
    {
      // Remove Item From Available Pages.
      for ( j = randno ; j < numbAvailAnswerPages - 1 ; j++ )
        availAnswerPage[j] = availAnswerPage[j+1];
      numbAvailAnswerPages--;
    }
    else
      break;
  }
}

// Get remaining wrong answer (do not include quest_pages)
// Differenct type, same page topic as the right answer page
if (CurWrongNo < numbAnswerChoices)
{
  numbAvailAnswerPages = 0;
  for (pageNumb = 0; pageNumb < FileInfo->Record.NumbPages ; pageNumb++ )
  {
    if (pageNumb != questPageNum && pageNumb != answerPageNum[rightAnswer] &&
        pageNumb != curPageNum && FileInfo->Record.PageType[pageNumb] != questp
    {  // if same topic
      if (strcmp(FileInfo->Record.PageTopic[pageNumb], curTopic) == 0)
      { // if diff. type.
        if (FileInfo->Record.PageType[pageNumb] != FileInfo->Record.PageType[
        {
          if (IDsCreated(testanswertype, pageNumb))
          {
            availAnswerPage[numbAvailAnswerPages] = pageNumb;
            numbAvailAnswerPages++;
          }
```

```
        }
      }
    }
  }
  while (numbAvailAnswerPages > 0)
  {
    randno = GetRandomNumber(0, numbAvailAnswerPages - 1);
    answerPageNum[CurWrongNo] = availAnswerPage[randno];
    CurWrongNo++;
    if (CurWrongNo < numbAnswerChoices)
    { // Remove Item From Available Pages.
      for ( j = randno ; j < numbAvailAnswerPages - 1 ; j++ )
        availAnswerPage[j] = availAnswerPage[j+1];
      numbAvailAnswerPages--;
    }
    else
      break;
  }
}

// Get Remaining Wrong Answers
// Same Page type as the right answer page, different topic.
if (CurWrongNo < numbAnswerChoices)
{
  numbAvailAnswerPages = 0;
  for ( pageNumb = 0 ; pageNumb < FileInfo->Record.NumbPages ; pageNumb++ )
  {
    if (pageNumb != questPageNum && pageNumb != answerPageNum[rightAnswer] &&
      pageNumb != curPageNum)
    { // if Different Topic
      if (strcmp(FileInfo->Record.PageTopic[pageNumb], curTopic) != 0)
      { // if same typle
        if ( FileInfo->Record.PageType[pageNumb] == FileInfo->Record.PageType
        {
          if (IDsCreated(testanswertype, pageNumb))
          {
            availAnswerPage[numbAvailAnswerPages] = pageNumb;
            numbAvailAnswerPages++;
          }
        }
      }
    }
  }
  while (numbAvailAnswerPages > 0)
  {
    randno = GetRandomNumber(0, numbAvailAnswerPages - 1);
    answerPageNum[CurWrongNo] = availAnswerPage[randno];
    CurWrongNo++;
        (CurWrongNo < numbAnswerChoices)
         / Remove Item From Available Pages.
           - ( j = randno ; j < numbAvailAnswerPages - 1 ; j++ )
```

```
                availAnswerPage[j] = availAnswerPage[j+1];
             numbAvailAnswerPa  s--;
          }
          else
             break;
       }
    }
 }
 return (CurWrongNo - 1);
}

//*****************************************************************
HWND PlayFile(HWND hwnd)
{
 if(hwndMci != NULL) MCIWndDestroy(hwndMci);

if ((hwndMci = MCIWndCreate(hwnd, NULL, VIDEO_STYLE | MCIWNDF_NOTIFYALL,
       NULL)) == NULL)
 {
    BWCCMessageBox(hwnd,"Error Creating video", "Video", MB_OK | MB_ICONINFORMATI
    return(NULL);
 }

MCIWndOpen(hwndMci, avi_path, 0);
 EnableWindow(hwndMci,TRUE);
 ShowWindow(hwndMci, SW_SHOWNORMAL);
 MCIWndPlay(hwndMci);
 return(hwnd);
}
```

What is claimed is:

1. An authoring portion of a computerized learning, response, and evaluation system to aid an author in organizing data for presentation to a user of a presentation portion of a computerized learning, response and evaluation system, the authoring portion comprising:
   a) input means to receive input from an author;
   b) display means to display information to the author;
   c) processing means interfacing with the input means and display means;
   d) memory means connected to the processing means, the memory means containing a sequence of coded instructions which are executed by the processing means, the sequence of coded instructions comprising:
      i) means to create at least one page;
      ii) means to associate at least one resource comprising at least one of text, graphics, or sound with the at least one page;
      iii) means to control which of said at least one resource may be used by at least one of either the authoring portion or the presentation portion of a computerized learning, response, and evaluation system to create questions using a process that selects a question part, a right answer part, and at least one wrong answer part from said at least one resource associated with said at least one page, and then assembling the question part, the right answer part, and the at least one wrong answer part into a question for presentation, said means to control being adapted to eliminate at least a portion of said at least one resource for use as any of either a question part, a right answer part, or a wrong answer part; and
      iv) means to link the at least one page to at least one previously created page.

2. An authoring portion as recited in claim 1 wherein the means to associate at least one resource with the at least one page comprises a plurality of resource tools that allow manipulation and placement of resources.

3. An authoring portion as recited in claim 2 wherein the means to associate at least one resource with the at least one page further comprises means to input the resource.

4. An authoring portion as recited in claim 1 wherein the coded instructions further comprise means to preview questions that can be generated.

5. An authoring portion as recited in claim 4 wherein the means to preview questions allows the author to preview questions generated from a particular page.

6. An authoring portion as recited in claim 4 wherein the means to preview questions allows the author to preview questions generated over all pages.

7. An authoring portion as recited in claim 1 wherein the coded instructions further comprise means to control the number of questions generated by a user of a computerized learning, response and evaluation system.

8. An authoring portion as recited in claim 1 wherein the coded instructions further comprise means to create fields on the page.

9. An authoring portion as recited in claim 1 wherein the coded instructions further comprise means to define branches between pages.

10. An authoring portion as recited in claim 1 wherein the coded instructions further comprise means to define a plurality of page types.

11. An authoring portion as recited in claim 1 wherein the coded instructions further comprise means to define hot spots on the page.

12. Computer readable storage means containing a set of coded instructions to be executed by a computerized learning, response, and evaluation system, the set of coded instructions comprising:
   a) means to create at least one page;
   b) means to associate at least one resource comprising at least one of text, graphics, or sound with the at least one page;
   c) means to control which of said at least one resource may be used by at least one of either an authoring portion or a presentation portion of a computerized learning, response, and evaluation system to create questions using a process that selects a question part, a right answer part, and at least one wrong answer part from said at least one resource associated with said at least one page, and then assembling the question part, the right answer part, and the at least one wrong answer part into a question for presentation, said means to control being adapted to eliminate at least a portion of said at least one resource for use as any of either a question part, a right answer part, or a wrong answer part; and
   d) means to link the at least one page to at least one previously created page.

13. A computer-readable medium having computer-executable instructions comprising:
   means to create a plurality of pages which together form a lesson adapted for use in a presentation portion of a computerized learning, response and evaluation system;
   means to associate at least one resource comprising at least one of text, graphics, or sound with each of said plurality of pages so that said lesson comprises a plurality of such resources; and
   means for identifying which of said at least one resource associated with said plurality of pages may be used by said computerized learning, response and evaluation system to create questions by a process which selects a plurality of resources from said plurality of pages and assembles the selected resources into a question, said means for identifying adapted for eliminating identified resources from use by said process.

* * * * *